(12) United States Patent
Oh

(10) Patent No.: US 12,273,624 B2
(45) Date of Patent: Apr. 8, 2025

(54) CAMERA MODULE AND ELECTRONIC DEVICE INCLUDING THE SAME

(71) Applicant: SAMSUNG ELECTRONICS CO., LTD., Suwon-si (KR)

(72) Inventor: Jinheon Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 118 days.

(21) Appl. No.: 18/077,448

(22) Filed: Dec. 8, 2022

(65) Prior Publication Data

US 2023/0179866 A1     Jun. 8, 2023

Related U.S. Application Data

(63) Continuation of application No. PCT/KR2022/019232, filed on Nov. 30, 2022.

(30) Foreign Application Priority Data

Dec. 8, 2021   (KR) .......................... 10-2021-0174461

(51) Int. Cl.
*H04N 23/68* (2023.01)
*H04N 23/54* (2023.01)
(Continued)

(52) U.S. Cl.
CPC ........... *H04N 23/687* (2023.01); *H04N 23/54* (2023.01); *H04N 23/55* (2023.01); *H04N 23/675* (2023.01)

(58) Field of Classification Search
CPC ...... H04N 23/687; H04N 23/54; H04N 23/55; H04N 23/57; H04N 23/67; H04N 23/00;
(Continued)

(56) References Cited

U.S. PATENT DOCUMENTS 6,853,507 B2   2/2005  Ryu et al.
7,912,362 B2   3/2011  Lim et al.
(Continued)

FOREIGN PATENT DOCUMENTS

JP          2021-99417 A    7/2021
KR    10-2005-0042922 A    5/2005
(Continued)

OTHER PUBLICATIONS

International Search Report (PCT/ISA/210) issued Mar. 15, 2023 by the International Searching Authority in counterpart International Application No. PCT/KR2022/019232.
(Continued)

*Primary Examiner* — Albert H Cutler
(74) *Attorney, Agent, or Firm* — Sughrue Mion, PLLC

(57) ABSTRACT

A camera module includes a camera housing, an optical image stabilization (OIS) driving unit disposed in the camera housing, an auto focus (AF) driving unit coupled to the OIS driving unit, and a lens assembly including a lens and coupled to the AF driving unit where the AF driving unit includes a first carrier to which the lens assembly is coupled and a first piezoelectric motor that provides a driving force to move the first carrier in a direction of an optical axis of the lens, and the OIS driving unit includes a second carrier to which the AF driving unit is coupled and a plurality of second piezoelectric motors that provide driving forces to move the second carrier in one or more directions perpendicular to the optical axis.

19 Claims, 30 Drawing Sheets

(51) Int. Cl.
*H04N 23/55* (2023.01)
*H04N 23/67* (2023.01)

(58) Field of Classification Search
CPC .................. H04N 23/50; H04N 23/60; H04N 23/671–676; H04N 23/68; H04N 23/682; H04N 23/685
See application file for complete search history.

(56) References Cited

U.S. PATENT DOCUMENTS

| | | | |
|---|---|---|---|
| 8,027,106 | B2 | 9/2011 | Kim et al. |
| 8,665,339 | B2 | 3/2014 | Shin et al. |
| 9,531,926 | B2 | 12/2016 | Lee et al. |
| 10,368,002 | B2 | 7/2019 | Kunick et al. |
| 10,527,866 | B2 | 1/2020 | Chung et al. |
| 10,880,482 | B2 | 12/2020 | Kunick et al. |
| 11,237,405 | B2 | 2/2022 | Suh et al. |
| 11,483,459 | B2 | 10/2022 | Saito et al. |
| 2005/0007683 | A1 | 1/2005 | Ryu et al. |
| 2006/0044455 | A1* | 3/2006 | Kim ................ H04N 23/57 348/360 |
| 2006/0279638 | A1* | 12/2006 | Matsuda ........... H04N 23/6812 348/208.7 |
| 2008/0079813 | A1 | 4/2008 | Suzuki |
| 2008/0112128 | A1 | 5/2008 | Holland |
| 2009/0303595 | A1 | 12/2009 | Lim et al. |
| 2009/0316284 | A1 | 12/2009 | Kim et al. |
| 2010/0309323 | A1 | 12/2010 | Shin et al. |
| 2016/0147035 | A1 | 5/2016 | Lee et al. |
| 2017/0163176 | A1 | 6/2017 | Tsuchiya et al. |
| 2018/0031853 | A1 | 2/2018 | Hosokawa et al. |
| 2018/0180900 | A1 | 6/2018 | Chuung et al. |
| 2019/0039880 | A1* | 2/2019 | Paci ..................... B81B 3/0021 |
| 2019/0346740 | A1 | 11/2019 | Suh et al. |
| 2020/0169663 | A1* | 5/2020 | Dawson ............... H04N 23/685 |
| 2021/0173175 | A1 | 6/2021 | Itagaki et al. |
| 2021/0195073 | A1 | 6/2021 | Saito et al. |
| 2021/0318592 | A1 | 10/2021 | Kim et al. |
| 2023/0408840 | A1* | 12/2023 | Osaka ................. G02B 27/646 |

FOREIGN PATENT DOCUMENTS

| | | |
|---|---|---|
| KR | 10-0550907 B1 | 2/2006 |
| KR | 10-2007-0083763 A | 8/2007 |
| KR | 10-2009-0131452 A | 12/2009 |
| KR | 10-2009-0132209 A | 12/2009 |
| KR | 10-0947966 B1 | 3/2010 |
| KR | 10-2010-0122721 A | 11/2010 |
| KR | 10-2011-0030168 A | 3/2011 |
| KR | 10-1141128 B1 | 5/2012 |
| KR | 10-1573073 B1 | 12/2015 |
| KR | 10-2016-0006435 A | 1/2016 |
| KR | 10-1611455 B1 | 4/2016 |
| KR | 10-2018-0076790 A | 7/2018 |
| KR | 10-2019-0024443 A | 3/2019 |
| KR | 10-2019-0050021 A | 5/2019 |
| KR | 10-2019-0120356 A | 10/2019 |
| KR | 10-2019-0128898 A | 11/2019 |
| KR | 10-2020-0003762 A | 1/2020 |
| KR | 10-2021-0031140 A | 3/2021 |
| KR | 10-2021-0042915 A | 4/2021 |
| KR | 10-2021-0042926 A | 4/2021 |

OTHER PUBLICATIONS

Written Opinion (PCT/ISA/237) issued Mar. 15, 2023 by the International Searching Authority in counterpart International Application No. PCT/KR2022/019232.
Communication dated Nov. 28, 2024, issued by European Patent Office in European Patent Application No. 22904553.9.

* cited by examiner

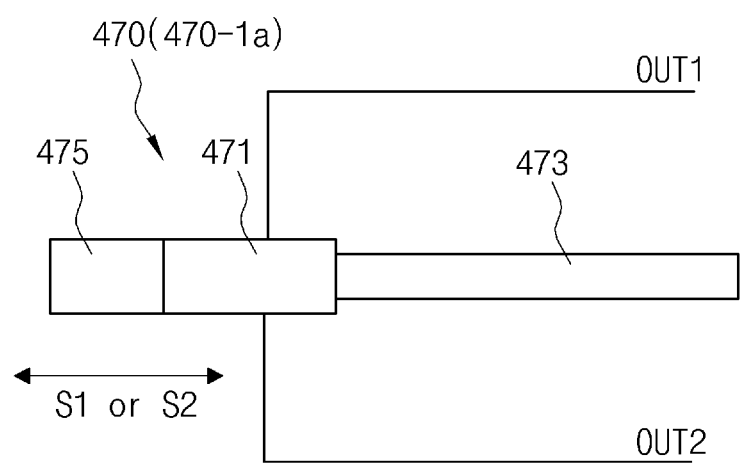
F I G. 20A

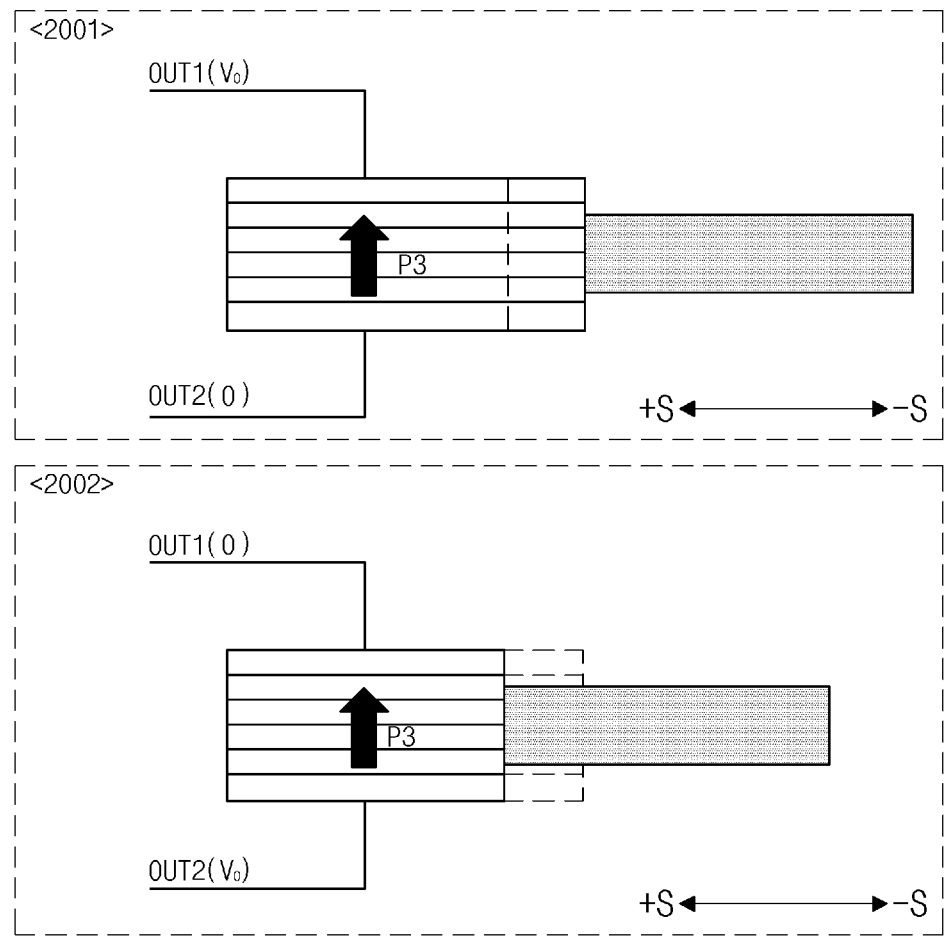
F I G. 20B

CAMERA MODULE AND ELECTRONIC DEVICE INCLUDING THE SAME

CROSS-REFERENCE TO RELATED APPLICATION(S)

This application is a bypass continuation of International Application No. PCT/KR2022/019232, filed on Nov. 30, 2022, which is based on and claims priority to Korean Patent Application No. 10-2021-0174461 filed on Dec. 8, 2021, in the Korean Intellectual Property Office, the disclosures of which are incorporated by reference herein in their entireties.

BACKGROUND

Field

Various embodiments of the disclosure described herein relate to a camera module and an electronic device including the same.

Description of the Related Art

A mobile electronic device such as a smartphone may include a camera module. The camera module may include lenses, a lens barrel surrounding the lenses, and an image sensor. The camera module may support various functions. For example, the camera module may support functions related to image stabilization (e.g., optical image stabilization (OIS), digital image stabilization (DIS), or electrical image stabilization (EIS)) and auto focus (AF).

The camera module may be configured to provide an optical image stabilization function and an auto focus function by moving the lenses relative to the image sensor. For example, the camera module may be configured to move the lenses relative to the image sensor in directions substantially perpendicular to an optical axis in relation to the optical image stabilization function, or may be configured to move the lenses relative to the image sensor in the direction of the optical axis in relation to the auto focus function.

The camera module may include various types of actuators for implementing movement of the lenses. For example, the actuators may be provided by using a stepping motor (STM), a voice coil motor (VCM), a shape memory alloy (SMA), and a piezoelectric motor.

The camera module may be configured to move the lenses using a voice coil motor that includes a coil and a magnet. However, an actuator of a voice coil motor type may increase the weight of the camera module due to the weights of a magnet and a coil, and magnetic interference may occur.

Alternatively, the camera module may be configured to move the lenses using a stepping motor. However, an actuator of a stepping motor type may have a limitation in compactness of the camera module due to a large size of the actuator, and noise may be generated by an operation of a motor.

Various embodiments of the disclosure provide a camera module for implementing movement of a lens using piezoelectric motors in relation to an auto focus function and an optical image stabilization function and an electronic device including the camera module.

The technical problems to be solved by the disclosure are not limited to the aforementioned problems, and any other technical problems not mentioned herein will be clearly understood from the following description by those skilled in the art to which the disclosure pertains.

SUMMARY

A camera module according to an embodiment of the disclosure includes a camera housing, an optical image stabilization (OIS) driving unit disposed in the camera housing, an auto focus (AF) driving unit coupled to the OIS driving unit, and a lens assembly including a lens and coupled to the AF driving unit where the AF driving unit includes a first carrier to which the lens assembly is coupled and a first piezoelectric motor that provides a driving force to move the first carrier in a direction of an optical axis of the lens, and the OIS driving unit includes a second carrier to which the AF driving unit is coupled and a plurality of second piezoelectric motors that provide driving forces to move the second carrier in one or more directions perpendicular to the optical axis.

The AF driving unit may be disposed on an upper portion of the second carrier to move together with the second carrier when the second carrier is moved.

The lens assembly may be configured to move together with the first carrier, and the first carrier may be configured to move together with the second carrier relative to the camera housing in the one or more directions perpendicular to the optical axis when an optical image stabilization function is performed, and move relative to the second carrier and the camera housing in the direction of the optical axis when an auto focus function is performed.

The camera module may further include an image sensor fixed to the camera housing, and the lens assembly may be configured to move in the direction of the optical axis with respect to the image sensor by movement of the first carrier and move in the one or more directions perpendicular to the optical axis with respect to the image sensor by movement of the second carrier.

The first piezoelectric motor may be coupled to the second carrier, and at least a portion of the first carrier may be accommodated in an opening of the first piezoelectric motor to be surrounded by the first piezoelectric motor.

The first carrier may be configured to make contact with the first piezoelectric motor and move relative to the second carrier in the direction of the optical axis by a bending motion generated in at least a portion of the first piezoelectric motor.

The first piezoelectric motor may include a metal plate having an inner end portion brought into close contact with the first carrier and an outer end portion, and a first piezoelectric element disposed on at least one of opposite surfaces of the metal plate, and the first carrier may be inserted into an opening of the metal plate, and the first piezoelectric element may be configured to contract or expand based on a voltage applied to the first piezoelectric element.

The metal plate may be configured such that the inner end portion is bent in a first direction or a second direction opposite to the first direction with respect to the outer end portion by contraction or expansion of the first piezoelectric element, and the first carrier may be configured to move in the first direction or the second direction by a frictional force between the first carrier and the inner end portion.

The first piezoelectric element may include a first sub-piezoelectric element and a second sub-piezoelectric element attached to opposite surfaces of the metal plate, respectively, and the first carrier may be configured to move in a first direction by contraction of the first sub-piezoelectric element and expansion of the second sub-piezoelectric element or move in a second direction opposite to the first direction by expansion of the first sub-piezoelectric element and contraction of the second sub-piezoelectric element.

The first piezoelectric motor may further include a holder to which the outer end portion of the metal plate is coupled, and the holder may be disposed on the second carrier.

The first piezoelectric motor may be formed in an annular shape, and the first carrier may be formed in a shape corresponding to the annular shape of the first piezoelectric motor.

The first carrier may include a first frame having a structure divided into a first portion and a second portion, a sidewall of the first frame being brought into close contact with the metal plate, and an elastic member disposed between the first portion and the second portion and configured to generate an elastic force in a direction in which the first portion and the second portion move away from each other, and the first frame may be configured to make contact with the first piezoelectric motor in a state in which a predetermined pre-load is applied by the elastic member.

Each of the plurality of second piezoelectric motors may include a second piezoelectric element configured to extend in a direction perpendicular to the optical axis and contract or expand in a lengthwise direction of the second piezoelectric element based on a voltage applied to the second piezoelectric element, and a rod coupled to a first end portion of the second piezoelectric element and configured to extend in the lengthwise direction of the second piezoelectric element by a predetermined length, and the rod may be configured to move in a lengthwise direction of the rod by expansion or contraction of the second piezoelectric element.

The camera housing may include a base on which the OIS driving unit is disposed, the rod may be coupled to the base to be movable in the lengthwise direction of the rod, and the second carrier may be coupled to the rod and configured to move together with the rod or separate from movement of the rod, based on a moving speed of the rod.

The second carrier may include a plurality of support parts into which rods of the plurality of second piezoelectric motors are inserted, the plurality of support parts being configured to make contact with the rods and elastically press the rods, and each of the rods may be configured to move together with the second carrier by frictional forces between the rods and the plurality of support parts when moving at a speed lower than a specified speed and to move relative to the second carrier by an inertial force of the second carrier when moving at a speed higher than the specified speed.

Each of the plurality of second piezoelectric motors may further include a counter mass coupled to a second end portion of the second piezoelectric element configured to face away from the first end portion of the second piezoelectric element, and the second piezoelectric element may be configured to contract or expand in a form in which the first end portion moves toward or away from the second end portion.

The plurality of second piezoelectric motors may include a first sub-piezoelectric motor configured to move the second carrier in a direction of a first shift axis perpendicular to the optical axis, and a second sub-piezoelectric motor configured to move the second carrier in a direction of a second shift axis perpendicular to the optical axis and the first shift axis, and the first sub-piezoelectric motor may be disposed on a side surface facing the direction of the second shift axis among side surfaces of the second carrier, and the second sub-piezoelectric motor may be disposed on a side surface facing the direction of the first shift axis among the side surfaces of the second carrier.

A camera module according to an embodiment of the disclosure includes a camera housing, a lens assembly including a lens, at least a portion of the lens assembly being disposed in the camera housing, an auto focus (AF) module to which the lens assembly is coupled and that moves the lens assembly in a direction of an optical axis of the lens, and an optical image stabilization (OIS) module coupled to the camera housing and configured to support the AF module and to move the AF module and the lens assembly in a direction perpendicular to the optical axis, the AF module provides a driving force using a piezoelectric element contracted or expanded based on a voltage applied to the piezoelectric element, and the AF module includes an AF carrier to which the lens assembly is coupled and an AF piezoelectric motor that surrounds the AF carrier, the AF piezoelectric motor includes a metal plate having an opening into which the AF carrier is fitted and the piezoelectric element disposed on at least one of opposite surfaces of the metal plate that face the direction of the optical axis, and the metal plate has an inner end portion that forms the opening and that is brought into close contact with the AF carrier and an outer end portion fixed to the OIS module.

A camera module according to an embodiment of the disclosure includes a camera housing, a lens assembly including a lens, at least a portion of the lens assembly being disposed in the camera housing, an auto focus (AF) module to which the lens assembly is coupled and that moves the lens assembly in a direction of an optical axis of the lens, and an optical image stabilization (OIS) module coupled to the camera housing and configured to support the AF module and to move the AF module and the lens assembly in a direction perpendicular to the optical axis, and the OIS module provides a driving force using a piezoelectric element contracted or expanded based on a voltage applied to the piezoelectric element, the OIS module includes an OIS carrier to which the AF module is coupled and a plurality of OIS piezoelectric motors disposed on a plurality of side surfaces of the OIS carrier, and each of the plurality of OIS piezoelectric motors includes the piezoelectric element that extends in a direction perpendicular to the optical axis, a rod coupled to the OIS carrier and a first end portion of the piezoelectric element and that extends in a lengthwise direction of the piezoelectric element by a predetermined length, and a counter mass separated from the camera housing and the OIS carrier and coupled to a second end portion of the piezoelectric element that faces away from the first end portion, the piezoelectric element is contracted or expanded in a form in which the first end portion moves toward or away from the second end portion in a state in which the second end portion is supported by the counter mass, and the rod moves in a lengthwise direction of the rod by expansion or contraction of the piezoelectric element and is connected to the OIS carrier to be movable in a direction perpendicular to the lengthwise direction of the rod.

An electronic device according to an embodiment of the disclosure includes a housing and a camera module disposed in the housing and configured to receive light through a region of the housing, the camera module includes a camera housing, an optical image stabilization (OIS) driving unit disposed in the camera housing, an auto focus (AF) driving unit disposed on an upper portion of the OIS driving unit, and a lens assembly including a lens and coupled to the AF driving unit, the AF driving unit includes a first carrier to which the lens assembly is coupled and a first piezoelectric motor that moves the first carrier in a direction of an optical axis of the lens, the OIS driving unit includes a second carrier to which the AF driving unit is coupled and a plurality of second piezoelectric motors that move the second carrier in a direction of at least one shift axis perpendicular to the optical axis, the first carrier moves together with the second carrier relative to the camera housing in the direction of the shift axis when an optical image stabilization (OIS) function is performed and moves relative to the second carrier and the camera housing in the direction of the optical axis when an auto focus (AF) function is performed.

BRIEF DESCRIPTION OF THE DRAWINGS

FIG. 20A illustrates a connection structure of output terminals of the second piezoelectric motor according to an embodiment.

FIG. 20B illustrates a control operation of the second piezoelectric motor according to an embodiment.

With regard to description of the drawings, identical or similar reference numerals may be used to refer to identical or similar components.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
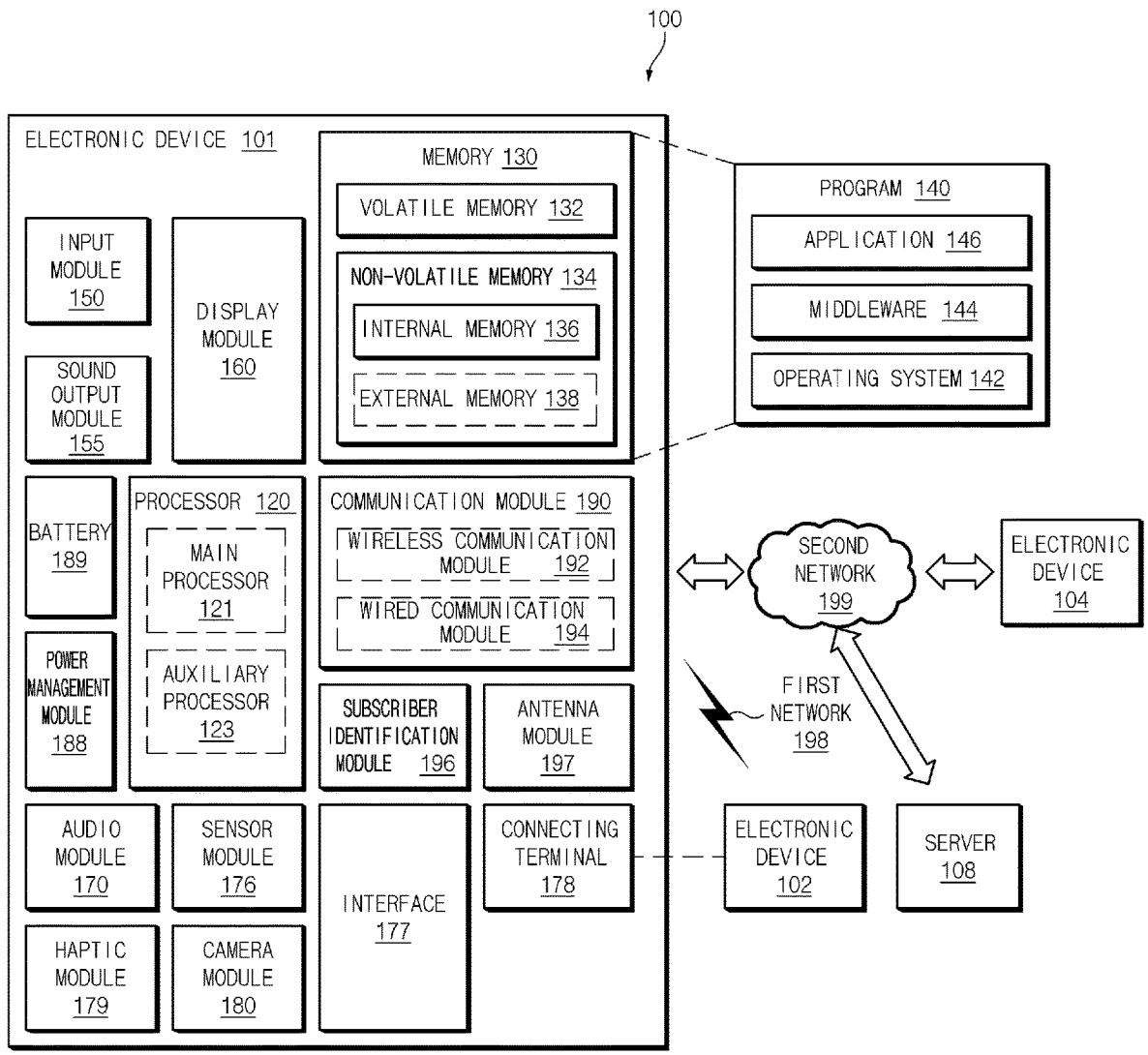
FIG. 1 is a block diagram of an electronic device in a network environment according to various embodiments.

FIG. 1 is a block diagram illustrating an electronic device in a network environment according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
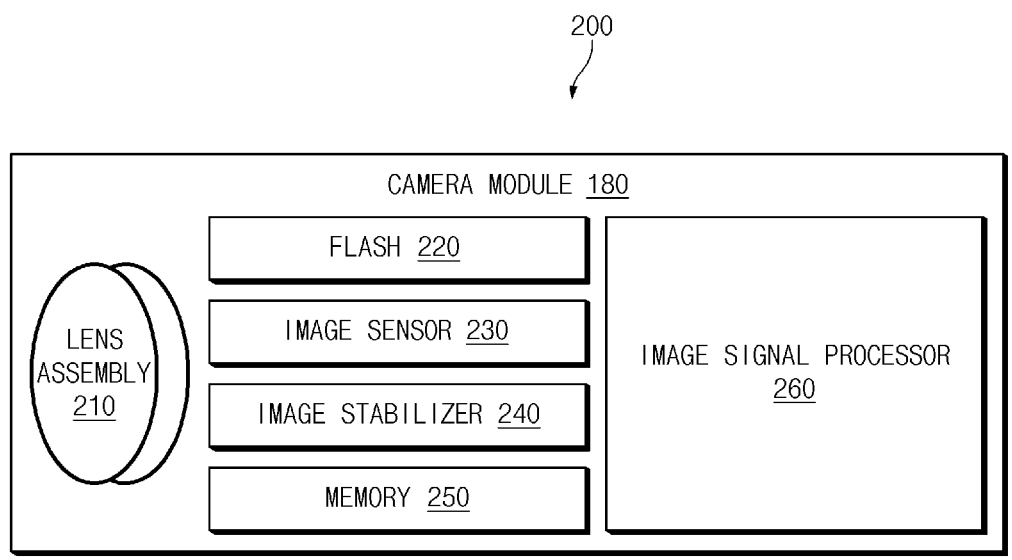
FIG. 2 is a block diagram illustrating a camera module according to various embodiments.

FIG. 2 is a block diagram illustrating the camera module according to various embodiments.

Referring to FIG. 2, the camera module 180 (e.g., the camera module 305, 312 of FIGS. 3A, 3B and 3C, or the camera module 400 of FIG. 4) may include a lens assembly 210 (e.g., the lens assembly 410 of FIG. 4), a flash 220, an image sensor 230, an image stabilizer 240, a memory 250 (e.g., buffer memory), or an image signal processor 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly of the plurality of lens assemblies 210. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least a part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least a part of the raw image stored in the memory 250 may be obtained and processed, for example, by the image signal processor 260. According to an embodiment, the memory 250 may be configured as at least a part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180.

According to an embodiment, the image signal processor 260 may be configured as at least a part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another camera module of the plurality of camera modules 180 may form a telephoto camera. Similarly, at least one of the plurality of camera modules 180 may form, for example, a front camera and at least another camera module of the plurality of camera modules 180 may form a rear camera.

Figure 3A:
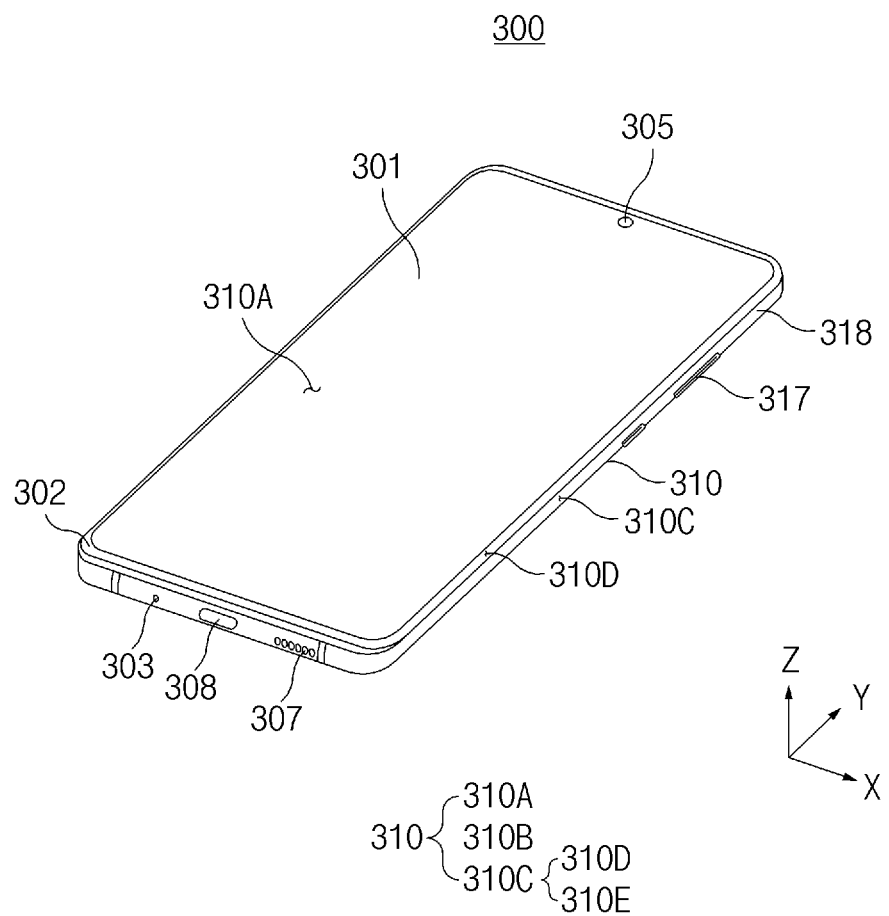
FIG. 3A is a front perspective view of an electronic device according to an embodiment.
Figure 3B:
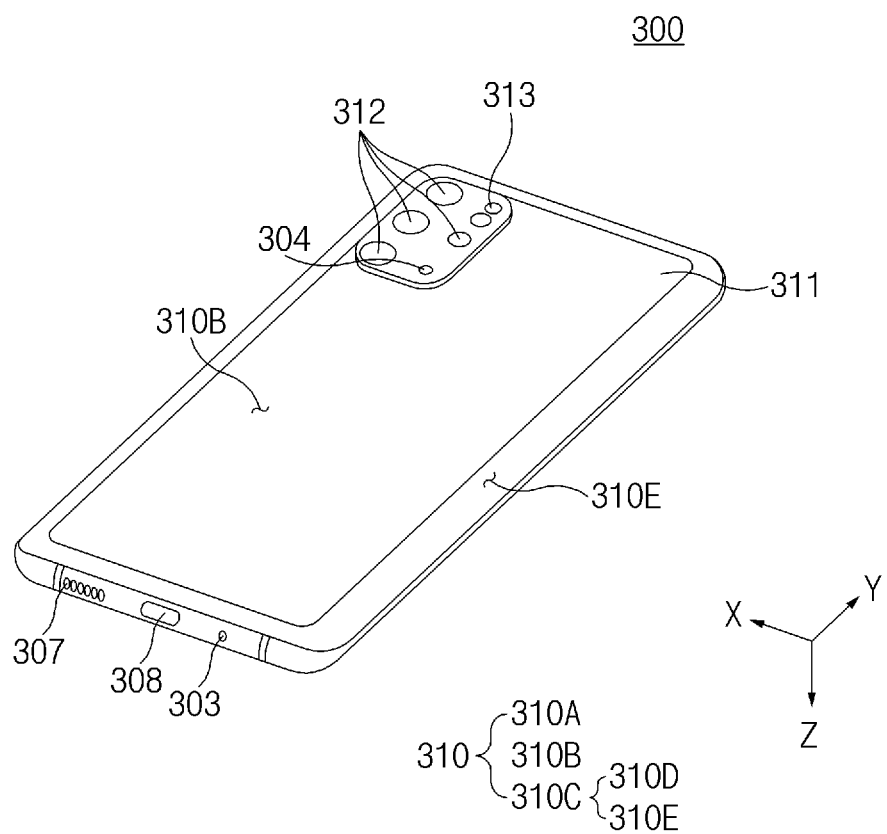
FIG. 3B is a rear perspective view of the electronic device according to an embodiment.
Figure 3C:
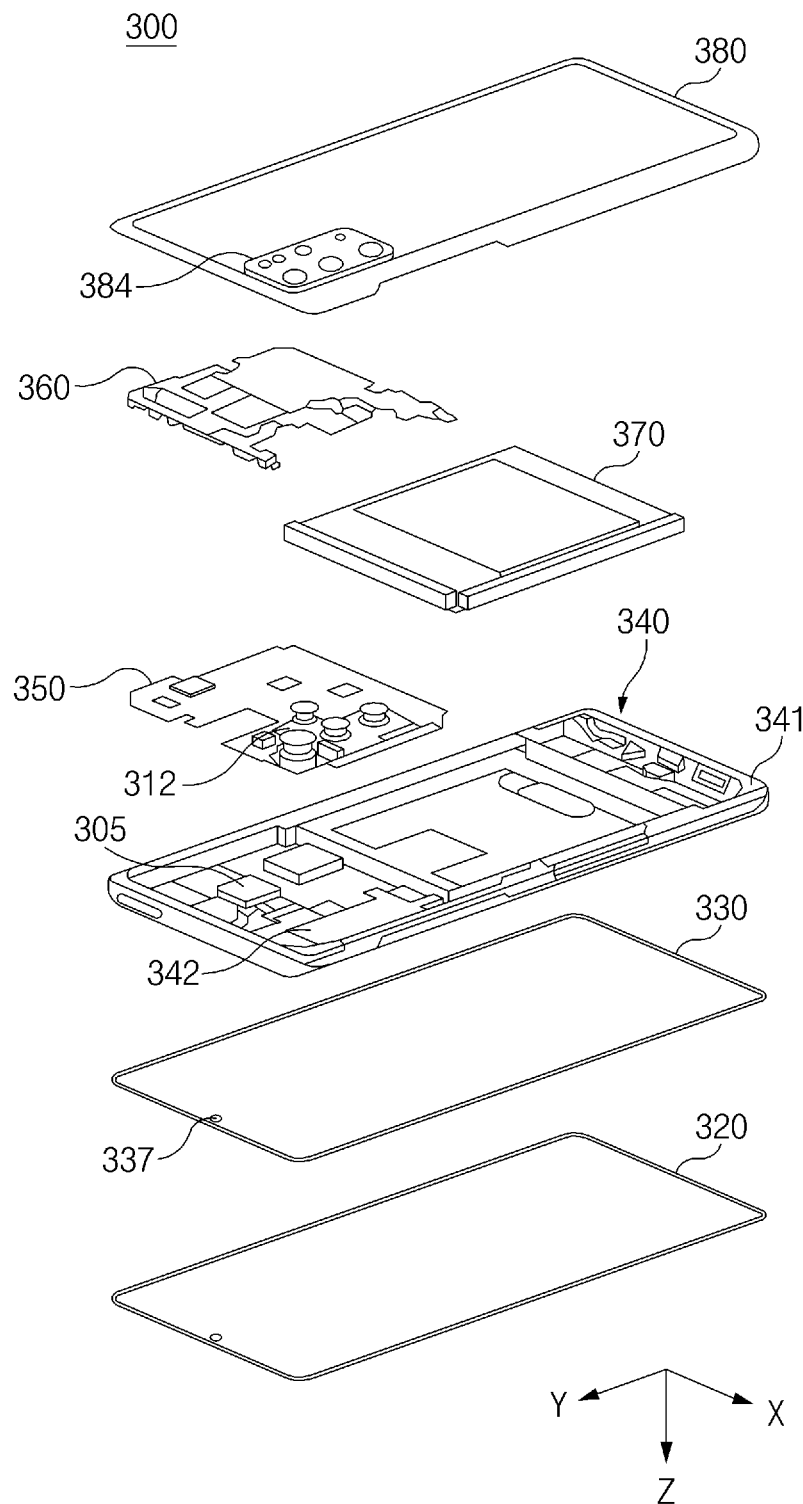
FIG. 3C is an exploded perspective view of the electronic device according to an embodiment.

FIG. 3A is a front perspective view of an electronic device according to an embodiment. FIG. 3B is a rear perspective view of the electronic device according to an embodiment. FIG. 3C is an exploded perspective view of the electronic device according to an embodiment.

Referring to FIGS. 3A and 3B, the electronic device 300 according to an embodiment (e.g., the electronic device 101 of FIG. 1) may include a housing 310 that includes a first surface (or, a front surface) 310A, a second surface (or, a rear surface) 310B, and a third surface (or, a side surface) 310C surrounding a space between the first surface 310A and the second surface 310B.

In another embodiment, the housing 310 may refer to a structure that forms some of the first surface 310A, the second surface 310B, and the third surface 310C.

In an embodiment, the first surface 310A may be formed by a front plate 302, at least a portion of which is substantially transparent (e.g., a glass plate including various coating layers, or a polymer plate). The second surface 310B may be formed by a back plate 311 that is substantially opaque. The back plate 311 may be formed of, for example, coated or colored glass, ceramic, a polymer, metal (e.g., aluminum, stainless steel (STS), or magnesium), or a combination of at least two of the aforementioned materials. The third surface 310C may be formed by a side bezel structure (or, a side member) 318 that is coupled with the front plate 302 and the back plate 311 and that includes metal and/or a polymer.

In another embodiment, the back plate 311 and the side bezel structure 318 may be integrally formed with each other and may include the same material (e.g., a metallic material such as aluminum).

In the illustrated embodiment, the front plate 302 may include two first regions 310D that curvedly and seamlessly extend from partial regions of the first surface 310A toward the back plate 311. The first regions 310D may be located at opposite long edges of the front plate 302.

In the illustrated embodiment, the back plate 311 may include two second regions 310E that curvedly and seamlessly extend from partial regions of the second surface 310B toward the front plate 302. The second regions 310E may be located at opposite long edges of the back plate 311.

In another embodiment, the front plate 302 (or, the back plate 311) may include only one of the first regions 310D (or, the second regions 310E). Furthermore, in another embodiment, the front plate 302 (or, the back plate 311) may not include a part of the first regions 310D (or, the second regions 310E).

In an embodiment, when viewed from a side of the electronic device 300, the side bezel structure 318 may have a first thickness (or, width) at sides (e.g., short sides) not including the first regions 310D or the second regions 310E and may have a second thickness at sides (e.g., long sides) including the first regions 310D or the second regions 310E, the second thickness being smaller than the first thickness.

In an embodiment, the electronic device 300 may include at least one of a display 301 (e.g., the display module 160 of FIG. 1), audio modules 303, 304, and 307 (e.g., the audio module 170 of FIG. 1), a sensor module (not illustrated) (e.g., the sensor module 176 of FIG. 1), camera modules 305, 312, and 313 (e.g., the camera module 180 of FIG. 1), key input devices 317 (e.g., the input device 150 of FIG. 1), a light emitting element (not illustrated), or a connector hole 308 (e.g., the connecting terminal 178 of FIG. 1). In another embodiment, at least one component (e.g., the key input devices 317 or the light emitting element (not illustrated)) among the aforementioned components may be omitted from the electronic device 300, or other component(s) may be additionally included in the electronic device 300.

In an embodiment, the display 301 may be visually exposed through most of the front plate 302. For example, at least a portion of the display 301 may be visually exposed through the front plate 302 that includes the first surface 310A and the first regions 310D of the third surface 310C. The display 301 may be disposed on a rear surface of the front plate 302.

In an embodiment, the periphery of the display 301 may be formed to be substantially the same as the shape of the adjacent outside edge of the front plate 302. In another embodiment, to expand the area by which the display 301 is visually exposed, the gap between the outside edge of the display 301 and the outside edge of the front plate 302 may be substantially constant.

In an embodiment, a surface of the housing 310 (or, the front plate 302) may include a screen display area that is formed as the display 301 is visually exposed. For example, the screen display area may include the first surface 310A and the first regions 310D of the side surface.

In another embodiment, the screen display area 310A and 310D may include a sensing region (not illustrated) that is configured to obtain biometric information of a user. When the screen display area 310A and 310D includes the sensing region, this may mean that at least a portion of the sensing region overlaps the screen display area 310A and 310D. For example, the sensing region (not illustrated) may refer to a region capable of displaying visual information by the display 301 like the other regions of the screen display area 310A and 310D and additionally obtaining biometric information (e.g., a fingerprint) of the user.

In an embodiment, the screen display area 310A and 310D of the display 301 may include a region through which the first camera module 305 (e.g., a punch hole camera) is visually exposed. For example, at least a portion of the periphery of the region through which the first camera module 305 is visually exposed may be surrounded by the screen display area 310A and 310D. In various embodiments, the first camera module 305 may include a plurality of camera modules (e.g., the camera module 180 of FIG. 1).

In various embodiments, the display 301 may be configured such that at least one of an audio module (not illustrated), a sensor module (not illustrated), a camera module (e.g., the first camera module 305), or a light emitting element (not illustrated) is disposed on a rear surface of the screen display area 310A and 310D. For example, the electronic device 300 may be configured such that the first camera module 305 (e.g., an under display camera (UDC)) is disposed on the rear side (e.g., the side facing the −z-axis direction) of the first surface 310A (e.g., the front surface) and/or the side surface 310C (e.g., at least one surface of the first regions 310D) so as to face toward the first surface 310A and/or the side surface 310C. For example, the first camera module 305 may be disposed under the display 301 and may not be visually exposed through the screen display area 310A and 310D.

In various embodiments, when the first camera module 305 is implemented with an under display camera, the region of the display 301 that faces the first camera module 305 may be formed to be a transmissive region that has a specified transmittance as a portion of the display area that displays contents. For example, the transmissive region may have a transmittance of about 5% to about 50%. The transmissive region may include a region through which light for generating an image by being focused on an image sensor (e.g., the image sensor 230 of FIG. 2) passes and that overlaps an effective region (e.g., a field of view (FOV) region) of the first camera module 305. For example, the transmissive region of the display 301 may include a region having a lower pixel density and/or wiring density than a surrounding region.

In another embodiment (not illustrated), the display 301 may be coupled with, or disposed adjacent to, touch detection circuitry, a pressure sensor capable of measuring the intensity (pressure) of a touch, and/or a digitizer that detects a stylus pen of a magnetic field type.

In an embodiment, the audio modules 303, 304, and 307 may include the microphone holes 303 and 304 and the speaker hole 307.

In an embodiment, the microphone holes 303 and 304 may include the first microphone hole 303 formed in a partial region of the third surface 310C and the second microphone hole 304 formed in a partial region of the second surface 310B. A microphone (not illustrated) for obtaining external sound may be disposed in the microphone holes 303 and 304. The microphone may include a plurality of microphones to sense the direction of sound.

In an embodiment, the second microphone hole 304 formed in the partial region of the second surface 310B may be disposed adjacent to the camera modules 305, 312, and 313. For example, the second microphone hole 304 may obtain sounds when the camera modules 305, 312, and 313 are executed, or may obtain sounds when other functions are executed.

In an embodiment, the speaker hole 307 may include an external speaker hole 307 and a receiver hole for telephone call (not illustrated). The external speaker hole 307 may be formed in a portion of the third surface 310C of the electronic device 300. In another embodiment, the external speaker hole 307, together with the microphone hole 303, may be implemented as a single hole. Although not illustrated, the receiver hole for telephone call (not illustrated) may be formed in another portion of the third surface 310C. For example, the receiver hole for telephone call may be formed in another portion (e.g., a portion facing the +y-axis direction) of the third surface 310C that faces the portion (e.g., a portion facing the −y-axis direction) of the third surface 310C in which the external speaker hole 307 is formed. According to various embodiments, the receiver hole for telephone call may not be formed in a portion of the third surface 310C and may be formed by a separation space between the front plate 302 (or, the display 301) and the side bezel structure 318.

In an embodiment, the electronic device 300 may include at least one speaker (not illustrated) that is configured to output sound outside the housing 310 through the external speaker hole 307 or the receiver hole for telephone call (not illustrated). According to various embodiments, the speaker may include a piezoelectric speaker from which the speaker hole 307 is omitted.

In an embodiment, the sensor module (not illustrated) may generate an electrical signal or a data value that corresponds to an operational state inside the electronic device 300 or an environmental state external to the electronic device 300. For example, the sensor module may include at least one of a proximity sensor, a heart rate monitor (HRM) sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the camera modules 305, 312, and 313 may include the first camera module 305 (e.g., a punch hole camera) exposed on the first surface 310A of the electronic device 300, the second camera module 312 exposed on the second surface 310B, and/or the flash 313.

In an embodiment, the first camera module 305 may be visually exposed through a portion of the screen display area 310A and 310D of the display 301. For example, the first camera module 305 may be visually exposed on a partial region of the screen display area 310A and 310D through an opening (not illustrated) that is formed in a portion of the display 301. In another example, the first camera module 305 (e.g., an under display camera) may be disposed on a rear surface of the display 301 and may not be visually exposed through the screen display area 310A and 310D.

In an embodiment, the second camera module 312 may include a plurality of cameras (e.g., a dual camera, a triple camera, or a quad camera). However, the second camera module 312 is not necessarily limited to including the plurality of cameras and may include one camera.

In an embodiment, the first camera module 305 and the second camera module 312 may include one or more lenses, an image sensor, and/or an image signal processor. The flash 313 may include, for example, a light emitting diode or a xenon lamp. In another embodiment, two or more lenses (an IR camera lens, a wide angle lens, and a telephoto lens) and image sensors may be disposed on one surface of the electronic device 300.

In an embodiment, the key input devices 317 may be disposed on the third surface 310C of the housing 310 (e.g., the first regions 310D and/or the second regions 310E). In another embodiment, the electronic device 300 may not include all or some of the key input devices 317, and the key input devices 317 may be implemented in a different form, such as a soft key, on the display 301. In another embodiment, the key input devices may include a sensor module (not illustrated) that forms the sensing region (not illustrated) that is included in the screen display area 310A and 310D.

In an embodiment, the connector hole 308 may accommodate a connector. The connector hole 308 may be disposed in the third surface 310C of the housing 310. For example, the connector hole 308 may be disposed in the third surface 310C so as to be adjacent to at least a part of the audio modules (e.g., the microphone hole 303 and the speaker hole 307). In another embodiment, the electronic device 300 may include the first connector hole 308 capable of accommodating a connector (e.g., a USB connector) for transmitting/receiving power and/or data with an external electronic device, and/or a second connector hole (not illustrated) capable of accommodating a connector (e.g., an earphone jack) for transmitting/receiving audio signals with an external electronic device.

In an embodiment, the electronic device 300 may include the light emitting element (not illustrated). For example, the light emitting element (not illustrated) may be disposed on the first surface 310A of the housing 310. The light emitting element (not illustrated) may provide state information of the electronic device 300 in the form of light. In another embodiment, the light emitting element (not illustrated) may provide a light source that operates in conjunction with operation of the first camera module 305. For example, the light emitting element (not illustrated) may include an LED, an IR LED, and/or a xenon lamp.

Referring to FIG. 3C, the electronic device 300 according to an embodiment may include a front plate 320 (e.g., the front plate 302 of FIG. 3A), a display 330 (e.g., the display 301 of FIG. 3A), a side member 340 (e.g., the side bezel structure 318 of FIG. 3A), a printed circuit board 350, a rear case 360, a battery 370, a back plate 380 (e.g., the back plate 311 of FIG. 3B), and an antenna (not illustrated).

In various embodiments, the electronic device 300 may not include at least one component (e.g., the rear case 360) among the aforementioned components, or may additionally include other component(s). Some of the components of the electronic device 300 illustrated in FIG. 3C may be identical or similar to some of the components of the electronic device 300 illustrated in FIGS. 3A and 3B, and repetitive descriptions will hereinafter be omitted.

In an embodiment, the front plate 320 and the display 330 may be coupled to the side member 340. For example, based on FIG. 3C, the front plate 320 and the display 330 may be disposed under the side member 340. The front plate 320 and the display 330 may be located in the +z-axis direction from the side member 340. For example, the display 330 may be coupled to the bottom of the side member 340, and the front plate 320 may be coupled to the bottom of the display 330. The front plate 320 may form a portion of an outer surface (or, the exterior) of the electronic device 300. The display 330 may be disposed between the front plate 320 and the side member 340 so as to be located inside the electronic device 300.

In an embodiment, the side member 340 may be disposed between the display 330 and the back plate 380. For example, the side member 340 may be configured to surround a space between the back plate 380 and the display 330.

In an embodiment, the side member 340 may include a frame structure 341 that forms a portion of a side surface of the electronic device 300 (e.g., the third surface 310C of FIG. 3A) and a plate structure 342 extending inward from the frame structure 341.

In an embodiment, the plate structure 342 may be disposed inside the frame structure 341 so as to be surrounded by the frame structure 341. The plate structure 342 may be connected with the frame structure 341, or may be integrally formed with the frame structure 341. The plate structure 342 may be formed of a metallic material and/or a non-metallic (e.g., polymer) material. In an embodiment, the plate structure 342 may support other components included in the electronic device 300. For example, at least one of the display 330, the printed circuit board 350, the rear case 360, or the battery 370 may be disposed on the plate structure 342. For example, the display 330 may be coupled to one surface (e.g., a surface facing the +z-axis direction) of the plate structure 342, and the printed circuit board 350 may be coupled to an opposite surface (e.g., a surface facing the −z-axis direction) that faces away from the one surface.

In an embodiment, the rear case 360 may be disposed between the back plate 380 and the plate structure 342. The rear case 360 may be coupled to the side member 340 so as to overlap at least a portion of the printed circuit board 350. For example, the rear case 360 may face the plate structure 342 with the printed circuit board 350 therebetween.

In an embodiment, a processor (e.g., the processor 120 of FIG. 1), a memory (e.g., the memory 130 of FIG. 1), and/or an interface (e.g., the interface 177 of FIG. 1) may be mounted on the printed circuit board 350. The processor may include, for example, one or more of a central processing unit, an application processor, a graphic processing unit, an image signal processor, a sensor hub processor, or a communication processor. The memory may include, for example, a volatile memory or a non-volatile memory. The interface may include, for example, a high definition multimedia interface (HDMI), a universal serial bus (USB) interface, an SD card interface, and/or an audio interface. The interface may electrically or physically connect the electronic device 300 with an external electronic device and may include a USB connector, an SD card/MMC connector, or an audio connector.

In an embodiment, the battery 370 (e.g., the battery 189 of FIG. 1) may supply power to at least one component of the electronic device 300. For example, the battery 370 may include a primary cell that is not rechargeable, a secondary cell that is rechargeable, or a fuel cell. At least a portion of the battery 370 may be disposed on substantially the same plane as the printed circuit board 350. The battery 370 may be integrally disposed inside the electronic device 300, or may be disposed to be detachable from the electronic device 300.

In an embodiment, the antenna (not illustrated) (e.g., the antenna module 197 of FIG. 1) may be disposed between the back plate 380 and the battery 370. The antenna (not illustrated) may include, for example, a near field communication (NFC) antenna, a wireless charging antenna, and/or a magnetic secure transmission (MST) antenna. For example, the antenna (not illustrated) may perform short-range communication with an external device, or may wirelessly transmit and receive power required for charging.

In an embodiment, the first camera module 305 may be disposed on at least a portion (e.g., the plate structure 342) of the side member 340 such that a lens receives external light through a partial region of the front plate 320 (e.g., the front surface 310A of FIG. 3A). For example, the lens of the first camera module 305 may be visually exposed through a partial region of the front plate 320. A camera region 337 (e.g., an opening region or a light transmitting region) corresponding to the first camera module 305 may be formed in the display 330.

In an embodiment, the second camera module 312 may be disposed on the printed circuit board 350 such that a lens receives external light through a camera region 384 of the back plate 380 (e.g., the rear surface 310B of FIG. 3B) of the electronic device 300. For example, the lens of the second camera module 312 may be visually exposed through the camera region 384. In an embodiment, the second camera module 312 may be disposed in at least a portion of an inner space formed in the housing of the electronic device 300 (e.g., the housing 310 of FIGS. 3A and 3B) and may be electrically connected to the printed circuit board 350 through a connecting member (e.g., a connector).

In an embodiment, the camera region 384 may be formed on a surface of the back plate 380 (e.g., the rear surface 310B of FIG. 3B). In an embodiment, the camera region 384 may be formed to be at least partially transparent such that external light is incident on the lens of the second camera module 312. In an embodiment, at least a portion of the camera region 384 may protrude to a predetermined height from the surface of the back plate 380. However, without being necessarily limited thereto, the camera region 384 may form substantially the same plane as the surface of the back plate 380.

Figure 4A:
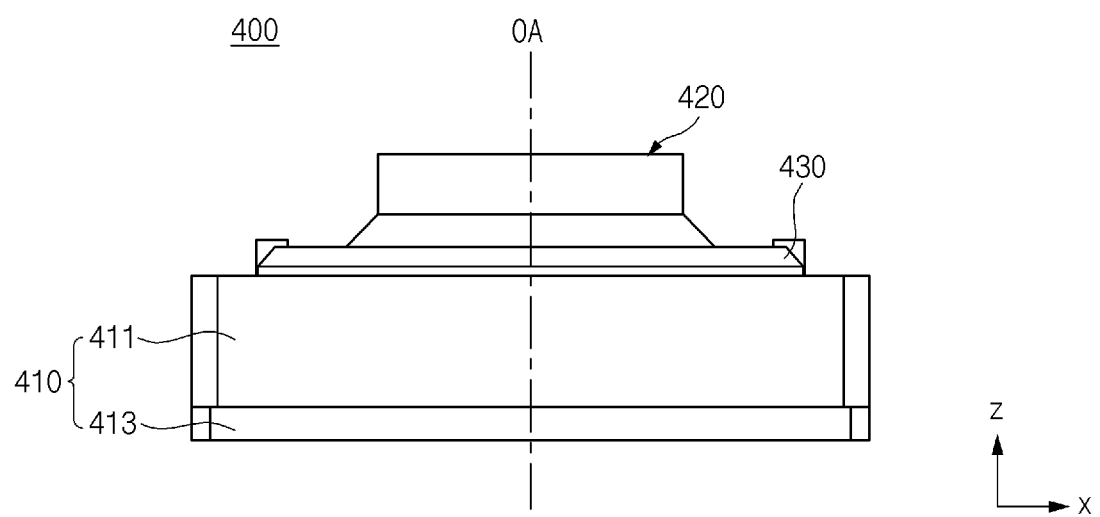
FIG. 4A is a front view of a camera module according to an embodiment.
Figure 4B:
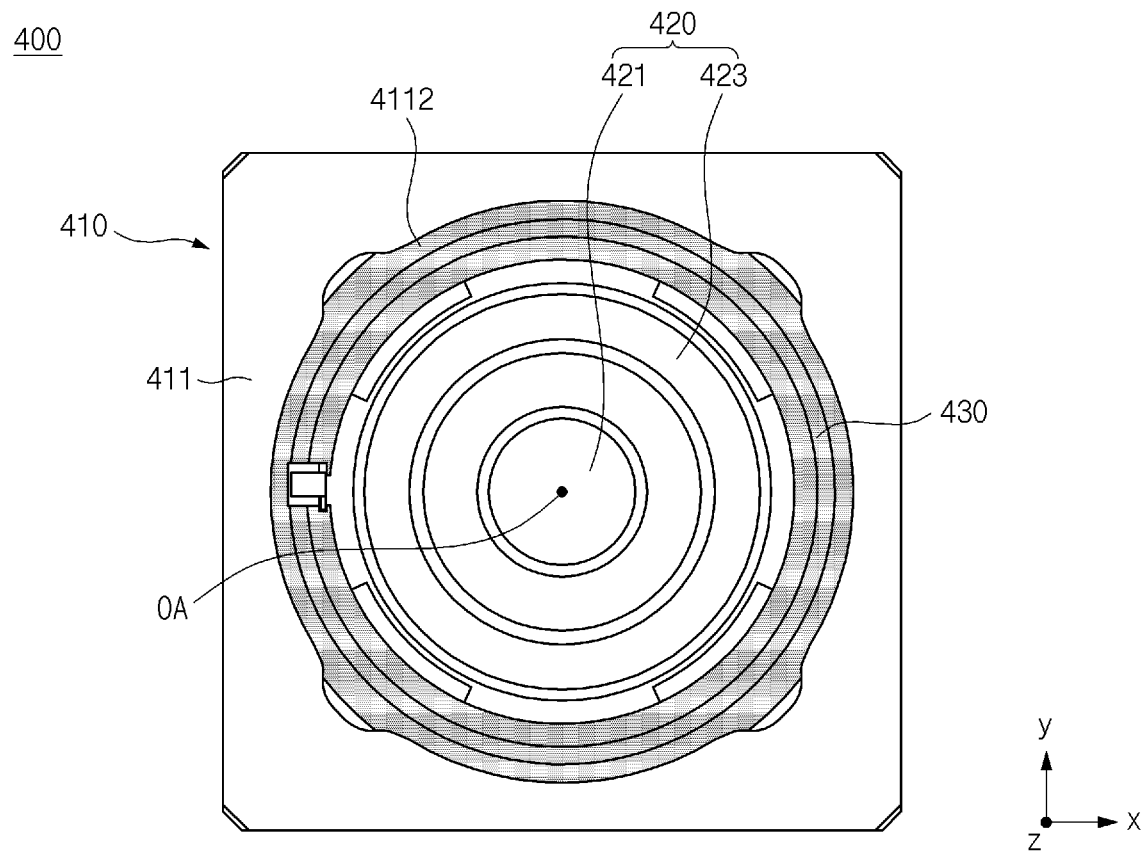
FIG. 4B is a plan view of the camera module according to an embodiment.

FIG. 4A is a front view of a camera module according to an embodiment. FIG. 4B is a plan view of the camera module according to an embodiment.

Referring to FIGS. 4A and 4B, the camera module 400 according to an embodiment (e.g., the first camera module 305 of FIGS. 3A and 3C and the second camera module 312 of FIGS. 3B and 3C) may include a camera housing 410, a lens assembly 420 (e.g., the lens assembly 210 of FIG. 2), and an actuating unit 430 (e.g., the image stabilizer 240 of FIG. 2).

In an embodiment, the camera housing 410 may include a cover 411 and a base 413. The cover 411 and the base 413 may be coupled with each other to form a predetermined space in which other parts of the camera module 400 are accommodated. The base 413 may support the lens assembly 420 and the actuating unit 430, and the cover 411 may be coupled to the base 413 to cover at least a portion of the lens assembly 420 and at least a portion of the actuating unit 430. The cover 411 may have an opening 4112 formed therein in which at least a portion of the lens assembly 420 and at least a portion of the actuating unit 430 are accommodated. For example, the lens assembly 420 and the actuating unit 430 may pass through the opening 4112, and at least a portion of the lens assembly 420 and at least a portion of the actuating unit 430 may be exposed outside the camera housing 410.

In an embodiment, the camera housing 410 may have a horizontal width (e.g., a length in the x-axis direction) and a vertical width (e.g., a length in the y-axis direction) equal to each other and may have a height (e.g., a length in the z-axis direction) smaller than the horizontal width and the vertical width. For example, the horizontal width and the vertical width of the camera housing 410 may be about 17.8 mm, and the height of the camera housing 410 may range from about 4.3 mm to about 4.45 mm. However, the size of the camera housing 410 may be diversely changed without being limited to the above-described numerical values.

Figure 5:
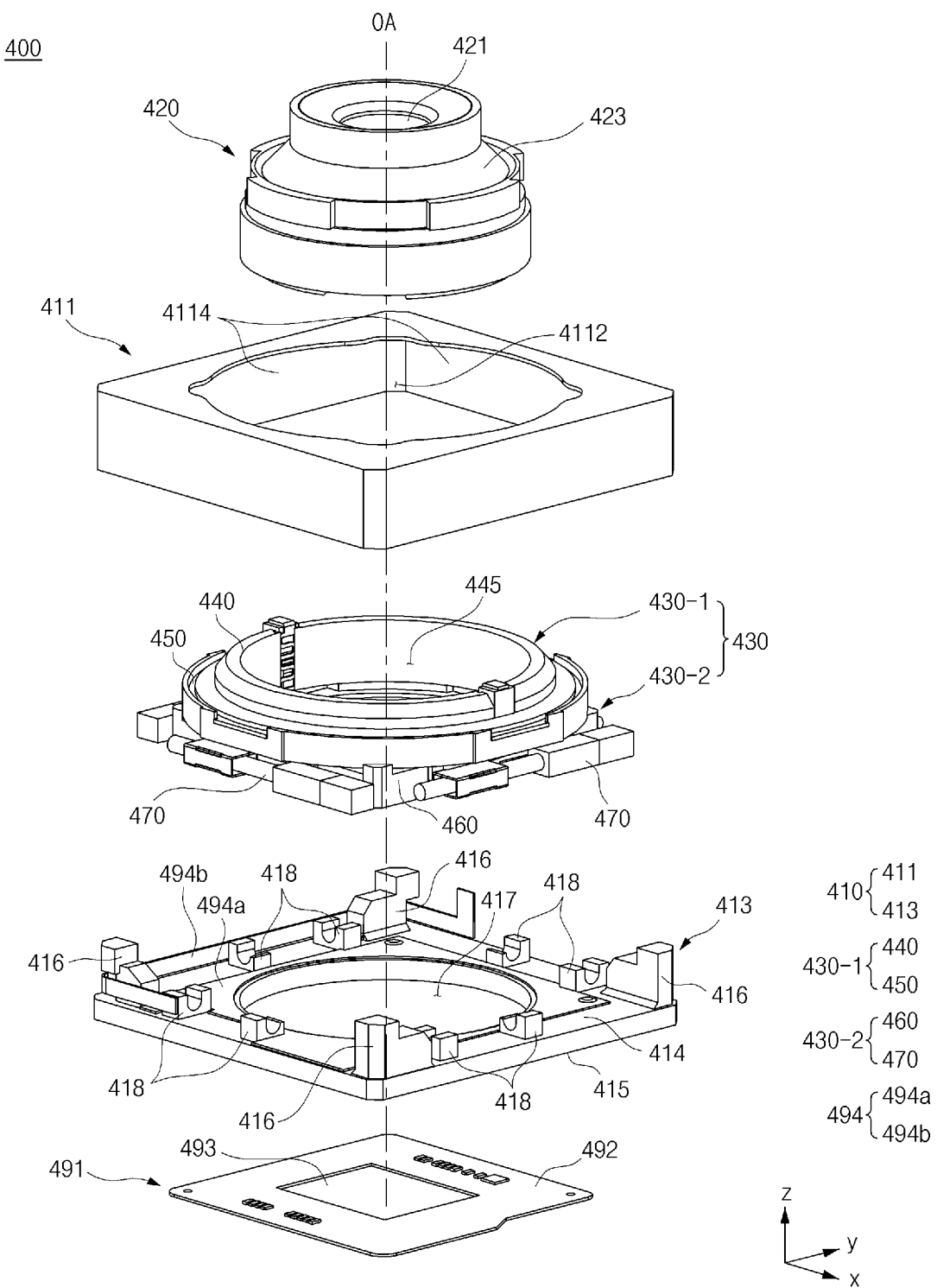
FIG. 5 is an exploded perspective view of the camera module according to an embodiment.

Although not illustrated, the camera module 400 may further include an image sensor (not illustrated) (e.g., the image sensor 230 of FIG. 2 or an image sensor 493 of FIG. 5). The image sensor may be fixed to at least a portion of the camera housing 410. For example, the image sensor 493 may be fixedly disposed on the base 413. In various embodiments, the image sensor may be disposed on a bottom surface (e.g., a surface facing the −z-axis direction) of the base 413 to overlap the lens assembly 420 in the direction of an optical axis OA.

In an embodiment, the lens assembly 420 may include a lens 421 and a lens barrel 423 in which the lens 421 is accommodated. For example, the lens barrel 423 may surround one or more lenses 421. The lens barrel 423 may provide a function of supporting the lenses 421 and protecting the lenses 421 from an external impact. At least a portion of the lens assembly 420 may be exposed outside the camera housing 410 through the opening 4112 of the cover 411, and thus external light may be incident on the lens 421.

According to the illustrated embodiment, the lens assembly 420 may pass through the opening 4112 and may protrude to a predetermined height from the cover 411. However, the disclosure is not limited thereto, and according to various embodiments, the lens assembly 420 may be completely accommodated in the camera housing 410 and may be configured such that external light is incident through a light receiving region including the opening 4112 or a transparent glass.

In an embodiment, the lens assembly 420 may be accommodated in the camera housing 410 in a state of being coupled to the actuating unit 430. For example, the lens assembly 420 may be coupled to (or, mounted on) at least a portion of the actuating unit 430 and may be configured to move together with the actuating unit 430 relative to the camera housing 410 in one or more directions.

In an embodiment, the actuating unit 430 may move the lens assembly 420 relative to the camera housing 410 (or, the image sensor fixed to the camera housing 410). The actuating unit 430 may be coupled with the lens assembly 420 and may be disposed such that at least a portion of the actuating unit 430 is movable relative to the camera housing 410 in the direction of the optical axis OA or directions substantially perpendicular to the optical axis OA. For example, all and/or part of the actuating unit 430 may move in the direction of the optical axis OA (e.g., the z-axis direction) or the directions substantially perpendicular to the optical axis OA (e.g., the x-axis direction and/or the y-axis direction) in a state in which the actuating unit 430 is partially accommodated in the camera housing 410, and the lens assembly 420 may move together with the actuating unit 430.

The camera module 400 according to embodiments of the disclosure may provide an auto focus (AF) function and an optical image stabilization (OIS) function by controlling movement of the actuating unit 430. For example, the camera module 400 may be configured to perform the auto focus function by moving a portion of the actuating unit 430 in the direction of the optical axis OA. The camera module 400 may provide the optical image stabilization function (e.g., a camera-shake correction function) by moving a portion of the actuating unit 430 in the directions substantially perpendicular to the optical axis OA.

FIG. 5 is an exploded perspective view of the camera module according to an embodiment.

Referring to FIG. 5, the camera module 400 according to an embodiment may include the camera housing 410, the lens assembly 420, the actuating unit 430, an image sensor assembly 491, and a substrate member 494.

At least some of the components of the camera module 400 illustrated in FIG. 5 may be identical or similar to some of the components of the camera module 400 illustrated in FIGS. 4A and 4B, and repetitive descriptions will hereinafter be omitted.

In an embodiment, the camera housing 410 may include the base 413 on which the actuating unit 430 is seated and the cover 411 coupled with the base 413. For example, the cover 411 and the base 413 may form an inner space. In an embodiment, the lens assembly 420, the actuating unit 430, and the substrate member 494 may be disposed in the inner space.

In an embodiment, the cover 411 may have the opening 4112 formed therein in which at least a portion of the lens assembly 420 and at least a portion of the actuating unit 430 are accommodated. For example, the opening 4112 may overlap the lens assembly 420 and the actuating unit 430 in the direction of the optical axis OA. The cover 411 may perform a function of shielding electro-magnetic interference (EMI). For example, the cover 411 may be formed of a metallic material and may be referred to as a shield can (or, an EMI shield can).

In an embodiment, the base 413 may support the actuating unit 430, the image sensor assembly 491, and the substrate member 494. The base 413 may include a first surface 414 (e.g., a surface facing the +z-axis direction) that faces the cover 411 and a second surface 415 (e.g., a surface facing the −z-axis direction) that faces away from the first surface 414. For example, the actuating unit 430 and the substrate member 494 may be disposed on the first surface 414 of the base 413, and the image sensor assembly 491 may be disposed on the second surface 415.

In an embodiment, the base 413 may include a plurality of extending portions 416 partially brought into contact with inside surfaces 4114 of the cover 411 when the base 413 is coupled with the cover 411. For example, the plurality of extending portions 416 may provide a function of guiding the coupling of the base 413 and the cover 411. The plurality of extending portions 416 may extend in a substantially vertical direction from partial regions of the first surface 414 of the base 413. For example, the plurality of extending portions 416 may be formed on corner portions of the first surface 414. According to the illustrated embodiment, the base 413 may be formed in a substantially quadrangular shape, and four extending portions 416 may be formed on the corner portions of the first surface 414. However, the disclosure is not limited thereto. At least some of the plurality of extending portions 416 may support a portion of the substrate member 494. For example, at least some of the plurality of extending portions 416 may be surrounded by a second sub-substrate 494b of the substrate member 494.

In an embodiment, the base 413 may include coupling portions 418 to which the actuating unit 430 is coupled. For example, the coupling portions 418 may extend in a substantially vertical direction from the first surface 414 of the base 413. Portions of the actuating unit 430 may be coupled to the coupling portions 418, and the actuating unit 430 may be configured such that at least a portion of the actuating unit 430 moves relative to the base 413 in the state in which the actuating unit 430 is supported by the coupling portions 418. A coupling structure of the actuating unit 430 and the base 413 will be described below with reference to FIG. 17.

In an embodiment, the base 413 may have, in at least a portion of the base 413, a second opening 417 through which the lens assembly 420 and the image sensor assembly 491 face each other. For example, the second opening 417 may penetrate the first surface 414 and the second surface 415. The second opening 417 may be aligned with the lens assembly 420 and the image sensor 493 with respect to the optical axis OA. For example, the second opening 417 may overlap the opening 4112 of the cover 411 and a receiving hole 445 of the actuating unit 430 in the direction of the optical axis OA. External light passing through the lens assembly 420 may be incident on the image sensor 493 through the second opening 417.

In an embodiment, the lens assembly 420 may be coupled to the actuating unit 430 (e.g., an auto focus (AF) driving unit 430-1) so as to move together with the actuating unit 430. For example, at least a portion of the lens assembly 420 may be accommodated in the receiving hole 445 of the actuating unit 430 and may be fitted into the receiving hole 445. The lens assembly 420 may include at least one lens 421 and the lens barrel 423 in which the lens 421 is accommodated. For example, the lens barrel 423 may be fitted into the receiving hole 445 of the actuating unit 430.

In an embodiment, the lens assembly 420 may move relative to the camera housing 410 and the image sensor assembly 491 in response to movement of the actuating unit 430. For example, as the lens assembly 420 moves in the direction of the optical axis OA (e.g., the z-axis direction), the distance between the lens 421 and the image sensor 493 in the direction of the optical axis OA may be changed (e.g., the AF function). For example, as the lens assembly 420 moves in the directions substantially perpendicular to the optical axis OA (e.g., the x-axis direction and/or the y-axis direction), the optical axis OA may be located so as not to be aligned with the center of the image sensor 493 (e.g., the OIS function).

In an embodiment, the actuating unit 430 may be configured to partially move in the camera housing 410 in the direction of the optical axis OA and one or more directions substantially perpendicular to the optical axis OA. The actuating unit 430 may be a component for moving the lens assembly 420 relative to the camera housing 410 and the image sensor 493, and the lens assembly 420 may be coupled to a part (e.g., the auto focus (AF) driving unit 430-1) of the actuating unit 430 such that the lens assembly 420 moves together with the actuating unit 430 when the actuating unit 430 moves. The actuating unit 430 may include the receiving hole 445 into which at least a portion of the lens assembly 420 is fitted.

In an embodiment, the actuating unit 430 may include the auto focus driving unit 430-1 (hereinafter, referred to as the AF driving unit) and an optical image stabilization driving unit 430-2 (hereinafter, referred to as the OIS driving unit). In various embodiments, the OIS driving unit 430-2 may be referred to as a camera-shake correction driving unit. Furthermore, the AF driving unit 430-1 may be referred to as an AF driving module, and the OIS driving unit 430-2 may be referred to as an OIS driving module. The AF driving unit 430-1 may be configured to move the lens assembly 420 in the direction of the optical axis OA. The OIS driving unit 430-2 may be configured to move the lens assembly 420 in the directions substantially perpendicular to the optical axis OA. For example, at least a portion of the OIS driving unit 430-2 may move in the directions substantially perpendicular to the optical axis OA together with the AF driving unit 430-1 and the lens assembly 420. For example, at least a portion of the AF driving unit 430-1, together with the lens assembly 420, may move in the direction of the optical axis OA with respect to the OIS driving unit 430-2.

In an embodiment, the actuating unit 430 may be configured such that the lens assembly 420 is coupled to the AF driving unit 430-1 and the AF driving unit 430-1 is coupled to the OIS driving unit 430-2. For example, the receiving hole 445 to which the lens assembly 420 is coupled may be formed in the AF driving unit 430-1. Accordingly, the lens assembly 420 may move together with the AF driving unit 430-1 when the AF driving unit 430-1 moves. For example, the AF driving unit 430-1 may be seated on an upper portion of the OIS driving unit 430-2. Accordingly, the AF driving unit 430-1 may move together with the OIS driving unit 430-2 when the OIS driving unit 430-2 moves.

In an embodiment, the AF driving unit 430-1 may be configured such that at least a portion of the AF driving unit 430-1 moves relative to the OIS driving unit 430-2 and the camera housing 410 in the direction of the optical axis OA (e.g., the z-axis direction). For example, the AF driving unit 430-1 may include a first carrier 440 to which the lens assembly 420 is coupled and a first piezoelectric motor 450 that provides a driving force for moving the first carrier 440 in the direction of the optical axis OA. At least a portion of the first piezoelectric motor 450 may be fixed to the OIS driving unit 430-2, and the first carrier 440 may be moved in the direction of the optical axis OA relative to the OIS driving unit 430-2 and the camera housing 410 by the driving force generated from the first piezoelectric motor 450. For example, the first carrier 440 may be referred to as an AF carrier, and the first piezoelectric motor 450 may be referred to as an AF piezoelectric motor.

In an embodiment, the OIS driving unit 430-2 may be configured such that at least a portion of the OIS driving unit 430-2 moves relative to the camera housing 410 (in particular, the base 413) in the directions substantially perpendicular to the optical axis OA (e.g., the x-axis direction and the y-axis direction). For example, the OIS driving unit 430-2 may include a second carrier 460 on which the AF driving unit 430-1 is seated and second piezoelectric motors 470 that provide driving forces for moving the second carrier 460 in the directions substantially perpendicular to the optical axis OA. The second piezoelectric motors 470 may be connected to the second carrier 460 and the base 413, and the second carrier 460 may be moved in the directions substantially perpendicular to the optical axis OA relative to the camera housing 410 by the driving forces generated from the second piezoelectric motors 470. When the second carrier 460 moves, the AF driving unit 430-1 seated on the second carrier 460 may move together with the second carrier 460. For example, the second carrier 460 may be referred to as an OIS carrier, and the second piezoelectric motors 470 may be referred to as OIS piezoelectric motors.

In an embodiment, movement of the second carrier 460 of the OIS driving unit 430-2 in the direction of the optical axis OA may be limited. For example, the OIS driving unit 430-2 may be coupled to the base 413 such that movement of the second carrier 460 in the x-axis direction and the y-axis direction is possible and movement of the second carrier 460 in the z-axis direction is limited. Accordingly, the actuating unit 430 may be configured such that the first carrier 440 moves in the z-axis direction with respect to the second carrier 460.

According to an embodiment, the lens assembly 420 may be configured to move relative to the image sensor 493 in response to movement of the first carrier 440 and the second carrier 460. For example, the lens assembly 420 may move together with the second carrier 460 when the second carrier 460, together with the first carrier 440, moves in the x-axis direction and the y-axis direction relative to the base 413. For example, the lens assembly 420 may move together with the first carrier 440 when the first carrier 440 moves in the z-axis direction relative to the OIS driving unit 430-2. Components and driving operations of the AF driving unit 430-1 and the OIS driving unit 430-2 will be described below in more detail.

In an embodiment, the image sensor assembly 491 may be fixed to the camera housing 410. For example, the image sensor assembly 491 may be fixedly disposed on the second surface 415 of the base 413. When the lens assembly 420 moves, the image sensor assembly 491 may remain fixed to the camera housing 410, and the position of the image sensor assembly 491 relative to the lens assembly 420 may be changed.

In an embodiment, the image sensor assembly 491 may include a circuit board 492 fixedly disposed on the base 413 and the image sensor 493 disposed on one surface (e.g., a surface facing the +z-axis direction) of the circuit board 492 to face the lens assembly 420. Although not illustrated, according to various embodiments, the image sensor assembly 491 may further include an optical filter (e.g., an infrared filter) disposed to cover the image sensor 493.

In an embodiment, the circuit board 492 may be fixedly disposed on the second surface 415 of the base 413 through various methods. For example, the circuit board 492 may be attached or soldered to the second surface 415 of the base 413, but the disclosure is not limited thereto. According to various embodiments, the circuit board 492 may be electrically connected to a main board (e.g., the printed circuit board 350 of FIG. 3C) of an electronic device (e.g., the electronic device 300 of FIGS. 3A to 3C) through a connecting member (not illustrated).

In an embodiment, the image sensor 493 may be disposed on one surface (e.g., a surface facing the +z-axis direction) of the circuit board 492 so as to be partially aligned with the optical axis OA. For example, the image sensor 493 may overlap the second opening 417 of the base 413 and may face the lens assembly 420 through the second opening 417. The image sensor 493 may be electrically connected with the circuit board 492. For example, the image sensor 493 may be mounted on one surface of the circuit board 492 by surface mount technology (SMT), but is not limited thereto. The image sensor 493 may be configured to receive light passing through the lens 421 of the lens assembly 420 and generate an electrical signal based on the received light signal.

In an embodiment, as the image sensor 493 is fixed to the camera housing 410, the position of the image sensor 493 relative to the lens assembly 420 may be changed in response to movement of the lens assembly 420. For example, when the auto focus function is performed, the position of the image sensor 493 relative to the lens assembly 420 in the direction of the optical axis OA may be changed. For example, when the optical image stabilization function is performed, the position of the image sensor 493 relative to the lens assembly 420 in the directions substantially perpendicular to the optical axis OA may be changed. According to an embodiment, when the optical image stabilization function is performed, the optical axis OA of the lens 421 may pass through the center of the image sensor 493 in a default state (or, an initial state) in which the lens assembly 420 is not moved, and as the lens assembly 420 moves in the directions substantially perpendicular to the optical axis OA, the optical axis OA of the lens 421 may be located so as not to be aligned with the center of the image sensor 493.

In an embodiment, the substrate member 494 may be supported by the base 413. The substrate member 494 may be electrically connected with the first piezoelectric motor 450 and/or the second piezoelectric motors 470 of the actuating unit 430. For example, the substrate member 494 may be electrically connected with the first piezoelectric motor 450 and/or the second piezoelectric motors 470 through a connecting member (not illustrated). The substrate member 494 may be electrically connected with the printed circuit board 350 (e.g., the main board) of the electronic device 300 and may be configured to transmit an electrical signal to the first piezoelectric motor 450 and the second piezoelectric motors 470. For example, the substrate member 494 may be electrically connected with the printed circuit board 350 through a connecting member (not illustrated), or may be connected to the circuit board 492 of the image sensor assembly 491 and accordingly may be electrically connected with the printed circuit board 350 through the circuit board 492.

In an embodiment, the substrate member 494 may include a first sub-substrate 494a and the second sub-substrate 494b. For example, the first sub-substrate 494a may be electrically connected with the second piezoelectric motors 470, and the second sub-substrate 494b may be electrically connected with the first piezoelectric motor 450. However, the disclosure is not limited thereto. According to various embodiments, the first sub-substrate 494a and the second sub-substrate 494b may include a printed circuit board (PCB), a flexible printed circuit board (FPCB), or a rigid-flexible printed circuit board (RFPCB).

In an embodiment, the first sub-substrate 494a may be disposed on the first surface 414 of the base 413. For example, the first sub-substrate 494a may be attached to the first surface 414 to face the actuating unit 430. An opening region (not illustrated) corresponding to the second opening 417 of the base 413 may be formed in the first sub-substrate 494a.

In an embodiment, the second sub-substrate 494b may be disposed to surround some of the extending portions 416 of the base 413. The second sub-substrate 494b may be disposed partially substantially perpendicular to the first sub-substrate 494a.

The number, shape, or positions of substrate members 494 illustrated in FIG. 5 are illustrative and are not limited to the illustrated embodiment. For example, the substrate member 494 may be provided in a form in which the first sub-substrate 494a and the second sub-substrate 494b are connected or integrally formed with each other. Alternatively, for example, the substrate member 494 may not include at least one of the first sub-substrate 494a or the second sub-substrate 494b, or may further include another sub-substrate.

Figure 6:
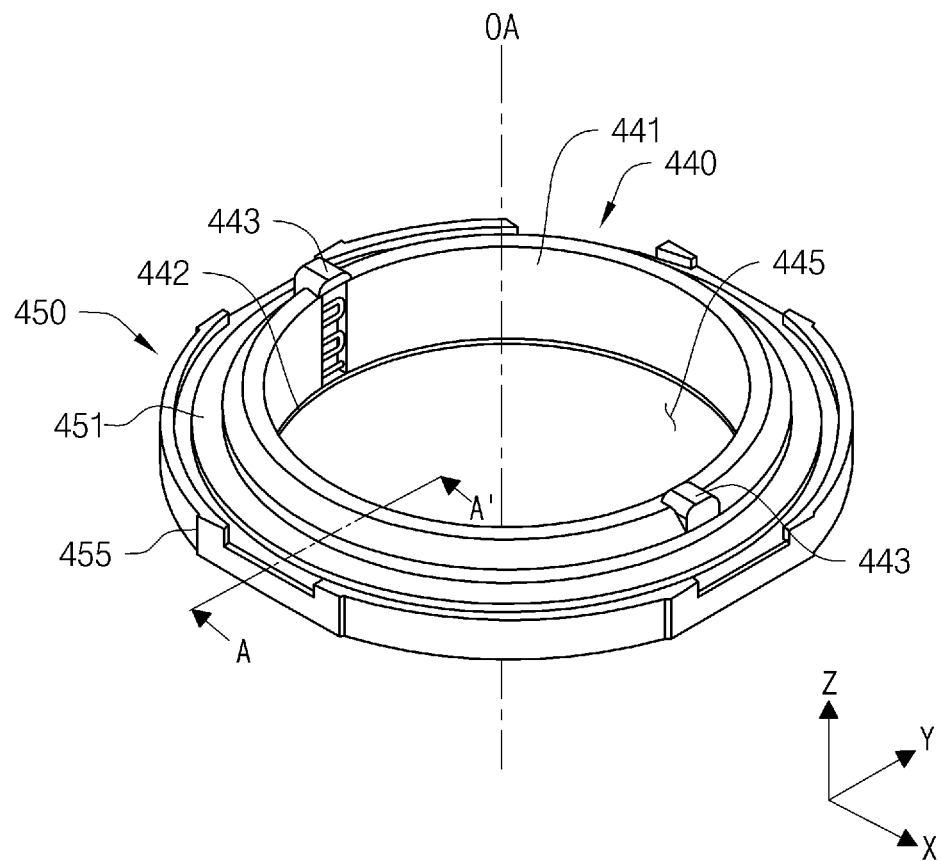
FIG. 6 is a perspective view of an auto focus (AF) driving unit of the camera module according to an embodiment.
Figure 7:
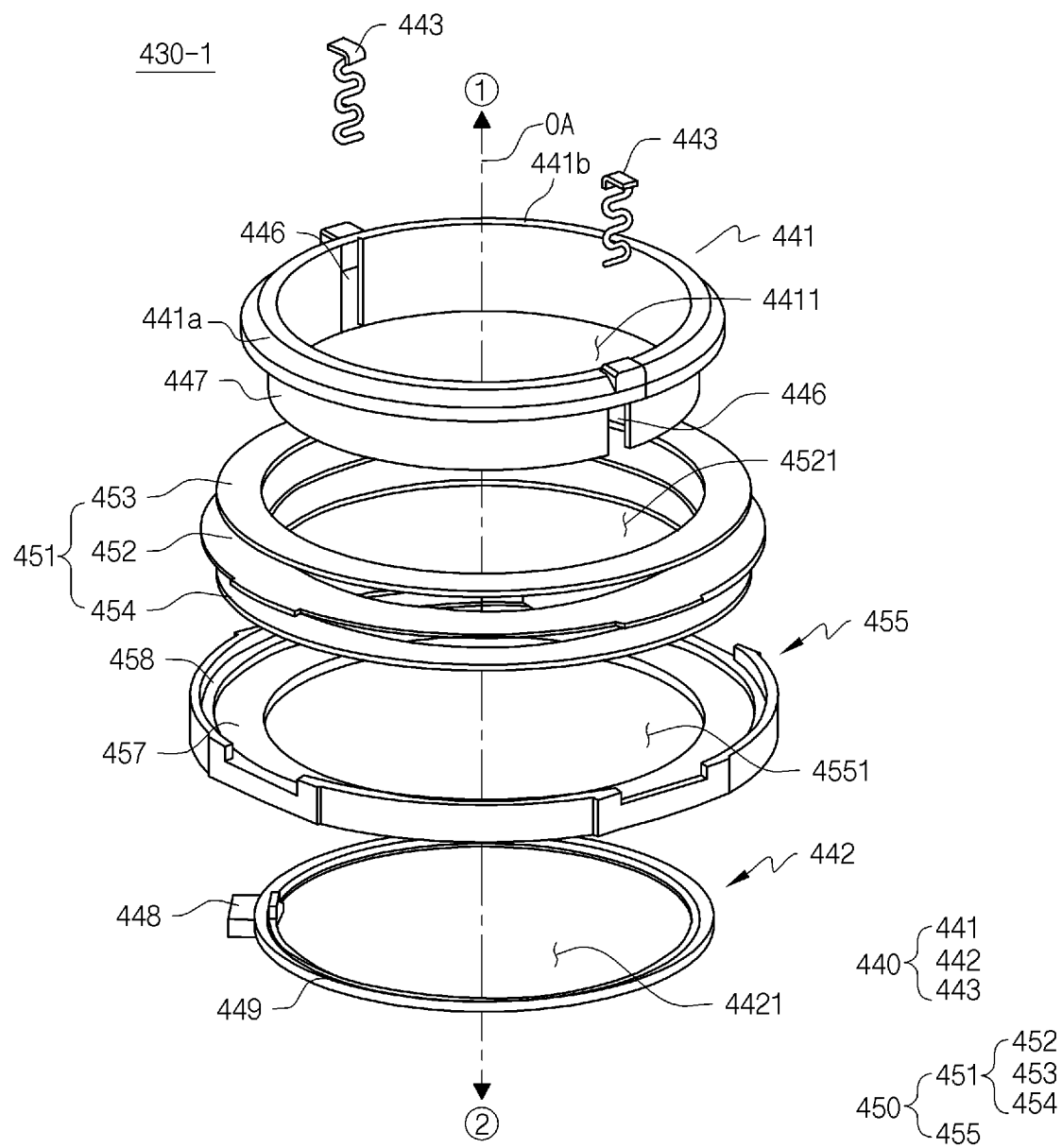
FIG. 7 is an exploded perspective view of the auto focus (AF) driving unit of the camera module according to an embodiment.
Figure 8:
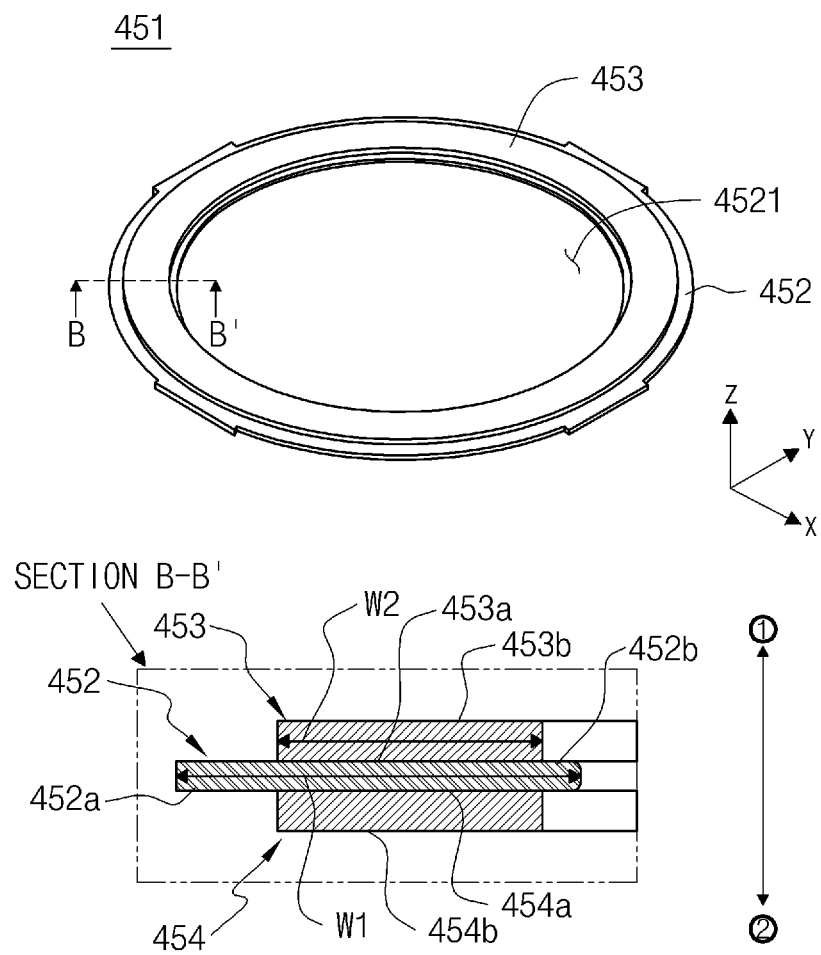
FIG. 8 illustrates a portion of a first piezoelectric motor of the auto focus (AF) driving unit according to an embodiment.

FIG. 6 is a perspective view of the auto focus (AF) driving unit of the camera module according to an embodiment. FIG. 7 is an exploded perspective view of the auto focus (AF) driving unit of the camera module according to an embodiment. FIG. 8 illustrates a portion of the first piezoelectric motor of the auto focus (AF) driving unit according to an embodiment.

FIG. 8 illustrates a perspective view and a sectional view of a piezoelectric element assembly of the first piezoelectric motor. For example, the sectional view of FIG. 8 is taken along line B-B' based on the perspective view of the piezoelectric element assembly.

Referring to FIGS. 6, 7, and 8, the AF driving unit 430-1 of the camera module according to an embodiment (e.g., the camera module 400 of FIGS. 4A, 4B, and 5) may include the first carrier 440 and the first piezoelectric motor 450. As described above, the lens assembly (e.g., the lens assembly 420 of FIG. 5) may be coupled to the receiving hole 445 of the first carrier 440, and the first piezoelectric motor 450 may generate a driving force for moving the first carrier 440 in the direction of the optical axis OA.

In an embodiment, at least a portion of the first carrier 440 may be accommodated in the first piezoelectric motor 450. For example, the first carrier 440 may be fitted into the first piezoelectric motor 450, and accordingly, at least a portion of an outer circumferential surface of the first carrier 440 may be surrounded by the first piezoelectric motor 450. The first carrier 440 may be moved in the direction of the optical axis OA by the driving force provided from the first piezoelectric motor 450. For example, the first carrier 440 may move in the direction of the optical axis OA based on a portion of the first piezoelectric motor 450 that is relatively fixed with respect to the movement of the first carrier 440.

In an embodiment, the first carrier 440 may include a first frame 441, a coupling ring 442, and elastic members 443.

In an embodiment, the first frame 441 may be a component to which the lens assembly 420 is coupled and may have, in a central portion of the first frame 441, a first opening region 4411 in which the lens assembly 420 is accommodated. For example, the first opening region 4411 of the first frame 441, together with a second opening region 4421 of the coupling ring 442, may form the receiving hole 445 into which the lens assembly 420 is fitted.

In an embodiment, the first frame 441 may be configured such that a sidewall 447 is brought into close contact with a portion of the first piezoelectric motor 450. For example, the first frame 441 may be surrounded by the first piezoelectric motor 450 and may be brought into close contact with a metal plate 452 of the first piezoelectric motor 450. The first frame 441 may be configured to move (e.g., refer to FIGS. 9A and 9B) in the direction of the optical axis OA by bending deformation of the metal plate 452 in the state of being brought into contact with the metal plate 452.

In an embodiment, the first frame 441 may be formed in a structure divided into a first portion 441a and a second portion 441b, and the elastic members 443 may be disposed between the first portion 441a and the second portion 441b. For example, recesses 446 in which the elastic members 443 are disposed may be formed between the first portion 441a and the second portion 441b of the first frame 441. The elastic members 443 embedded between the first portion 441a and the second portion 441b may apply elastic forces to the first frame 441 in directions in which the first portion 441a and the second portion 441b move away from each other. For example, the first frame 441 may remain in a state in which a predetermined pre-load is applied by the elastic members 443 and accordingly may be formed in a structure in which the sidewall 447 is uniformly brought into close contact with the metal plate 452 of the first piezoelectric motor 450.

In an embodiment, the coupling ring 442 may be coupled to a lower end portion (e.g., an end portion facing the −z-axis direction) of the first frame 441. For example, the coupling ring 442 may be coupled to the first portion 441a and the second portion 441b of the first frame 441 to allow the first frame 441 to remain under the predetermined pre-load. The coupling ring 442 may be attached to the lower end portion of the first frame 441. The coupling ring 442 may have the second opening region 4421 formed therein in which the lens assembly 420 is accommodated. For example, the second opening region 4421 may form the receiving hole 445 together with the first opening region 4411 of the first frame 441.

In an embodiment, the coupling ring 442 may prevent separation of the first carrier 440 from the first piezoelectric motor 450. For example, the coupling ring 442 may be coupled to the first frame 441 so as to be located under the first piezoelectric motor 450 (e.g., in the −z-axis direction) in the state in which the first frame 441 is accommodated in the first piezoelectric motor 450. In response to movement of the first frame 441, a peripheral portion 449 of the coupling ring 442 may be brought into contact with a holder 455 of the first piezoelectric motor 450 to prevent separation of the first frame 441 from the first piezoelectric motor 450. For example, when the first frame 441 moves a specified distance in the +z-axis direction, the coupling ring 442 may make contact with the holder 455 to provide a stopper function. The peripheral portion 449 of the coupling ring 442 may be formed to be larger than an opening 4551 formed in the holder 455.

In an embodiment, the coupling ring 442 may include a magnet receiving portion 448 in which a sensing magnet (not illustrated) for sensing movement of the first carrier 440 is disposed. For example, the magnet receiving portion 448 may extend from one side of the peripheral portion 449.

In an embodiment, the elastic members 443 may apply elastic forces to the first frame 441 such that the first frame 441 and the first piezoelectric motor 450 are mechanically uniformly brought into contact with each other. The elastic members 443 may be disposed between the first portion 441a and the second portion 441b of the first frame 441. For example, the elastic members 443 may be coupled to the recesses 446 between the first portion 441a and the second portion 441b and may generate elastic forces in the directions in which the first portion 441a and the second portion 441b move away from each other. The elastic members 443 may be compressed by a predetermined displacement when fitted into the recesses 446, and elastic forces may be applied to the first portion 441a and the second portion 441b by the compressed elastic members 443. For example, to eliminate a clearance or gap between the first frame 441 and the metal plate 452, the elastic members 443 may generate elastic forces to allow the first portion 441a and the second portion 441b to remain in a state in which a pre-load is applied in a direction away from the optical axis OA.

In an embodiment, the elastic members 443 may be compression or tension springs. However, without being limited thereto, the elastic members 443 may be implemented using various materials capable of applying elastic forces to the first portion 441a and the second portion 441b. According to various embodiments, the elastic members 443 may be elastic bodies including rubber, elastomer, or polyurethane. For example, the elastic bodies may have an outer shape corresponding to the recesses 446 so as to be fitted into the recesses 446 and, when the elastic bodies are fitted into the recesses 446, the elastic bodies may generate elastic forces while the outer shape is deformed by an external force.

According to the illustrated embodiment, two elastic members 443 may be disposed between the first portion 441a and the second portion 441b. However, this is illustrative, and the disclosure is not limited thereto. According to various embodiments (not illustrated), the first frame 441 may have a structure divided into a first portion 441a, a second portion 441b, and a third portion, and three elastic members 443 may be disposed between the first portion 441a and the second portion 441b, between the second portion 441b and the third portion, and between the third portion and the first portion 441a. However, the shape or type of the elastic members 443 is not limited to the illustrated embodiment. For example, the elastic members 443 according to the illustrated embodiment may have the form of a plate spring or a clip spring. However, according to various embodiments, the elastic members 443 may have the form of a coil spring (e.g., refer to FIG. 10A).

In an embodiment, the first piezoelectric motor 450 may include the piezoelectric element assembly 451 and the holder 455.

In an embodiment, the piezoelectric element assembly 451 may be disposed in the holder 455. A portion of the piezoelectric element assembly 451 may be fixed to and supported by the holder 455, and the remaining portion may generate vibration displacement while being bent in the direction of the optical axis OA with respect to the fixed portion. For example, the piezoelectric element assembly 451 may be partially bent as a first piezoelectric element 453 and 454 is expanded or contracted when a voltage is applied to the first piezoelectric element 453 and 454.

In an embodiment, the piezoelectric element assembly 451 may include the metal plate 452 and the first piezoelectric element 453 and 454. The first piezoelectric element 453 and 454 may include the first sub-piezoelectric element 453 and the second sub-piezoelectric element 454. The piezoelectric element assembly 451 may be formed in a shape corresponding to the first carrier 440. According to the illustrated embodiment, the piezoelectric element assembly 451 may have a circular ring shape to correspond to the first carrier 440. For example, the metal plate 452 and the first piezoelectric element 453 and 454 may be formed in an annular shape. However, without being limited to the illustrated embodiment, the shape of the piezoelectric element assembly 451 may be diversely modified. In another example, the first piezoelectric element 453 and 454 may be constituted by one of the first sub-piezoelectric element 453 and the second sub-piezoelectric element 454.

In an embodiment, the metal plate 452 may be brought into close contact with the sidewall 447 while surrounding the sidewall 447 of the first frame 441. For example, the metal plate 452 may have an opening 4521 into which the sidewall 447 of the first frame 441 is inserted. The opening 4521 may penetrate a central region of the metal plate 452. For example, the metal plate 452 may be configured such that the sidewall 447 of the first frame 441 is fitted into the opening 4521. Accordingly, when vibration displacement occurs in the metal plate 452, the first frame 441 may be moved in the direction of the optical axis OA in response to the vibration displacement.

In an embodiment, the metal plate 452 may be formed of a material having a predetermined elasticity. For example, the metal plate 452 may be formed of a metal elastic body capable of being partially bent by deformation of the first piezoelectric element 453 and 454. The first sub-piezoelectric element 453 and the second sub-piezoelectric element 454 may be coupled to opposite surfaces of the metal plate 452. For example, the metal plate 452 may be configured such that the first sub-piezoelectric element 453 is attached to a surface facing a first optical axis direction ① and the second sub-piezoelectric element 454 is attached to a surface facing a second optical axis direction ②. According to various embodiments, only one of the first sub-piezoelectric element 453 and the second sub-piezoelectric element 454 may be attached to the metal plate 452.

In an embodiment, at least a portion of the metal plate 452 may be fixed to the holder 455. For example, an outer end portion 452a of the metal plate 452 may be fixed to a step portion 458 of the holder 455. The metal plate 452 may be formed such that the outer end portion 452a is a fixed end fixed to the holder 455 and an inner end portion 452b is a free end at which vibration displacement occurs with respect to the outer end portion 452a. For example, to secure a fixed end portion fixed to the holder 455, the width W1 of the section of the metal plate 452 may be greater than the width W2 of the section of the first piezoelectric element 453 and 454.

In an embodiment, when a voltage is applied to the first piezoelectric element 453 and 454, mechanical displacement such as expansion or contraction may occur depending on the direction of an electric field and the poling direction of the first piezoelectric element 453 and 454. For example, each of the first sub-piezoelectric element 453 and the second sub-piezoelectric element 454 may be deformed when a voltage is applied to each of the first sub-piezoelectric element 453 and the second sub-piezoelectric element 454. The first sub-piezoelectric element 453 and the second sub-piezoelectric element 454 may be formed by using various piezoelectric elements including piezo-ceramic, a piezo-polymer, or a piezo-composite. For example, the first sub-piezoelectric element 453 and the second sub-piezoelectric element 454 may be a lead zirconate titanate (PZT)-based piezoelectric ceramic, but is not limited thereto.

In an embodiment, the first sub-piezoelectric element 453 and the second sub-piezoelectric element 454 may be disposed on the opposite surfaces of the metal plate 452, respectively. For example, only one of an upper surface (e.g., a surface facing the first optical axis direction ①) and a lower surface (e.g., a surface facing the second optical axis direction ②) of each of the first sub-piezoelectric element 453 and the second sub-piezoelectric element 454 may be attached to the metal plate 452. The first sub-piezoelectric element 453 may include a first attached surface 453a that faces the second optical axis direction ② and that is attached to the metal plate 452 and a first non-attached surface 453b that faces away from the first attached surface 453a. The second sub-piezoelectric element 454 may include a second attached surface 454a that faces the first optical axis direction ① and that is attached to the metal plate 452 and a second non-attached surface 454b that faces away from the second attached surface 454a. According to embodiments of the disclosure, when a voltage is applied to the first piezoelectric element 453 and 454, the first piezoelectric element 453 and 454 may be expanded or contracted, and the expansion or contraction may cause bending deformation due to a difference in stiffness between the attached surfaces 453a and 454a and the non-attached surfaces 453b and 454b of the first piezoelectric element 453 and 454.

In an embodiment, the holder 455 may be a component that supports the piezoelectric element assembly 451, and a portion of the piezoelectric element assembly 451 may be fixed to at least a portion of the holder 455. The holder 455 may include a plate portion 457 in which the opening 4551 surrounding the first carrier 440 is formed and the step portion 458 extending along the periphery of the plate portion 457 in the first optical axis direction ①. For example, the step portion 458 may protrude from one surface of the plate portion 457 that faces toward the piezoelectric element assembly 451. Accordingly, a height difference may be generated between the step portion 458 and the plate portion 457. A portion of the metal plate 452 may be fixed to the step portion 458. For example, the outer end portion 452a of the metal plate 452 may be fixed to the step portion 458 through various methods.

In an embodiment, the holder 455 may be seated on the OIS driving unit (e.g., the second carrier 460 of the OIS driving unit 430-2 of FIG. 5). For example, the holder 455 may be seated on the upper portion of the OIS driving unit 430-2 to couple the AF driving unit 430-1 to the OIS driving unit 430-2. According to embodiments of the disclosure, the first piezoelectric motor 450 may be supported on the OIS driving unit 430-2 through the holder 455, and the first carrier 440 may be separated from the OIS driving unit 430-2 so as to be movable relative to the OIS driving unit 430-2. A coupling structure of the AF driving unit 430-1 and the OIS driving unit 430-2 will be described below with reference to FIG. 16.

Hereinafter, an operation in which the first carrier 440 is moved in the direction of the optical axis OA by the driving force of the first piezoelectric motor 450 will be described with reference to FIGS. 9A and 9B.

Figure 9A:
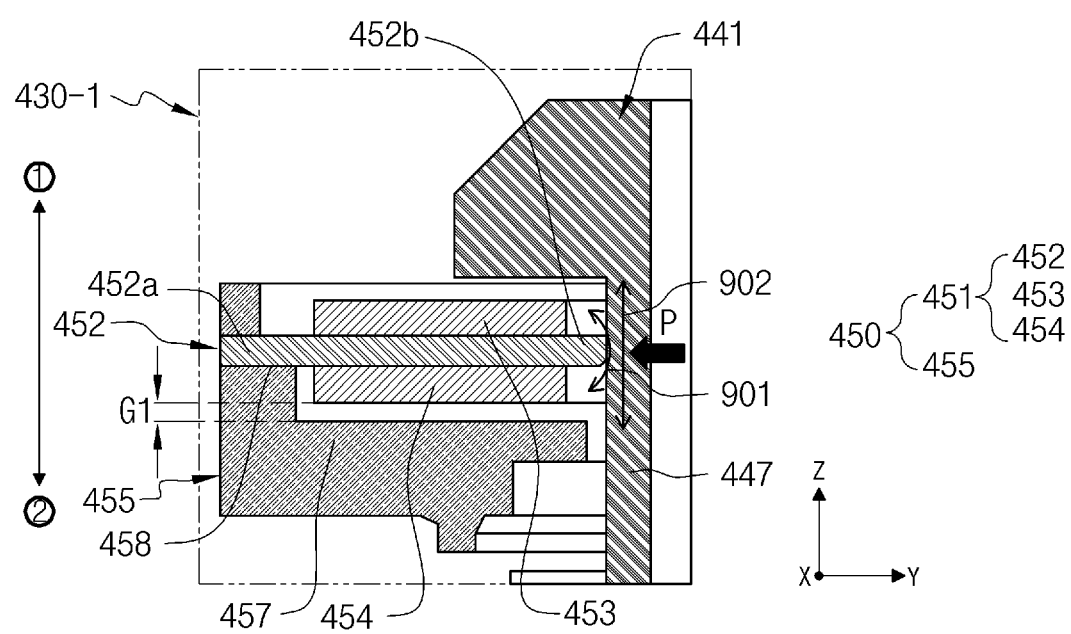
FIG. 9A illustrates an operation of the auto focus (AF) driving unit of the camera module according to an embodiment.

FIG. 9A illustrates an operation of the auto focus (AF) driving unit of the camera module according to an embodiment. FIG. 9B illustrates an operation of the first piezoelectric motor of the auto focus (AF) driving unit according to an embodiment.

FIG. 9A illustrates a section of the AF driving unit 430-1 taken along line A-A' illustrated in FIG. 6.

Figure 9B:
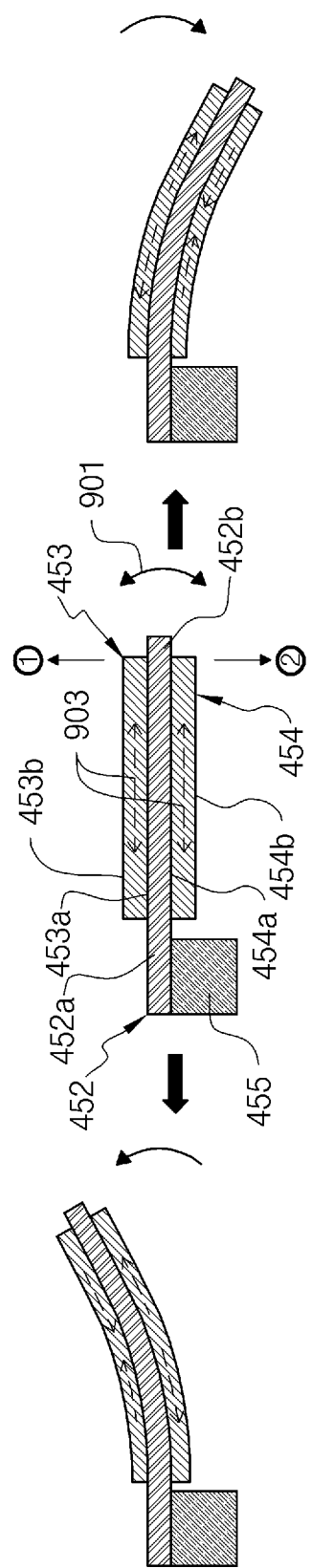
FIG. 9B illustrates an operation of the first piezoelectric motor of the auto focus (AF) driving unit according to an embodiment.

Referring to FIGS. 9A and 9B, the AF driving unit 430-1 according to an embodiment may include the first carrier 440 and the first piezoelectric motor 450. The first piezoelectric motor 450 may include the metal plate 452, the first sub-piezoelectric element 453, the second sub-piezoelectric element 454, and the holder 455.

The components of the AF driving unit 430-1 illustrated in FIGS. 9A and 9B are identical or similar to the components of the AF driving unit 430-1 illustrated in FIGS. 6 to 8, and repetitive descriptions will hereinafter be omitted.

In an embodiment, the first carrier 440 may be accommodated inside the metal plate 452. The first carrier 440 illustrated in FIGS. 9A and 9B may be referred to as the first frame 441. For example, the first frame 441 may be coupled to the opening of the metal plate 452 (e.g., the opening 4521 of FIGS. 7 and 8) so as to be brought into close contact with the metal plate 452. As a pre-load P is applied by the elastic members (e.g., the elastic members 443 of FIGS. 6 and 7) disposed between the first portion (e.g., the first portion 441a of FIG. 7) and the second portion (e.g., the second portion 441b of FIG. 7) of the first frame 441, the first frame 441 may remain uniformly brought into pressure contact with the inner end portion 452b of the metal plate 452. For example, the pre-load P may act in a direction to push the first frame 441 toward the inner end portion 452b of the metal plate 452.

In an embodiment, as the metal plate 452 causes bending displacement 901 in the first optical axis direction ① or the second optical axis direction ② with respect to the outer end portion 452a that is a fixed end, the first carrier 440 in contact with the inner end portion 452b of the metal plate 452 may move (902) together with the inner end portion 452b in the first optical axis direction ① or the second optical axis direction ②. The sidewall 447 may be spaced apart from the holder 455 such that the first carrier 440 is movable relative to the holder 455 in the direction of the optical axis OA.

In an embodiment, the first piezoelectric motor 450 may provide a driving force for moving the first carrier 440 in the direction of the optical axis OA by conversion of expansion or contraction of the first piezoelectric element 453 and 454 into the bending displacement 901 of the metal plate 452. For example, the first sub-piezoelectric element 453 and the second sub-piezoelectric element 454 may be expanded or contracted in a direction perpendicular to the optical axis OA, based on a voltage applied the first sub-piezoelectric element 453 and the second sub-piezoelectric element 454. The metal plate 452 may be bent in the first optical axis direction ① and the second optical axis direction ② by the expansion or contraction of the first piezoelectric element 453 and 454 to move (902) the first carrier 440 in the pressure contact state.

In an embodiment, the metal plate 452 may be configured such that the outer end portion 452a is fixed to the holder 455 and the inner end portion 452b is brought into close contact with the first frame 441. For example, the outer end portion 452a of the metal plate 452 may be fixed to the step portion 458 of the holder 455, and the inner end portion 452b may generate bending displacement of the metal plate 452 while moving in the direction of the optical axis OA with respect to the outer end portion 452a.

In an embodiment, the second sub-piezoelectric element 454 may be spaced apart from the plate portion 457 of the holder 455 by a predetermined gap G1. For example, the second sub-piezoelectric element 454 may have a smaller height than the step portion 458 so as to be spaced apart from the plate portion 457 by the predetermined gap G1 in the state in which the metal plate 452 is fixed to the step portion 458. The height may mean a length in the direction of the optical axis OA. As the second sub-piezoelectric element 454 and the plate portion 457 are spaced apart from each other, a space in which the metal plate 452 is able to be bent in the second optical axis direction ② may be secured.

Hereinafter, an operation in which the first piezoelectric element 453 and 454 and the metal plate 452 are bent by expansion or contraction of the first piezoelectric element 453 and 454 will be described with reference to FIG. 9B.

As illustrated in FIG. 9B, in the case in which the first piezoelectric element 453 and 454 and the metal plate 452 are coupled, expansion or contraction 903 of the first piezoelectric element 453 and 454 may be converted into the bending displacement 901 due to a difference in elastic modulus between the first piezoelectric element 453 and 454 and the metal plate 452.

In an embodiment, as the first sub-piezoelectric element 453 is contracted in the direction perpendicular to the optical axis OA and the second sub-piezoelectric element 454 is expanded in the direction perpendicular to the optical axis OA, the piezoelectric element assembly 451 may be bent in the first optical axis direction ① (e.g., deformation from the middle figure to the left figure of FIG. 9B). For example, as a voltage for contraction of the first sub-piezoelectric element 453 and a voltage for expansion of the second sub-piezoelectric element 454 are applied, the piezoelectric element assembly 451 may generate a driving force for moving the first carrier 440 in the first optical axis direction ①.

In an embodiment, the first sub-piezoelectric element 453 may be configured such that when the first sub-piezoelectric element 453 is contracted, the degree of contraction of a portion of the first sub-piezoelectric element 453 adjacent to the first attached surface 453a is lower than the degree of contraction of a portion of the first sub-piezoelectric element 453 adjacent to the first non-attached surface 453b due to a difference in stiffness between the first attached surface 453a and the first non-attached surface 453b. Accordingly, the first sub-piezoelectric element 453 may be bent toward the first non-attached surface 453b, and the metal plate 452, together with the first sub-piezoelectric element 453, may be bent in the first optical axis direction ① with respect to the outer end portion 452a fixed to the holder 455.

In an embodiment, the second sub-piezoelectric element 454 may be configured such that when the second sub-piezoelectric element 454 is expanded, the degree of expansion of a portion of the second sub-piezoelectric element 454 adjacent to the second attached surface 454a is lower than the degree of expansion of a portion of the second sub-piezoelectric element 454 adjacent to the second non-attached surface 454b due to a difference in stiffness between the second attached surface 454a and the second non-attached surface 454b. Accordingly, the second sub-piezoelectric element 454 may be bent toward the second attached surface 454a, and the metal plate 452, together with the second sub-piezoelectric element 454, may be bent in the first optical axis direction ① with respect to the outer end portion 452a fixed to the holder 455.

In an embodiment, as the first sub-piezoelectric element 453 is expanded in the direction perpendicular to the optical axis OA and the second sub-piezoelectric element 454 is contracted in the direction perpendicular to the optical axis OA, the piezoelectric element assembly 451 may be bent in the second optical axis direction ② (e.g., deformation from the middle figure to the right figure of FIG. 9B). For example, as a voltage for expansion of the first sub-piezoelectric element 453 and a voltage for contraction of the second sub-piezoelectric element 454 are applied, the piezoelectric element assembly 451 may generate a driving force for moving the first carrier 440 in the second optical axis direction ②.

In an embodiment, the first sub-piezoelectric element 453 may be configured such that when the first sub-piezoelectric element 453 is expanded, the degree of expansion of a portion of the first sub-piezoelectric element 453 adjacent to the first attached surface 453a is lower than the degree of expansion of a portion of the first sub-piezoelectric element 453 adjacent to the first non-attached surface 453b due to a difference in stiffness between the first attached surface 453a and the first non-attached surface 453b. Accordingly, the first sub-piezoelectric element 453 may be bent toward the first attached surface 453a, and the metal plate 452, together with the first sub-piezoelectric element 453, may be bent in the second optical axis direction ② with respect to the outer end portion 452a fixed to the holder 455.

In an embodiment, the second sub-piezoelectric element 454 may be configured such that when the second sub-piezoelectric element 454 is contracted, the degree of contraction of a portion of the second sub-piezoelectric element 454 adjacent to the second attached surface 454a is lower than the degree of contraction of a portion of the second sub-piezoelectric element 454 adjacent to the second non-attached surface 454b due to a difference in stiffness between the second attached surface 454a and the second non-attached surface 454b. Accordingly, the second sub-piezoelectric element 454 may be bent toward the second non-attached surface 454b, and the metal plate 452, together with the second sub-piezoelectric element 454, may be bent in the second optical axis direction ② with respect to the outer end portion 452a fixed to the holder 455.

Figure 10A:
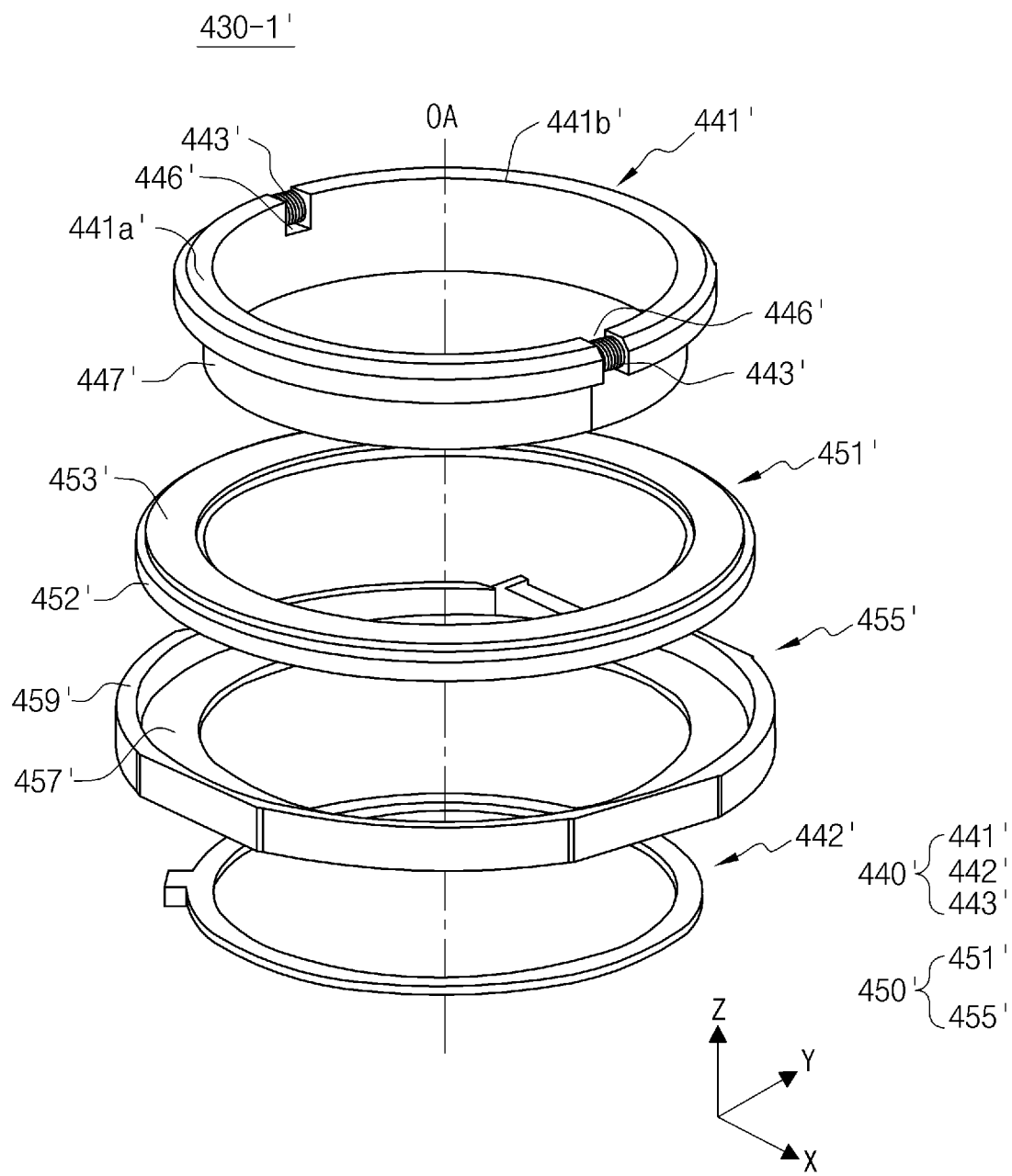
FIG. 10A is an exploded perspective view of an auto focus (AF) driving unit of the camera module according to an embodiment.
Figure 10B:
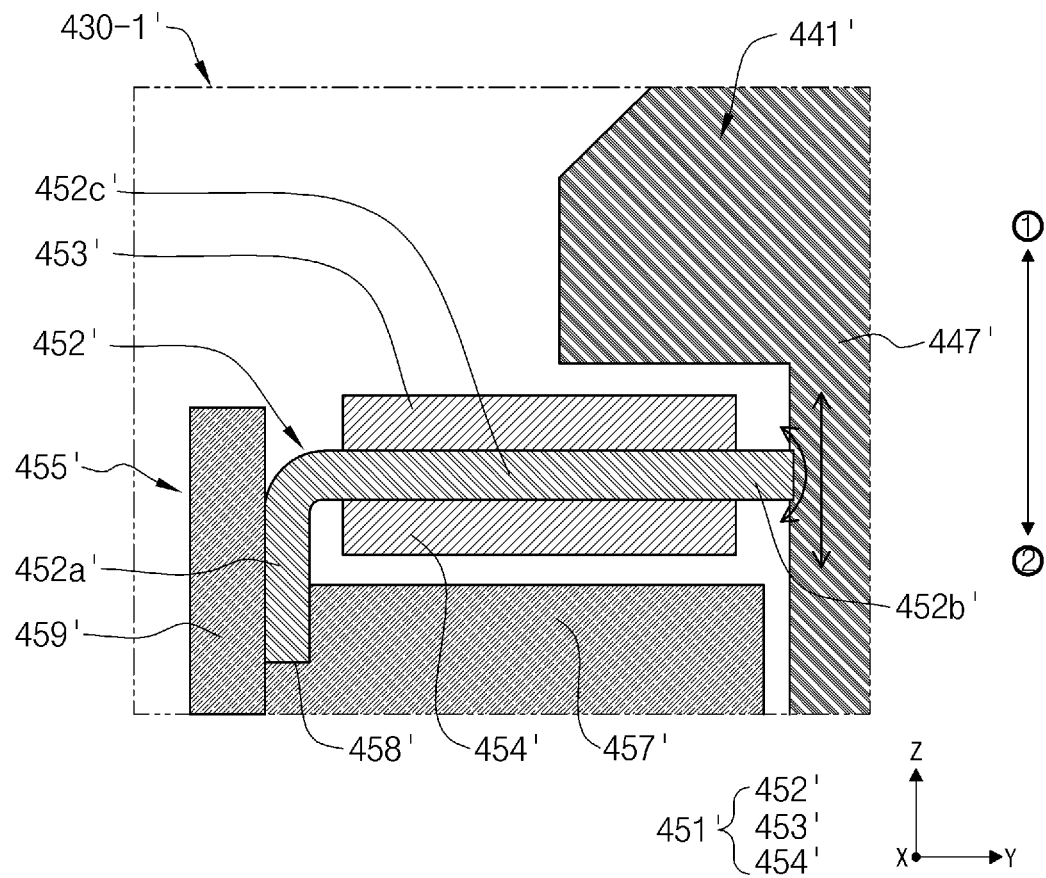
FIG. 10B is a sectional view of the auto focus (AF) driving unit of the camera module according to an embodiment.

FIG. 10A is an exploded perspective view of an auto focus (AF) driving unit of the camera module according to an embodiment. FIG. 10B is a sectional view of the auto focus (AF) driving unit of the camera module according to an embodiment.

FIGS. 10A and 10B are views illustrating the AF driving unit 430-1' according to another embodiment, and some of the components of the AF driving unit 430-1' illustrated in FIGS. 10A and 10B may be formed in different shapes from the components of the AF driving unit 430-1 illustrated in FIGS. 6 to 8. For example, the AF driving unit 430-1' of FIGS. 10A and 10B may partially differ from the AF driving unit 430-1 of FIGS. 6 to 8 in terms of the shapes of some components, but operations and functions of the components may be substantially the same or similar. Hereinafter, repetitive descriptions will be omitted, and the following description will be focused on changed portions.

Referring to FIGS. 10A and 10B, the AF driving unit 430-1' of the camera module 400 according to an embodiment (e.g., the AF driving unit 430-1 of FIGS. 6 and 7) may include a first carrier 440' (e.g., the first carrier 440 of FIGS. 6 and 7) and a first piezoelectric motor 450' (e.g., the first piezoelectric motor 450 of FIGS. 6 and 7).

In an embodiment, the first carrier 440' may include a first frame 441' (e.g., the first frame 441 of FIGS. 6 and 7), a coupling ring 442' (e.g., the coupling ring 442 of FIGS. 6 and 7), and elastic members 443' (e.g., the elastic members 443 of FIGS. 6 and 7). In an embodiment, the first frame 441' may be formed in a structure divided into a first portion 441a' and a second portion 441b', and the elastic members 443' may be disposed between the first portion 441a' and the second portion 441b'. For example, recesses 446' in which the elastic members 443' are disposed may be formed between the first portion 441a' and the second portion 441b' of the first frame 441'.

In an embodiment, the elastic members 443' may be disposed in the recesses 446' formed between the first portion 441a' and the second portion 441b' and may generate elastic forces in directions in which the first portion 441a' and the second portion 441b' move away from each other. For example, the elastic members 443' may be formed in a coil spring form. Opposite end portions of each of the elastic members 443' may be supported by inner walls of a corresponding recess 446' that face each other. The elastic members 443' may be compressed by a predetermined displacement when coupled to the recesses 446', and the elastic forces may be applied to the first portion 441a' and the second portion 441b' by the compressed elastic members 443'.

In an embodiment, the first piezoelectric motor 450' may include a piezoelectric element assembly 451' (e.g., the piezoelectric element assembly 451 of FIGS. 6 and 7) and a holder 455' (e.g., the holder 455 of FIGS. 6 and 7). The piezoelectric element assembly 451' may include a metal plate 452' (e.g., the metal plate 452 of FIGS. 7 and 8), a first sub-piezoelectric element 453' (e.g., the first sub-piezoelectric element 453 of FIGS. 7 and 8), and a second sub-piezoelectric element 454' (e.g., the second sub-piezoelectric element 454 of FIGS. 7 and 8).

In an embodiment, the metal plate 452' may be formed in a shape in which an outer end portion 452a' fixed to the holder 455' is bent. For example, the metal plate 452' may have a shape in which the outer end portion 452a' substantially perpendicularly extends from a central portion 452c'.

In an embodiment, the outer end portion 452a' of the metal plate 452' may be fixed to a support recess 458' or a support wall 459' of the holder 455'. As the outer end portion 452a' of the metal plate 452' extends from the central portion 452c' by a predetermined length in the second optical axis direction ②, the second sub-piezoelectric element 454' may be spaced apart from a plate portion 457' of the holder 455' when the outer end portion 452a' is fixed to the holder 455'. As the second sub-piezoelectric element 454' and the plate portion 457' are spaced apart from each other, a space in which the metal plate 452' is able to be bent in the second optical axis direction ② may be secured.

In an embodiment, an inner end portion 452b' of the metal plate 452' may be brought into close contact with a sidewall 447' of the first frame 441' by the elastic forces of the elastic members 443' embedded in the first frame 441'. The inner end portion 452b' of the metal plate 452' may generate bending displacement in the metal plate 452' while moving in the direction of an optical axis OA with respect to the outer end portion 452a'. The inner end portion 452b' of the metal plate 452' may make contact with the sidewall 447' of the first frame 441' and may maintain friction with the sidewall 447' of the first frame 441', and thus movement of the first frame 441' in the first optical axis direction ① or the second optical axis direction ② may be implemented.

In an embodiment, the holder 455' may include the plate portion 457', the support wall 459' extending from the plate portion 457' in the first optical axis direction ①, and the support recess 458' recessed from the plate portion 457' in the second optical axis direction ②. For example, the support wall 459' may extend along the periphery of the plate portion 457', and the support recess 458' may be recessed along an inner surface of the support wall 459' so as to be located between the support wall 459' and the plate portion 457'. A portion of the outer end portion 452' of the metal plate 452' may be inserted into the support recess 458', and one surface of the outer end portion 452a' of the metal plate 452' may be brought into contact with the support wall 459'. For example, the support recess 458' and the support wall 459' may be coupled or attached with the outer end portion 452a' such that the outer end portion 452a' of the metal plate 452' is fixed.

Figure 11:
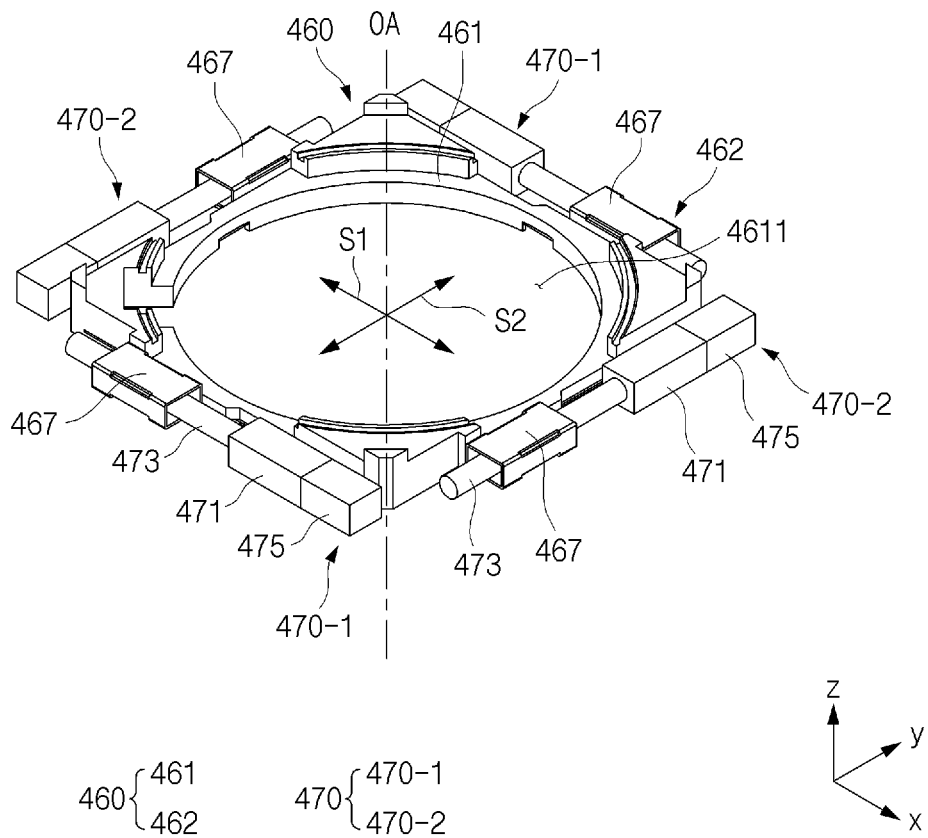
FIG. 11 is a perspective view of an optical image stabilization (OIS) driving unit of the camera module according to an embodiment.
Figure 12:
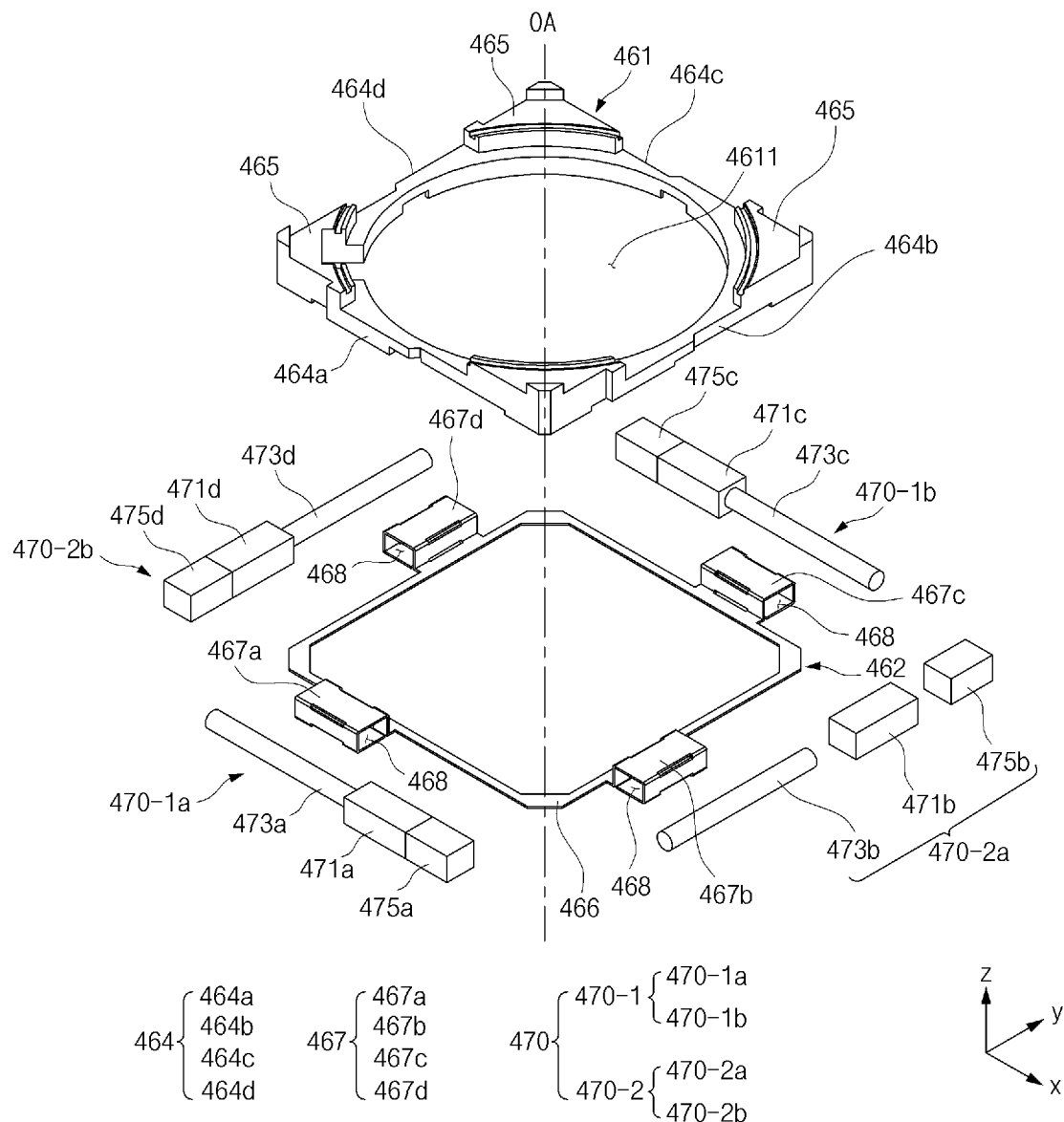
FIG. 12 is an exploded perspective view of the optical image stabilization (OIS) driving unit of the camera module according to an embodiment.
Figure 13:
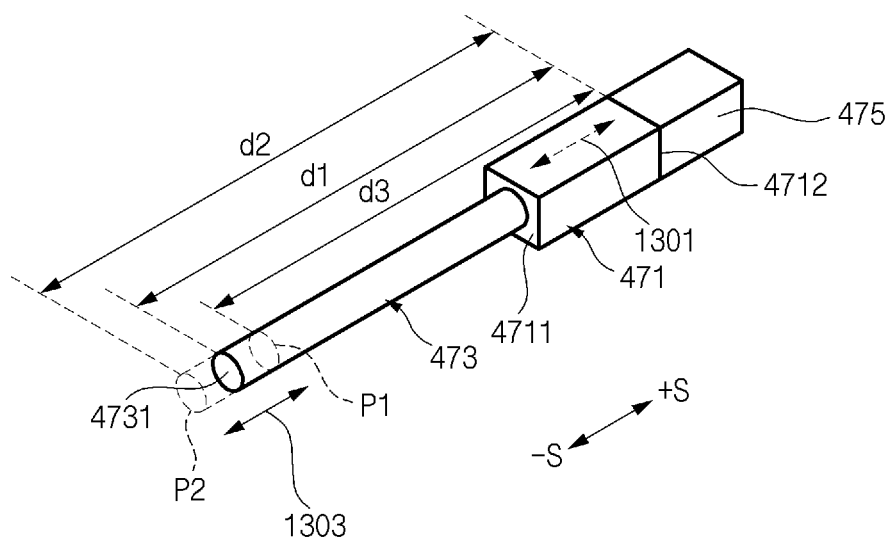
FIG. 13 illustrates a second piezoelectric motor of the optical image stabilization (OIS) driving unit according to an embodiment.

FIG. 11 is a perspective view of the optical image stabilization (OIS) driving unit of the camera module according to an embodiment. FIG. 12 is an exploded perspective view of the optical image stabilization (OIS) driving unit of the camera module according to an embodiment. FIG. 13 illustrates a second piezoelectric motor of the optical image stabilization (OIS) driving unit according to an embodiment.

Referring to FIGS. 11, 12, and 13, the OIS driving unit 430-2 according to an embodiment may include the second carrier 460 and the plurality of second piezoelectric motors 470. As described above, the second carrier 460 may be coupled with the holder of the AF driving unit 430-1 (e.g., the holder 455 of FIGS. 6 and 7) to move together with the AF driving unit (e.g., the AF driving unit 430-1 of FIGS. 5 to 7), and the second piezoelectric motors 470 may generate driving forces for moving the second carrier 460 in at least one direction substantially perpendicular to the optical axis OA.

In an embodiment, the plurality of second piezoelectric motors 470 may be coupled to side surfaces of the second carrier 460 that are substantially perpendicular to the optical axis OA. The second carrier 460 may be moved in the direction of at least one of a first shift axis S1 or a second shift axis S2 substantially perpendicular to the optical axis OA by driving forces provided from the second piezoelectric motors 470. For example, the second carrier 460 may be configured to move in the direction of the first shift axis S1 and/or the second shift axis S2 with respect to the camera housing (e.g., the camera housing 410 or the base 413 of FIGS. 4A, 4B, and 5) by driving of the second piezoelectric motors 470. For example, the first shift axis S1 and the second shift axis S2 may be substantially perpendicular to the optical axis OA and may be substantially perpendicular to each other. Based on FIGS. 11 and 12, the optical axis OA may be substantially parallel to the z-axis, the first shift axis S1 may be substantially parallel to the x-axis, and the second shift axis S2 may be substantially parallel to the y-axis.

In an embodiment, the second carrier 460 may include a second frame 461 and a support plate 462. The second frame 461 and the support plate 462 may be coupled with each other to integrally move. For example, the second frame 461 and the support plate 462 may be coupled with each other to form the second carrier 460. The support plate 462 may be fixed to the second frame 461 through various methods. For example, the support plate 462 may be attached to the second frame 461 through an adhesive member or may be assembled to the second frame 461 through insert molding, but is not limited thereto. According to the illustrated embodiment, the second carrier 460 may have a structure in which the second frame 461 and the support plate 462 are manufactured as separate parts and then coupled (assembled) to each other. However, according to various embodiments, the second carrier 460 may be configured such that the second frame 461 and the support plate 462 are integrally manufactured.

In an embodiment, the second frame 461 may be a component on which the AF driving unit 430-1 is seated and may have, in a central portion of the second frame 461, an opening 4611 in which at least a portion of the lens assembly 420 coupled to the AF driving unit 430-1 is accommodated. For example, the second frame 461 may include a plurality of seating portions 465 on which the AF driving unit 430-1 is seated. The plurality of seating portions 465 may protrude from an upper surface (e.g., a surface facing the +z-axis direction) of the second frame 461. For example, four seating portions 465 may be formed on corner portions of the second frame 461 having a quadrilateral shape. However, the illustrated embodiment is illustrative, and the disclosure is not limited thereto.

In an embodiment, the second frame 461 may include a plurality of side surfaces 464 that face directions perpendicular to the optical axis OA. The second frame 461 may include a first side surface 464a, a second side surface 464b substantially perpendicular to the first side surface 464a, a third side surface 464c substantially perpendicular to the second side surface 464b and substantially parallel to the first side surface 464a, and a fourth side surface 464d substantially perpendicular to the third side surface 464c and substantially parallel to the second side surface 464b. Based on FIGS. 11 and 12, the second frame 461 may have a quadrilateral shape, the first side surface 464a may face the −y-axis direction, the second side surface 464b may face the +x-axis direction, the third side surface 464c may face the +y-axis direction, and the fourth side surface 464d may face the −x-axis direction.

In an embodiment, the plurality of second piezoelectric motors 470 may be disposed on the plurality of side surfaces 464 of the second frame 461. Among the plurality of second piezoelectric motors 470, sub-piezoelectric motors 470-1 for moving the second carrier 460 in the direction of the first shift axis S1 may be disposed on the first side surface 464*a* and the third side surface 464*c* of the second frame 461, and sub-piezoelectric motors 470-2 for moving the second carrier 460 in the direction of the second shift axis S2 may be disposed on the second side surface 464*b* and the fourth side surface 464*d* of the second frame 461. For example, a first support part 467*a* and a third support part 467*c* of the support plate 462 to which a pair of first sub-piezoelectric motors 470-1 are coupled may be disposed on the first side surface 464*a* and the third side surface 464*c* of the second frame 461, and a second support part 467*b* and a fourth support part 467*d* of the support plate 462 to which a pair of second sub-piezoelectric motors 470-2 are coupled may be disposed on the second side surface 464*b* and the fourth side surface 464*d* of the second frame 461.

In an embodiment, the support plate 462 may be a component that supports the plurality of second piezoelectric motors 470 and may be fixedly disposed on the second frame 461. For example, the support plate 462 may mechanically connect the plurality of second piezoelectric motors 470 to the second frame 461. The support plate 462 may have the plurality of second piezoelectric motors 470 coupled to sides of the support plate 462 (e.g., the plurality of support parts 467) and may be configured to move together with portions (e.g., rods 473) of the second piezoelectric motors 470 or separate from the movement of the portions when the plurality of second piezoelectric motors 470 are driven. The support plate 462 may be coupled to the second frame 461 to move together with the second frame 461. For example, when the support plate 462 is moved by the plurality of second piezoelectric motors 470, the support plate 462 may move together with the second frame 461 to move the AF driving unit 430-1 and the lens assembly (e.g., the lens assembly 420 of FIGS. 4A, 4B, and 5) seated on the second frame 461.

In an embodiment, the support plate 462 may include a fixed part 466 fixed to the second frame 461 and the plurality of support parts 467 extending from the fixed part 466.

In an embodiment, the fixed part 466 may have a form in which a central region is open to correspond to the opening 4611 of the second frame 461 and may be fixed to a partial region of the second frame 461. The fixed part 466 may be formed in a shape corresponding to the second frame 461 and may be brought into contact with and fixed to a lower surface (e.g., a surface facing the −z-axis direction) of the second frame 461. However, the illustrated embodiment is illustrative, and according to various embodiments, the fixed part 466 may be disposed on the upper surface (e.g., the surface facing the +z-axis direction) of the second frame 461.

In an embodiment, the plurality of support parts 467 may be parts to which the plurality of second piezoelectric motors 470 are coupled and may be disposed on the plurality of side surfaces 464 of the second frame 461. The plurality of support parts 467 may extend from the periphery of the fixed part 466 such that at least portions of the support parts 467 are located to face the plurality of side surfaces 464. For example, the plurality of support parts 467 may be disposed on the plurality of side surfaces 464 of the second frame 461 as the fixed part 466 is fixed to the second frame 461. The plurality of support parts 467 may include the first support part 467*a* disposed on the first side surface 464*a*, the second support part 467*b* disposed on the second side surface 464*b*, the third support part 467*c* disposed on the third side surface 464*c*, and the fourth support part 467*d* disposed on the fourth side surface 464*d*. For example, the pair of first sub-piezoelectric motors 470-1 may be coupled to the first support part 467*a* and the third support part 467*c*, and the pair of second sub-piezoelectric motors 470-2 may be coupled to the second support part 467*b* and the fourth support part 467*d*.

In an embodiment, the plurality of support parts 467 may include holes 468 into which at least portions of the plurality of second piezoelectric motors 470 are inserted. For example, the rods 473 of the plurality of second piezoelectric motors 470 may be inserted into the holes 468 of the plurality of support parts 467. The plurality of support parts 467 may be partially bent to form the holes 468 in central portions of the plurality of support parts 467. The plurality of support parts 467 may be brought into contact with the rods 473 while pressing the rods 473 inserted into the holes 468 toward the insides of the holes 468 (e.g., refer to FIG. 14). When the rods 473 are inserted into the holes 468, the plurality of support parts 467 (or, the sizes of the holes 468) may be partially deformed, and the plurality of support parts 467 may be brought into contact with the rods 473, which are inserted into the holes 468, while maintaining a predetermined pre-load. For example, the plurality of support parts 467 may be formed to have characteristics of a spring.

In an embodiment, the plurality of support parts 467 may be parts to which driving forces of the plurality of second piezoelectric motors 470 are transmitted. The plurality of support parts 467 may be configured to move together with the rods 473 or to be relatively fixed without moving together with the rods 473, based on the moving speeds of the rods 473 when the rods 473 of the plurality of second piezoelectric motors 470 move in directions substantially perpendicular to the optical axis OA (e.g., stick-slip motion). For example, the plurality of support parts 467 may move together with the rods 473 when the rods 473 slowly move at a speed lower than a predetermined speed (e.g., stick). In contrast, the plurality of support parts 467 may not move together with the rods 473 when the rods 473 rapidly move at a speed higher than the predetermined speed (e.g., slip). An operation in which the second carrier 460 is moved by the plurality of second piezoelectric motors 470 will be described below with reference to FIGS. 14 and 15.

According to various embodiments, the support plate 462 may be configured such that the fixed part 466 is omitted and the plurality of support parts 467 are directly coupled to the second frame 461. In another example, the plurality of support parts 467 may extend from the second frame 461 and may be integrally formed with the second frame 461.

In an embodiment, each of the plurality of second piezoelectric motors 470 may include a second piezoelectric element 471, the rod 473, and a counter mass 475. Each of the plurality of second piezoelectric motors 470 may be formed in a structure in which the rod 473 and the counter mass 475 are coupled to opposite end portions of the second piezoelectric element 471.

In an embodiment, the second piezoelectric element 471 may be subjected to mechanical deformation, such as contraction or expansion, when a voltage is applied to the second piezoelectric element 471. For example, the second piezoelectric element 471 may have a shape extending in a direction substantially perpendicular to the optical axis OA and may be contracted or expanded in the lengthwise direction of the second piezoelectric element 471 depending on the direction of an electric field and the poling direction of the second piezoelectric element 471. Here, the lengthwise direction of the second piezoelectric element 471 may be the direction of the first shift axis S1 (e.g., the x-axis) or the second shift axis S2 (e.g., the y-axis) substantially perpendicular to the optical axis OA. According to the illustrated embodiment, the second piezoelectric element 471 may be formed in a rectangular parallelepiped shape extending in a direction substantially perpendicular to the optical axis OA, and the lengthwise direction of the second piezoelectric element 471 may mean a direction parallel to the longest edge among the edges of the rectangular parallelepiped shape. However, the shape of the second piezoelectric element 471 is not limited to the illustrated embodiment, and the second piezoelectric element 471 may be formed in various shapes including a cylindrical shape.

In an embodiment, the second piezoelectric element 471 may be formed by using various piezoelectric elements including piezo-ceramic, a piezo-polymer, or a piezo-composite. The second piezoelectric element 471 may be a multi-layer type piezoelectric element. However, without being limited thereto, the second piezoelectric element 471 may be a single piezoelectric element.

In an embodiment, the rod 473 and the counter mass 475 may be coupled to the opposite end portions of the second piezoelectric element 471. For example, the rod 473 may be attached to one side surface of the second piezoelectric element 471 in the lengthwise direction, and the counter mass 475 may be attached to an opposite side surface of the second piezoelectric element 471 in the lengthwise direction.

In an embodiment, the rod 473 may be coupled to one end portion of the second piezoelectric element 471. The rod 473 may move as the second piezoelectric element 472 is contracted or expanded in a direction substantially perpendicular to the optical axis OA with respect to the counter mass 475. The rod 473 may extend in a direction parallel to the lengthwise direction of the second piezoelectric element 471. For example, the rod 473 may be formed in a cylindrical shape, and the length of the rod 473 may remain constant. The rod 473 may be formed of a carbon-based material. For example, the rod 473 may be formed of a carbon fiber reinforced plastic (CFRP) material. However, the shape or material of the rod 473 is not limited to the above-described contents.

In an embodiment, the rod 473 may provide movement of the second carrier 460 by transferring mechanical displacement depending on contraction or expansion of the second piezoelectric element 471 to the support plate 462. The rod 473 may be inserted into the support part 467 of the support plate 462 in the state of being coupled to the one end portion of the second piezoelectric element 471. The rod 473 may be configured to move together with the support plate 462 or move relative to the support plate 462 depending on a moving speed. The moving speed of the rod 473 may be adjusted by controlling the speed at which the second piezoelectric element 471 is contracted or expanded.

In an embodiment, the counter mass 475 may be coupled to an opposite end portion of the second piezoelectric element 471. The counter mass 475 may serve to support the opposite end portion of the second piezoelectric element 471 such that contraction or expansion of the second piezoelectric element 471 is smoothly converted into a linear motion of the rod 473. The counter mass 475 may be a reference for contraction or expansion of the second piezoelectric element 471. For example, the counter mass 475 may support the opposite end portion of the second piezoelectric element 471 such that the opposite end portion of the second piezoelectric element 471 is a fixed end. The counter mass 475 may be formed to have a specified mass. For example, the counter mass 475 may be formed of a metallic material, but is not limited thereto.

In an embodiment, the plurality of second piezoelectric motors 470 may include the first sub-piezoelectric motors 470-1 configured to move the second carrier 460 in the direction of the first shift axis S1 and the second sub-piezoelectric motors 470-2 configured to move the second carrier 460 in the direction of the second shift axis S2. For example, the first sub-piezoelectric motors 470-1 may be disposed on side surfaces (e.g., the first side surface 464*a* and the third side surface 464*c*) parallel to the first shift axis S1 among the plurality of side surfaces of the second carrier 460, and the second sub-piezoelectric motors 470-2 may be disposed on side surfaces (e.g., the second side surface 464*b* and the fourth side surface 464*d*) parallel to the second shift axis S2 among the plurality of side surfaces of the second carrier 460. The second piezoelectric elements 471 of the first sub-piezoelectric motors 470-1 may be configured to contract or expand in the direction of the first shift axis S1, and the second piezoelectric elements 471 of the second sub-piezoelectric motors 470-2 may be configured to contract or expand in the direction of the second shift axis S2.

In an embodiment, a pair of first sub-piezoelectric motors 470-1 and a pair of second sub-piezoelectric motors 470-2 may be provided. For example, the pair of first sub-piezoelectric motors 470-1 may include a first side sub-motor 470-1*a* disposed on the first side surface 464*a* of the second carrier 460 and a third side sub-motor 470-1*b* disposed on the third side surface 464*c* of the second carrier 460. For example, the pair of second sub-piezoelectric motors 470-2 may include a second side sub-motor 470-2*a* disposed on the second side surface 464*b* of the second carrier 460 and a fourth side sub-motor 470-2*b* disposed on the fourth side surface 464*d* of the second carrier 460.

In an embodiment, the first side sub-motor 470-1*a* may be coupled to the first support part 467*a* of the support plate 462. The second side sub-motor 470-2*a* may be coupled to the second support part 467*b* of the support plate 462. The third side sub-motor 470-1*b* may be coupled to the third support part 467*c* of the support plate 462. The fourth side sub-motor 470-2*b* may be coupled to the fourth support part 467*d* of the support plate 462.

In an embodiment, the first side sub-motor 470-1*a* may include a first rod 473*a*, a third sub-piezoelectric element 471*a*, and a first counter mass 475*a*. The second side sub-motor 470-2*a* may include a second rod 473*b*, a fourth sub-piezoelectric element 471*b*, and a second counter mass 475*b*. The third side sub-motor 470-1*b* may include a third rod 473*c*, a fifth sub-piezoelectric element 471*c*, and a third counter mass 475*c*. The fourth side sub-motor 470-2*b* may include a fourth rod 473*d*, a sixth sub-piezoelectric element 471*d*, and a fourth counter mass 475*d*.

Hereinafter, an operation of each of the second piezoelectric motors 470 will be described with reference to FIG. 13.

As illustrated in FIG. 13, the second piezoelectric motor 470 may provide a driving force for moving the second carrier 460 in the direction of a shift axis S (e.g., the first shift axis S1 or the second shift axis S2) substantially perpendicular to the optical axis OA by converting expansion or contraction 1301 of the second piezoelectric element 471 into a linear motion 1303 of the rod 473. For example, the second piezoelectric element 471 may be expanded or contracted in the direction of the shift axis S, based on a voltage applied to the second piezoelectric element 471. The rod 473 may be moved in the direction of the shift axis S by the expansion or contraction of the second piezoelectric element 471.

In an embodiment, when the second piezoelectric element 471 is contracted or expanded, the second piezoelectric element 471 may be deformed such that a first end portion 4711 of the second piezoelectric element 471 moves away from or toward a second end portion 4712 as the second end portion 4712 of the second piezoelectric element 471 is supported by the counter mass 475. For example, when a voltage for expanding the second piezoelectric element 471 in the lengthwise direction (e.g., shift axis directions +S/−S) is applied to the second piezoelectric element 471, the second piezoelectric element 471 may be expanded while the second end portion 4712 is supported by the counter mass 475 and the first end portion 4711 moves in one direction (e.g., the −S direction) with respect to the second end portion 4712 or the counter mass 475. In contrast, when a voltage for contracting the second piezoelectric element 471 in the lengthwise direction (e.g., the shift axis directions +S/−S) is applied to the second piezoelectric element 471, the second piezoelectric element 471 may be contracted while the second end portion 4712 is supported by the counter mass 475 and the first end portion 4711 moves in the direction opposite to the one direction (e.g., the +S direction) with respect to the second end portion 4712 or the counter mass 475.

In an embodiment, the rod 473 may be coupled to the first end portion 4711 of the second piezoelectric element 471 and may move together with the first end portion 4711. The rod 473 may maintain a predetermined length and may perform the linear motion 1303 in the direction of the shift axis S with respect to the second end portion 4712 or the counter mass 475 as the second piezoelectric element 471 contracts or expands (1301). For example, in a default state in which a voltage is not applied to the second piezoelectric element 471, one end portion 4731 of the rod 473 may be located at a first distance d1 from the counter mass 475 or the second end portion 4712 of the second piezoelectric element 471. When the second piezoelectric element 471 is expanded in the direction of the shift axis S, the rod 473 may move in one direction (the −S direction), and the one end portion 4731 of the rod 473 may be located (P2) at a second distance d2 greater than the first distance d1 from the counter mass 475 or the second end portion 4712 of the second piezoelectric element 471. When the second piezoelectric element 471 is contracted, the rod 473 may move in the direction opposite to the one direction (the +S direction), and the one end portion 4731 of the rod 473 may be located (P1) at a third distance d3 smaller than the first distance d1 from the counter mass 475 or the second end portion 4712 of the second piezoelectric element 471.

Figure 14:
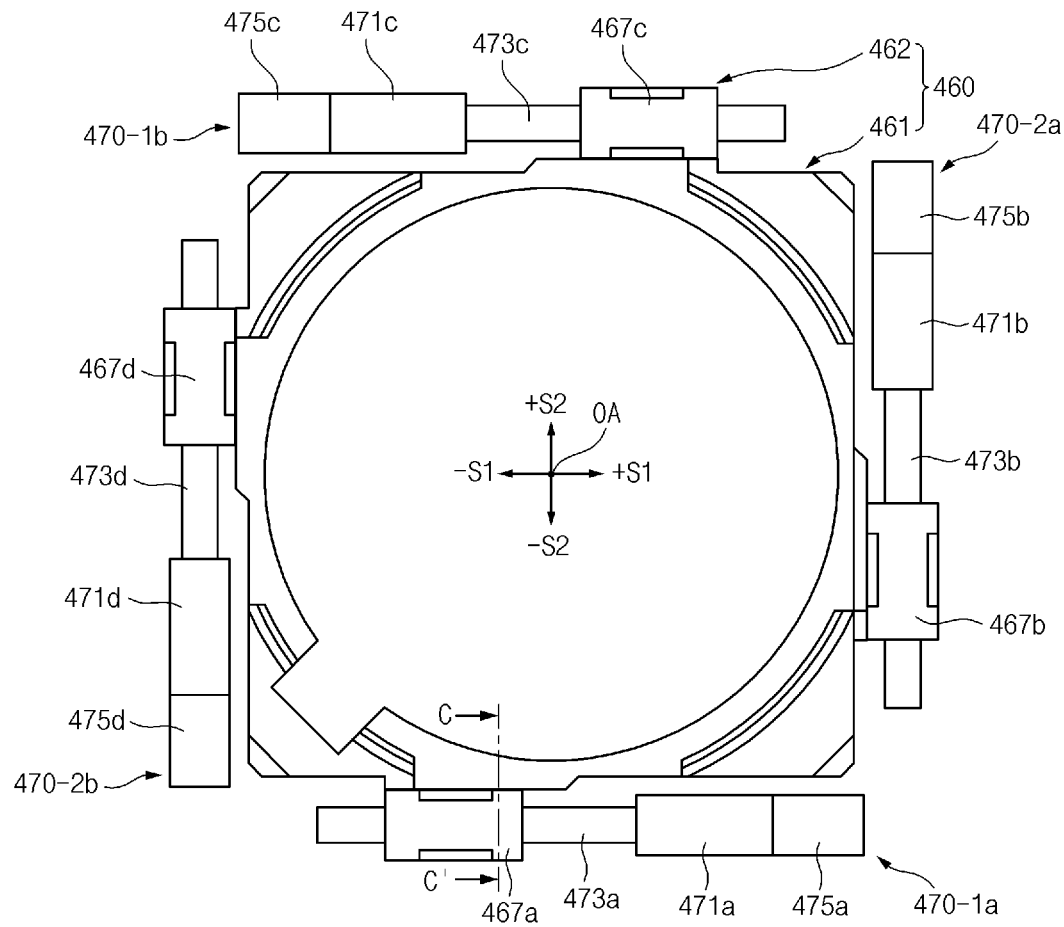
FIG. 14 illustrates the optical image stabilization (OIS) driving unit of the camera module according to an embodiment.
Figure 14:
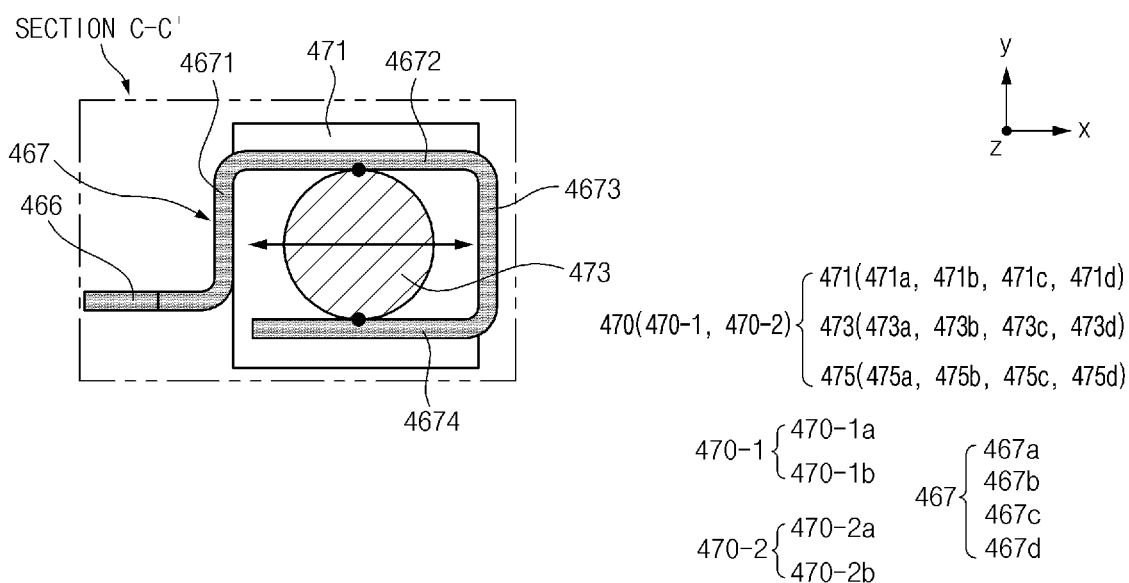
Figure 15:
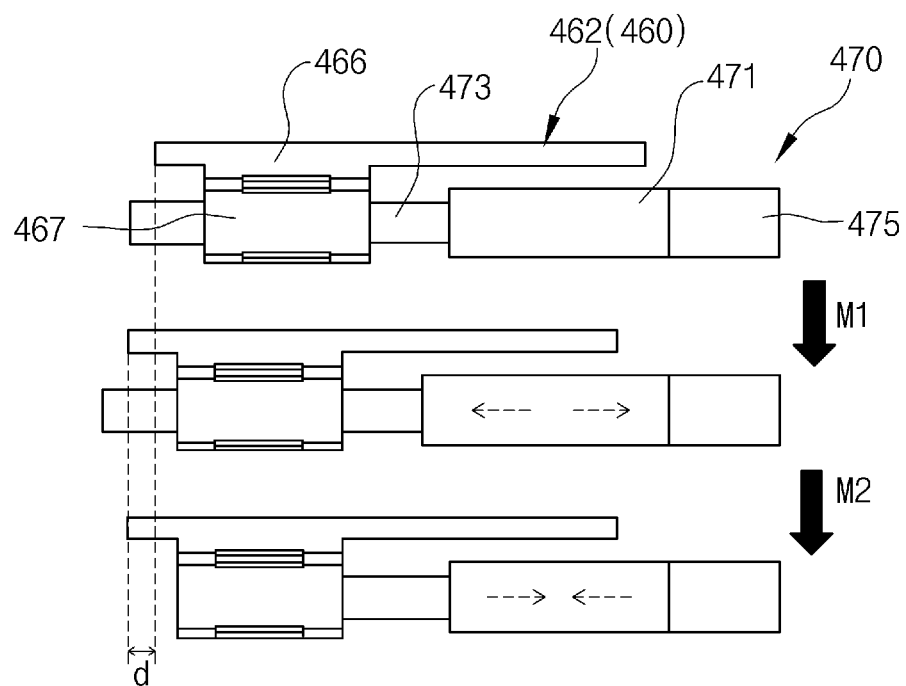
FIG. 15 illustrates an operation of the optical image stabilization (OIS) driving unit of the camera module according to an embodiment.
Figure 15:
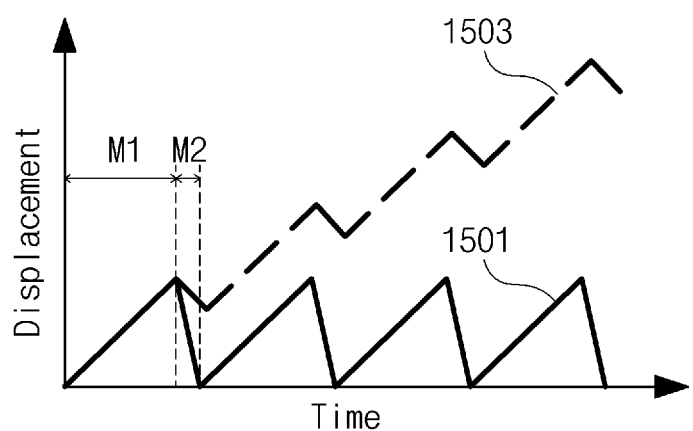

FIG. 14 illustrates the optical image stabilization (OIS) driving unit of the camera module according to an embodiment. FIG. 15 illustrates an operation of the optical image stabilization (OIS) driving unit of the camera module according to an embodiment.

Referring to FIGS. 14 and 15, the OIS driving unit 430-2 according to an embodiment may include the second carrier 460 and the plurality of second piezoelectric motors 470. The second carrier 460 may include the second frame 461 and the support plate 462. Each of the plurality of second piezoelectric motors 470 may include the second piezoelectric element 471, the rod 473, and the counter mass 475.

The components of the OIS driving unit 430-2 illustrated in FIGS. 14 and 15 are identical or similar to the components of the OIS driving unit 430-2 illustrated in FIGS. 11 to 13, and repetitive descriptions will hereinafter be omitted.

In an embodiment, the support plate 462 may include the fixed part 466 and the plurality of support parts 467 extending from the fixed part 466. The plurality of support parts 467 may be brought into contact with the rods 473 inserted into the holes 468 by elastically pressing the rods 473. For example, each of the plurality of support parts 467 may include a first portion 4671 substantially perpendicularly extending from the fixed part 466, a second portion 4672 substantially perpendicularly extending from the first portion 4671, a third portion 4673 substantially perpendicularly extending from the second portion 4672, and a fourth portion 4674 substantially perpendicularly extending from the third portion 4673. The section taken along line C-C' of FIG. 14 is a section of the first support part 467a among the plurality of support parts 467. However, the above-described contents may be identically applied to the second support part 467b, the third support part 467c, and the fourth support part 467d.

In an embodiment, the plurality of support parts 467 may be configured such that the second portions 4672 and the fourth portions 4674 are brought into contact with the rods 473 and the first portions 4671 and the third portions 4673 are spaced apart from the rods 473. For example, the plurality of support parts 467 may be formed such that spaces are secured between the first portions 4671 and the rods 473 and between the third portions 4673 and the rods 473 and the rods 473 are movable in the holes 468 in directions perpendicular to the lengthwise directions of the rods 473. When the second carrier 460 is moved by an OIS operation, the rods 473 disposed to be perpendicular to the direction of movement of the second carrier 460 may move together in the direction of movement of the second carrier 460 with respect to the plurality of support parts 467.

According to embodiments of the disclosure, when the second carrier 460 is moved in the direction of the first shift axis S1 by operations of the first sub-piezoelectric motors 470-1, the second rod 473b and the fourth rod 473d of the second sub-piezoelectric motors 470-2 may move in the direction of the first shift axis S1 in the holes of the second support part 467b and the fourth support part 467d. In contrast, when the second carrier 460 is moved in the direction of the second shift axis S2 by operations of the second sub-piezoelectric motors 470-2, the first rod 473a and the third rod 473c of the first sub-piezoelectric motors 470-1 may move in the direction of the second shift axis S2 in the holes of the first support part 467a and the third support part 467c. Accordingly, when the first sub-piezoelectric motors 470-1 and the second sub-piezoelectric motors 470-2 are driven in the OIS operation, operational obstruction or limitation due to a mechanical constraint may not occur, and a two-axis OIS operation may be implemented on the same plane.

In an embodiment, the plurality of second piezoelectric motors 470 may operate using a smooth impact drive mechanism (SIDM). For example, the operating principle of a general SIDM may be based on an inertial force and a frictional force and may be understood as a stick-slip motion. When the second piezoelectric elements 471 are slowly contracted or expanded, the rods 473 may move at a low speed and may move together with the plurality of support parts 467, and in contrast, when the second piezoelectric elements 471 are rapidly contracted or expanded, the rods 473 may move at a high speed and may move relative to the plurality of support parts 467 without moving together with the plurality of support parts 467.

As illustrated in FIG. 15, the second piezoelectric motors 470 may be driven in two steps to implement movement of the second carrier 460. When the second piezoelectric elements 471 are slowly expanded, the plurality of support parts 467 and the rods 473 may remain in the pressure contact state, and thus a first operation M1 in which the plurality of support parts 467 (e.g., the second carrier 460) move together with the rods 473 due to frictional forces between the plurality of support parts 467 and the rods 473 may be performed. Subsequently, when the second piezoelectric elements 471 are rapidly contracted, a second operation M2 in which due to inertial forces of the plurality of support parts 467, the plurality of support parts 467 remain in the positions moved by the first operation M1 while sliding from the rods 473 without moving together with the rods 473 may be performed.

In an embodiment, the second piezoelectric motors 470 may move the second carrier 460 by a desired distance by repeating the first operation M1 and the second operation M2. For example, when the first operation M1 and the second operation M2 are performed once, the second carrier 460 may move a predetermined distance d in directions away from the second piezoelectric elements 471 or the counter masses 475, and the second piezoelectric motors 470 may move the second carrier 460 by more than the predetermined distance by repeating the first operation M1 and the second operation M2. The graph of FIG. 15 depicts changes of the positions of the second piezoelectric elements 471 and the second carrier 460 over time. In the graph of FIG. 15, a solid line 1501 may represent displacement depending on contraction or expansion of the second piezoelectric elements 471, and a dotted line 1503 may represent displacement depending on movement of the second carrier 460. For example, the slope of the solid line 1501 may be greater in the time interval in which the second operation M2 is performed than in the time interval in which the first operation M1 is performed.

In an embodiment, the first operation M1 may be performed since the frictional forces between the rods 473 and the plurality of support parts 467 are greater than the inertial forces of the plurality of support parts 467 and may be understood as a sticking motion. The second operation M2 may be performed since the inertial forces of the plurality of support parts 467 are greater than the frictional forces between the rods 473 and the plurality of support parts 467 and may be understood as a slipping motion.

FIG. 15 illustrates operations of the second piezoelectric motors 470 for advancing the plurality of support parts 467 on the rods 473, and the directions of movement of the plurality of support parts 467 may be changed depending on the directions in which the second piezoelectric elements 471 are deformed in the first operation M1 and the second operation M2. For example, as the second piezoelectric elements 471 are slowly contracted in the first operation M1 and are rapidly expanded in the second operation M2, the second piezoelectric motors 470 may move the second carrier 460 by the predetermined distance d in directions toward the second piezoelectric elements 471 or the counter masses 475.

In an embodiment, the plurality of second piezoelectric motors 470 may be configured such that in an operation of moving the second carrier 460, the pair of first sub-piezoelectric motors 470-1 operate opposite to each other and the pair of second sub-piezoelectric motors 470-2 operate opposite to each other.

In an embodiment, when moving the second carrier 460 in the direction of the first shift axis S1, the first side sub-motor 470-1a and the third side sub-motor 470-1b may operate opposite to each other. When the second carrier 460 is moved in the direction of the first shift axis S1, the third sub-piezoelectric element 471a and the fifth sub-piezoelectric element 471c may be deformed opposite to each other, and the first rod 473a and the third rod 473c may move in opposite directions. For example, when the second carrier 460 is moved in a +S1 direction, the first side sub-motor 470-1a may operate such that the third sub-piezoelectric element 471a is slowly contracted in the first operation M1 and is rapidly expanded in the second operation M2, and the third side sub-motor 470-1b may operate such that the fifth sub-piezoelectric element 471c is slowly expanded in the first operation M1 and is rapidly contracted in the second operation M2. However, the disclosure is not limited thereto, and according to various embodiments, when the first side sub-motor 470-1a and the third side sub-motor 470-1b are disposed to be symmetrical to each other with respect to the first shift axis S1, the first side sub-motor 470-1a and the third side sub-motor 470-1b may operate in the same way.

In an embodiment, when moving the second carrier 460 in the direction of the second shift axis S2, the second side sub-motor 470-2a and the fourth side sub-motor 470-2b may operate opposite to each other. When the second carrier 460 is moved in the direction of the second shift axis S2, the fourth sub-piezoelectric element 471b and the sixth sub-piezoelectric element 471d may be deformed opposite to each other, and the second rod 473b and the fourth rod 473d may move in opposite directions. For example, when the second carrier 460 is moved in a +S2 direction, the second side sub-motor 470-2a may operate such that the fourth sub-piezoelectric element 471b is slowly contracted in the first operation M1 and is rapidly expanded in the second operation M2, and the fourth side sub-motor 470-2b may operate such that the sixth sub-piezoelectric element 471d is slowly expanded in the first operation M1 and is rapidly contracted in the second operation M2. However, the disclosure is not limited thereto, and according to various embodiments, when the second side sub-motor 470-2a and the fourth side sub-motor 470-2b are disposed to be symmetrical to each other with respect to the second shift axis S2, the second side sub-motor 470-2a and the fourth side sub-motor 470-2b may operate in the same way.

Figure 17:
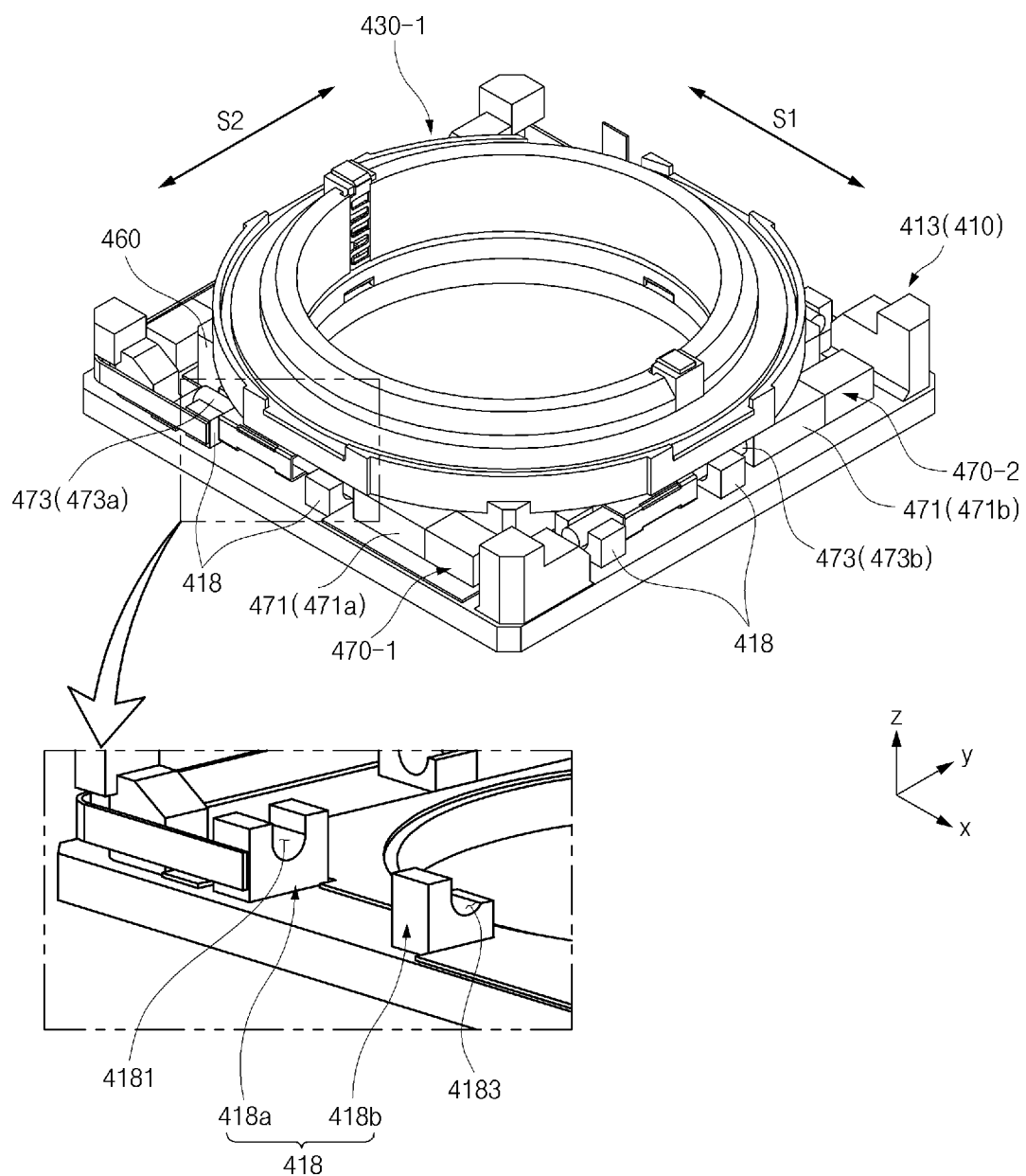
FIG. 17 illustrates a camera housing, the auto focus (AF) driving unit, and the optical image stabilization (OIS) driving unit of the camera module according to an embodiment.

In an embodiment, the OIS driving unit 430-2 may be configured such that the second piezoelectric motors 470 are seated on the camera housing (e.g., the camera housing 410 or the base 413 of FIGS. 4A, 4B, and 5) and the second carrier 460 is moved relative to the camera housing 410 in directions substantially perpendicular to the optical axis OA by operations of the second piezoelectric motors 470 (e.g., refer to FIG. 17). For example, the OIS driving unit 430-2 may be configured such that the second carrier 460 moves relative to the plurality of second piezoelectric motors 470 in a state in which the plurality of second piezoelectric motors 470 are fixed in specified positions on the base 413.

In an embodiment, when the second carrier 460 moves in the direction of the first shift axis S1 by operations of the first sub-piezoelectric motors 470-1, the second carrier 460 may move toward or away from the second side sub-motor 470-2a or the fourth side sub-motor 470-2b while the second support part 467b and the fourth support part 467d move relative to the second rod 473b and the fourth rod 473d. When the second carrier 460 moves in the direction of the second shift axis S2 by operations of the second sub-piezoelectric motors 470-2, the second carrier 460 may move toward, or away from the first side sub-motor 470-1a or the third side sub-motor 470-1b while the first support part 467a and the third support part 467c move relative to the first rod 473a and the third rod 473c.

Figure 16:
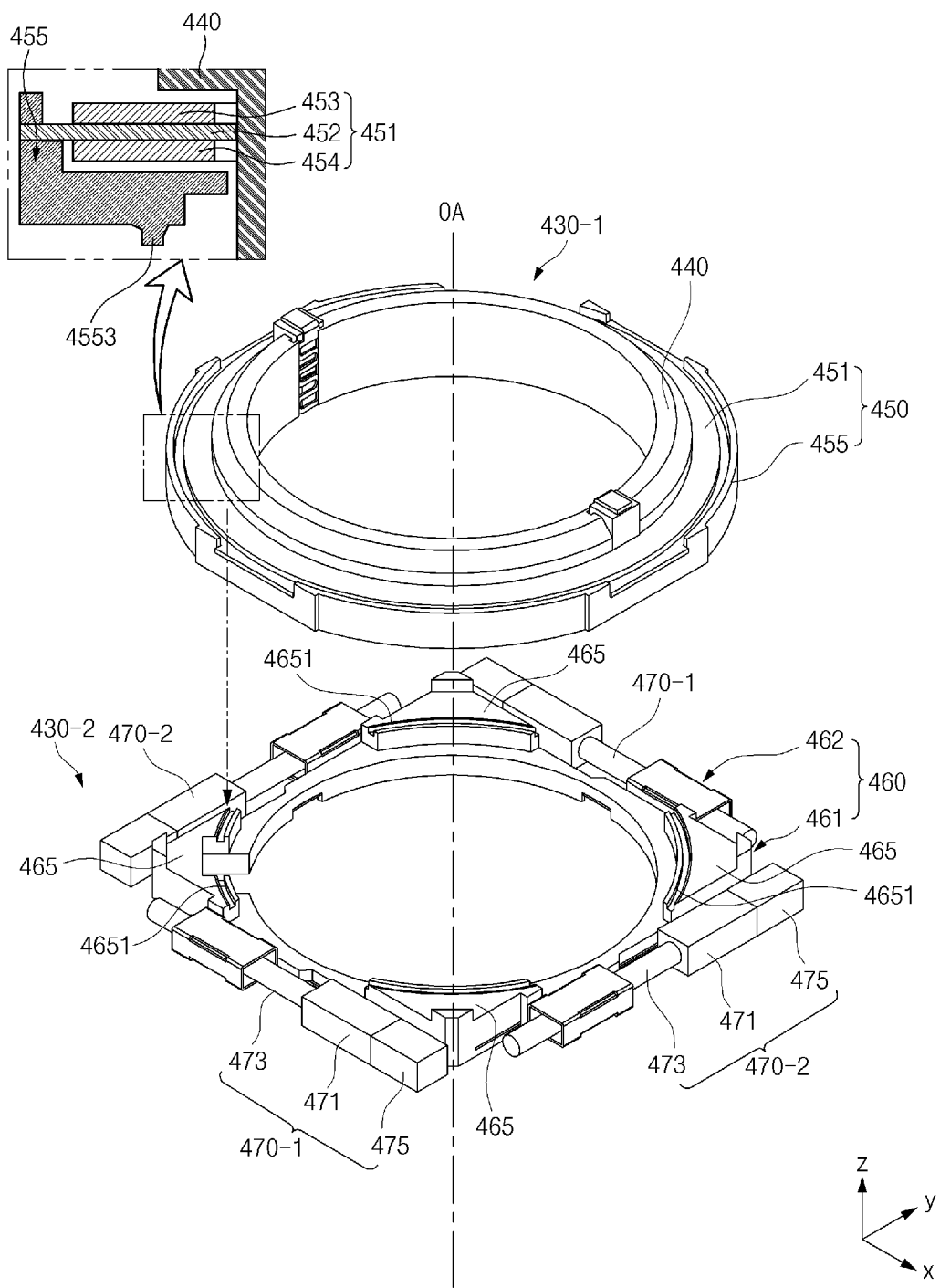
FIG. 16 illustrates the auto focus (AF) driving unit and the optical image stabilization (OIS) driving unit of the camera module according to an embodiment.

FIG. 16 illustrates the auto focus (AF) driving unit and the optical image stabilization (OIS) driving unit of the camera module according to an embodiment. FIG. 17 illustrates the camera housing, the auto focus (AF) driving unit, and the optical image stabilization (OIS) driving unit of the camera module according to an embodiment.

FIG. 16 is a view illustrating a coupling structure of the AF driving unit 430-1 and the OIS driving unit 430-2. FIG. 17 is a view illustrating a coupling structure of the base 413 of the camera housing 410 and the OIS driving unit 430-2.

Referring to FIGS. 16 and 17, the camera module 400 according to an embodiment may include the camera housing 410, the AF driving unit 430-1, and the IOS driving unit 430-2. For example, the camera housing 410 illustrated in FIG. 17 may be referred to as the base 413 (e.g., the base 413 of FIG. 5).

In an embodiment, the AF driving unit 430-1 may include the first carrier 440 and the first piezoelectric motor 450. The first piezoelectric motor 450 may include the holder 455 and the piezoelectric element assembly 451. The piezoelectric element assembly 451 may include the metal plate 452 and the first piezoelectric element 453 and 454. The OIS driving unit 430-2 may include the second carrier 460 and the plurality of second piezoelectric motors 470. The second carrier 460 may include the second frame 461 and the support plate 462. Each of the plurality of second piezoelectric motors 470 may include the second piezoelectric element 471, the rod 473, and the counter mass 475. The components of the AF driving unit 403-1 and the OIS driving unit 430-2 illustrated in FIGS. 16 and 17 may be identical or similar to the components of the AF driving unit 403-1 and the OIS driving unit 430-2 described above with reference to FIGS. 5 to 15, and repetitive descriptions will hereinafter be omitted.

In an embodiment, the AF driving unit 430-1 may be seated on an upper portion of the second carrier 460 to move together with the second carrier 460 of the OIS driving unit 430-2. The first piezoelectric motor 450 of the AF driving unit 430-1 may be seated on the second frame 461 of the second carrier 460. For example, the holder 455 of the first piezoelectric motor 450 may be seated on the seating portions 465 formed on the second frame 461. Seating protrusions 4553 protruding toward the second frame 461 may be formed on the holder 455, and seating recesses 4651 in which the seating protrusions 4553 are accommodated may be formed on the seating portions 465 of the second frame 461. For example, the holder 455 may be stably fixed to the second frame 461 as the seating protrusions 4553 are inserted into the seating recesses 4651.

According to the illustrated embodiment, the first piezoelectric motor 450 may be seated on the OIS driving unit 430-2 as the holder 455 is fixed to the second carrier 460, but is not limited thereto. According to various embodiments, the holder 455 may be omitted from the first piezoelectric motor 450. For example, the first piezoelectric motor 450 may be constituted by only the piezoelectric electric assembly 451, and one end portion of the metal plate 452 may be directly fixed to the second carrier 460.

In an embodiment, in a state in which the AF driving unit 430-1 and the OIS driving unit 430-2 are assembled, the AF driving unit 430-1 may move together with the second carrier 460 when the second carrier 460 is moved in the direction of the first shift axis S1 and/or the direction of the second shift axis S2 by operations of the second piezoelectric motors 470 as the first piezoelectric motor 450 is fixed to the second carrier 460. The first carrier 440 may be supported by the first piezoelectric motor 450 and may be separated from the second carrier 460. Accordingly, the first carrier 440 may be moved in the direction of the optical axis OA with respect to the OIS driving unit 430-2 by an operation of the first piezoelectric motor 450.

In an embodiment, the OIS driving unit 430-2 may be connected to the camera housing 410. The OIS driving unit 430-2 may be seated on the base 413 of the camera housing 410. For example, the OIS driving unit 430-2 may be seated on the base 413 as the plurality of second piezoelectric motors 470 are coupled to the base 413. The base 413 may include the coupling portions 418 to which the OIS driving unit 430-2 is coupled. For example, the OIS driving unit 430-2 may be seated on the base 413 as the rods 473 of the plurality of second piezoelectric motors 470 are coupled to the coupling portions 418. Through the coupling of the rods 473 and the coupling portions 418, the OIS driving unit 430-2 may provide movement of the second carrier 460 without being separated from the base 413 in the direction of the optical axis OA. As many coupling portions 418 as the plurality of second piezoelectric motors 470 may be formed in positions corresponding to the plurality of second piezoelectric motors 470. For example, the coupling portions 418 may be formed to correspond to the first sub-piezoelectric motors 470-1 and the second sub-piezoelectric motors 480-2 (e.g., refer to FIG. 5).

In an embodiment, the plurality of second piezoelectric motors 470 may operate in the state in which the rods 473 are coupled to the coupling portions 418 and thus may move the second carrier 460 relative to the base 413. For example, as the rods 473 are coupled to the base 413, the plurality of second piezoelectric motors 470 may support movement of the second carrier 460 while moving the second carrier 460. The rods 473 may be coupled to the coupling portions 418 to move in the direction of the first shift axis S1 or the second shift axis S2 relative to the coupling portions 418 when the second piezoelectric elements 471 are contracted or expanded in the direction of the first shift axis S1 or the second shift axis S2.

In an embodiment, each of the plurality of coupling portions 418 may include a first coupling protrusion 418a and a second coupling protrusion 418b. First coupling recesses 4181 into which the rods 473 are fitted may be formed on the first coupling protrusions 418a. For example, as the rods 473 are inserted into the first coupling recesses 4181 of the first coupling protrusions 418a, the rods 473 may be movable in the first coupling recesses 4181 in the lengthwise directions of the rods 473, and movement of the rods 473 in directions perpendicular to the lengthwise directions may be limited. The first coupling protrusions 418a may be elastic pieces having elasticity such that the rods 473 are able to be inserted thereinto. Second coupling recesses 4183 in which the rods 473 are seated may be formed on the second coupling protrusions 418b. The rods 473 may be seated in the second coupling recesses 4183 and may be stably supported by the second coupling recesses 4183. The shapes of the first coupling protrusions 418a and the second coupling protrusions 418b are not limited to the illustrated embodiment and may be diversely changed.

In an embodiment, when the second carrier 460 moves in the direction of the first shift axis S1, the first sub-piezoelectric motor 470-1 may move the first rod 473a in the direction of the first shift axis S1 to move the second carrier 460, and the second sub-piezoelectric motor 470-2 may maintain at a relatively fixed position with respect to the movement of the second carrier 460 without moving in the direction of the first shift axis S1 as the second rod 473b is supported by the coupling portion 418.

In an embodiment, when the second carrier 460 moves in the direction of the second shift axis S2, the second sub-piezoelectric motor 470-2 may move the second rod 473b in the direction of the second shift axis S2 to move the second carrier 460, and the first sub-piezoelectric motor 470-1 may maintain at a relatively fixed position with respect to the movement of the second carrier 460 without moving in the direction of the second shift axis S2 as the first rod 473a is supported by the coupling portion 418.

Figure 18A:
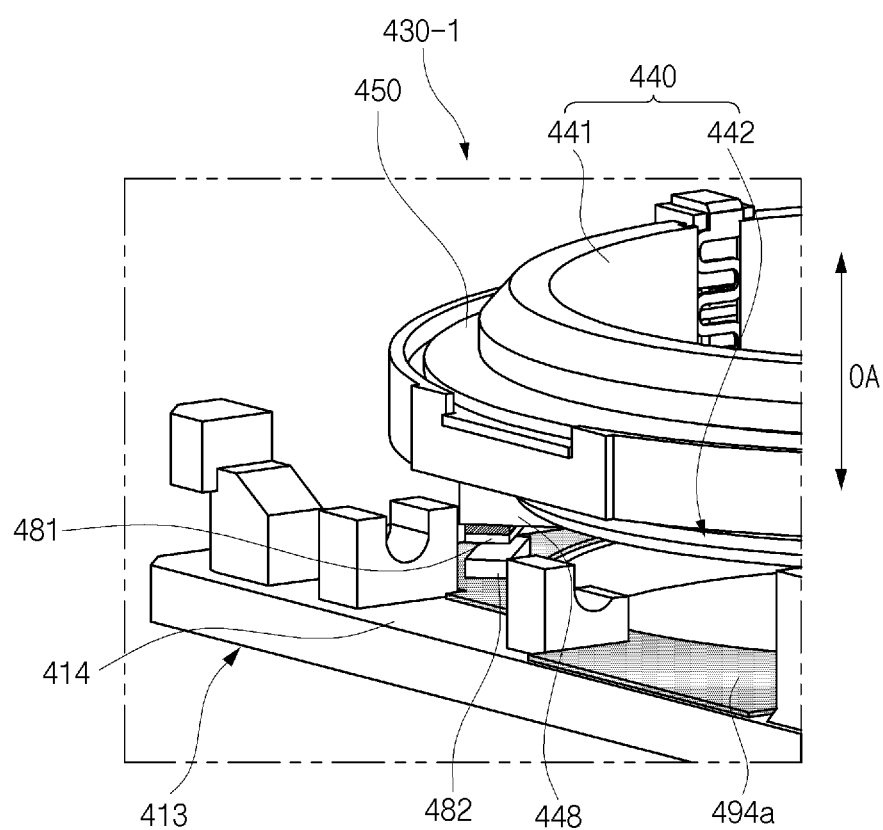
FIG. 18A illustrates a sensing magnet and a sensor module of the camera module according to an embodiment.
Figure 18B:
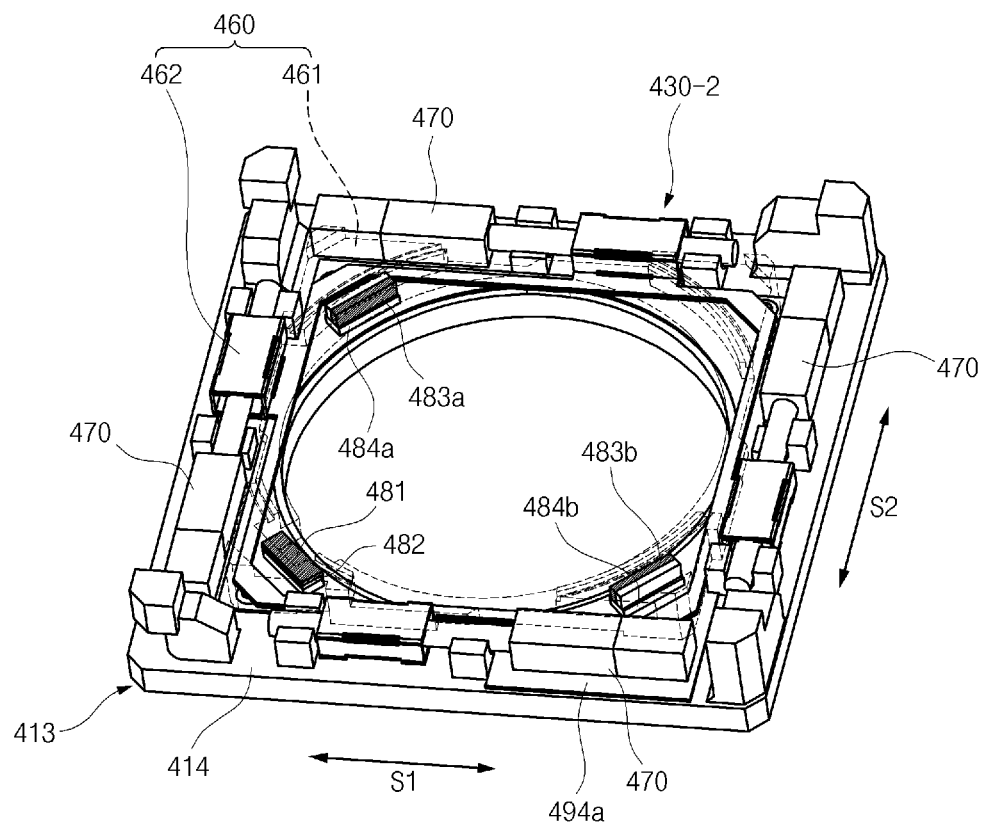
FIG. 18B illustrates the sensing magnet and the sensor module of the camera module according to an embodiment.

FIG. 18A illustrates a sensing magnet and a sensor module of the camera module according to an embodiment. FIG. 18B illustrates the sensing magnet and the sensor module of the camera module according to an embodiment.

FIG. 18A may be a view in which the OIS driving unit is omitted, and FIG. 18B may be a view in which the AF driving unit is omitted.

Referring to FIGS. 18A and 18B, the camera module 400 according to an embodiment may include the base 413 (e.g., the camera housing 410), the AF driving unit 430-1, the OIS driving unit 430-2, a plurality of sensing magnets 481 and 483, and a plurality of sensor modules 482 and 484.

In an embodiment, the AF driving unit 430-1 may include the first carrier 440 to which the lens assembly (e.g., the lens assembly 420 of FIGS. 4A, 4B, and 5) is coupled and the first piezoelectric motor 450 that provides a driving force for moving the first carrier 440 in the direction of the optical axis OA.

In an embodiment, the OIS driving unit 430-2 may include the second carrier 460 to which the AF driving unit 430-1 is coupled and the second piezoelectric motors 470 that provide a driving force for moving the second carrier 460 in the direction of the first shift axis S1 or the direction of the second shift axis S2 substantially perpendicular to the optical axis OA.

In an embodiment, the plurality of sensing magnets 481 and 483 and the plurality of sensor modules 482 and 484 may be components for detecting position information of the lens assembly 420. For example, the plurality of sensing magnets 481 and 483 and the plurality of sensor modules 482 and 484 may be provided to sense the current position of the lens assembly 420 or the relative positions of the base 413 and the lens assembly 420 in relation to an AF operation or an OIS operation. The plurality of sensor modules 482 and 484 may be magnetic sensors (e.g., Hall sensors) that sense the magnitudes and/or directions of magnetic fields of the plurality of sensing magnets 481 and 483.

In an embodiment, the plurality of sensing magnets 481 and 483 and the plurality of sensor modules 482 and 484 may include the first sensing magnet 481 and the first sensor module 482 for sensing the position of the first carrier 440.

In an embodiment, the first sensing magnet 481 may be disposed on the first carrier 440, and the first sensor module 482 may be disposed on the base 413. The first sensing magnet 481 may be coupled to a lower portion of the first carrier 440 to face the first surface 414 of the base 413. For example, the first sensing magnet 481 may be coupled to the magnet receiving portion 448 (e.g., the magnet receiving portion 448 of FIG. 7) of the coupling ring 442 and accordingly may be located in a space between the first carrier 440 and the base 413. The first sensor module 482 may be disposed on the first surface 414 of the base 413. For example, the first sensor module 482 may be disposed (or, mounted) so as to be electrically connected onto the first sub-substrate 494a fixed to the first surface 414 of the base 413.

In an embodiment, the first sensing magnet 481 may be formed to be polarized in the direction of the optical axis OA. For example, a surface of the first sensing magnet 481 that faces the first sensor module 482 may be a surface having one polarity. However, this is illustrative, and the disclosure is not limited thereto.

In an embodiment, the first sensor module 482 may sense at least one of the intensity or the direction of the magnetic field of the first sensing magnet 481, or may sense a change of the magnetic field at a specific point. For example, when the first carrier 440 is moved in the direction of the optical axis OA relative to the base 413 by an operation of the first piezoelectric motor 450, the distance between the first sensor module 482 and the first sensing magnet 481 in the direction of the optical axis OA may be changed, and the first sensor module 482 may sense a change in the intensity and/or the direction of the magnetic field of the first sensing magnet 481 in response to the change of the distance.

According to an embodiment, the electronic device 300 or the camera module 400 may detect position information of the lens assembly 420, based on the intensity and/or direction of the magnetic field of the first sensing magnet 481 that is sensed by the first sensor module 482. For example, the position information may mean the distance between the lens assembly 420 and the image sensor (e.g., the image sensor 493 of FIG. 5) disposed on the base 413 in the direction of the optical axis OA.

In an embodiment, the plurality of sensing magnets 481 and 483 and the plurality of sensor modules 482 and 484 may include the second sensing magnet 483 and the second sensor module 484 for sensing the position of the second carrier 460.

In an embodiment, the second sensing magnet 483 may be disposed on the second carrier 460, and the second sensor module 484 may be disposed on the base 413. The second sensing magnet 483 may be coupled to a lower portion of the second carrier 460 to face the first surface 414 of the base 413. For example, the second sensing magnet 483 may be coupled to a lower surface of the second frame 461 that faces the first surface 414 of the base 413 and accordingly may be located in a space between the second carrier 460 and the base 413. The second sensor module 484 may be disposed on the first surface 414 of the base 413. For example, the second sensor module 484 may be disposed (or, mounted) so as to be electrically connected onto the first sub-substrate 494a fixed to the first surface 414 of the base 413.

In an embodiment, the second sensing magnet 483 may be formed to be polarized in a direction substantially perpendicular to the optical axis OA. For example, a facing surface of the second sensing magnet 483 that faces the second sensor module 484 may have two or more polarities. For example, the facing surface of the second sensing magnet 483 may have a form in which a first region having a first polarity (e.g., an N pole) and a second region having a second polarity (e.g., an S pole) are arranged in a direction parallel to the first surface 414 of the base 413. However, this is illustrative, and the disclosure is not limited thereto.

In an embodiment, the second sensor module 484 may sense at least one of the intensity or the direction of the magnetic field of the second sensing magnet 483, or may sense a change of the magnetic field at a specific point. For example, when the second carrier 460 is moved in the direction of the first shift axis S1 or the second shift axis S2 relative to the base 413 by operations of the second piezoelectric motors 470, the relative positions of the second sensor module 484 and the second sensing magnet 483 may be changed, and the second sensor module 484 may sense a change in the intensity and/or the direction of the magnetic field of the second sensing magnet 483 in response to the change of the positions.

According to an embodiment, the electronic device 300 or the camera module 400 may detect position information of the lens assembly 420, based on the intensity and/or direction of the magnetic field of the second sensing magnet 483 that is sensed by the second sensor module 484. For example, the position information may mean the distance that the lens assembly 420 moves in the direction of the first shift axis S1 and/or the second shift axis S2 from the center of the image sensor 493 disposed on the base 413 (or, the distance between the optical axis OA of the lens and the center point of the image sensor 493).

In an embodiment, the second sensing magnet 483 may include a first sub-magnet 483a and a second sub-magnet 483b located on corners of the second carrier 460 in a diagonal direction. The second sensor module 484 may include a first sub-sensor 484a facing the first sub-magnet 483a and a second sub-sensor 484b facing the second sub-magnet 483b. According to various embodiments, a value sensed by the first sub-sensor 484a and a value sensed by the second sub-sensor 484b may be summed for accurate control and compensation of a control error. For example, errors may be reduced by detecting position information of the second carrier 460, based on the sum of the magnetic flux density of the first sub-magnet 483a sensed by the first sub-sensor 484a and the magnetic flux density of the second sub-magnet sensed by the second sub-sensor 484b. However, the numbers and positions of second sensing magnets 483 and second sensor modules 484 are not limited to the illustrated embodiment.

Figure 19A:
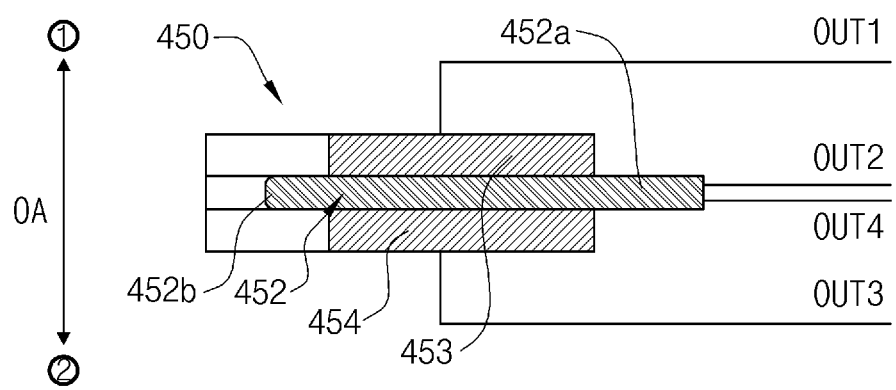
FIG. 19A illustrates a connection structure of output terminals of the first piezoelectric motor according to an embodiment.
Figure 19B:
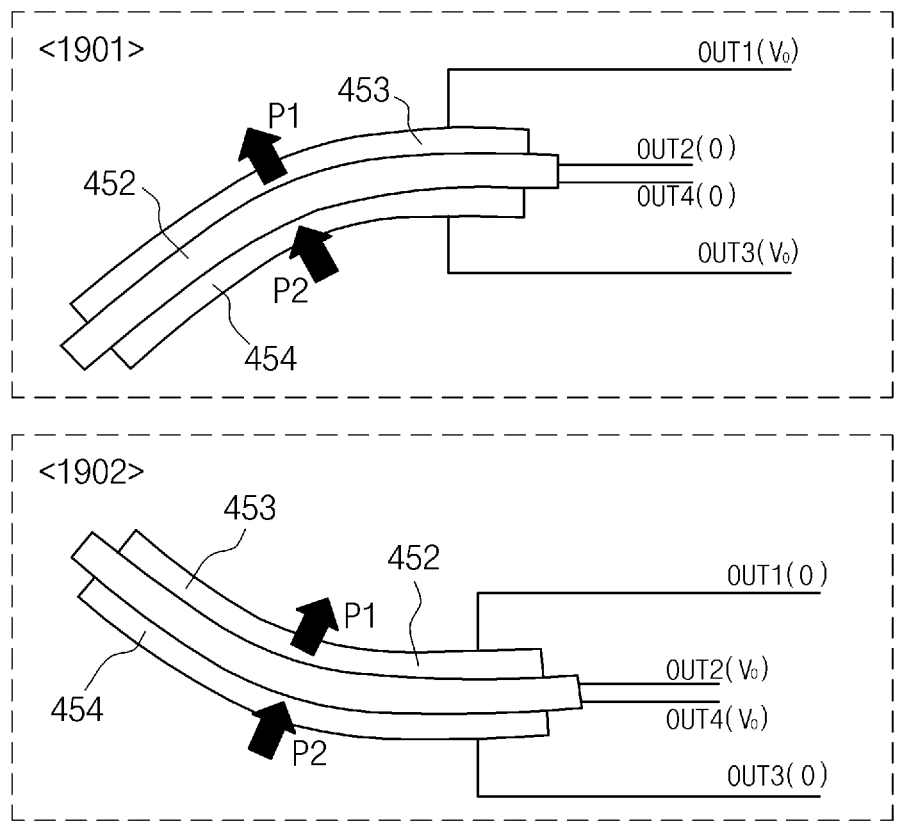
FIG. 19B illustrates a control operation of the first piezoelectric motor according to an embodiment.
Figure 19C:
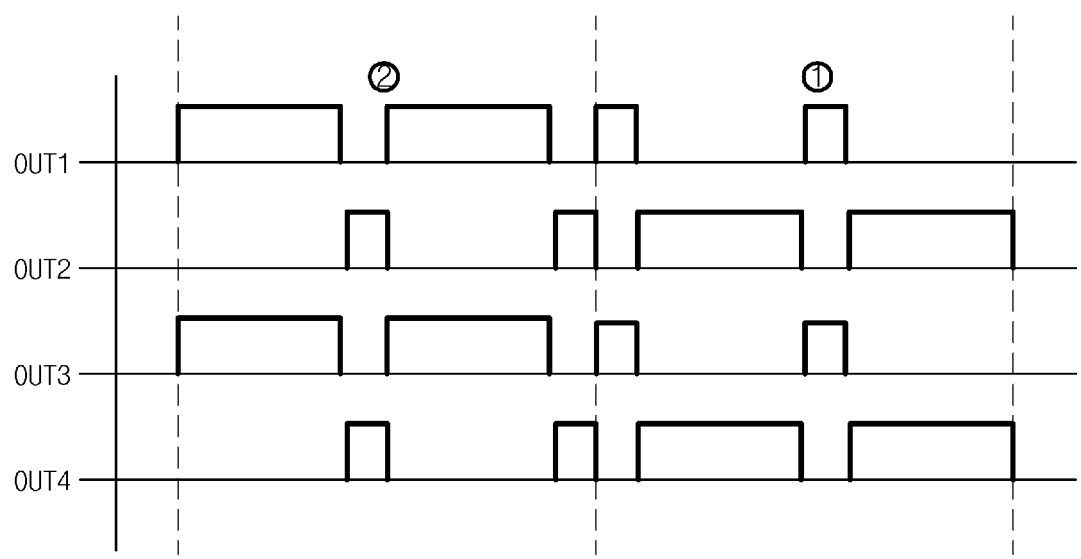
FIG. 19C illustrates the control operation of the first piezoelectric motor according to an embodiment.

FIG. 19A illustrates a connection structure of output terminals of the first piezoelectric motor according to an embodiment. FIG. 19B illustrates a control operation of the first piezoelectric motor according to an embodiment. FIG. 19C illustrates the control operation of the first piezoelectric motor according to an embodiment.

Referring to FIGS. 19A, 19B, and 19C, the AF driving unit (e.g., the AF driving unit 430-1 of FIGS. 5, 6, and 7) of the camera module according to an embodiment may include the first piezoelectric motor 450. The first piezoelectric motor 450 may include the metal plate 452, the first sub-piezoelectric element 453 attached to the surface of the metal plate 452 that faces the first optical axis direction ①, and the second sub-piezoelectric element 454 attached to the surface of the metal plate 452 that faces the second optical axis direction ②.

In an embodiment, the first piezoelectric motor 450 may be configured such that a first output terminal OUT1 is connected to the first sub-piezoelectric element 453, a third output terminal OUT3 is connected to the second sub-piezoelectric element 454, and a second output terminal OUT2 and a fourth output terminal OUT4 are connected to the metal plate 452. For example, the first sub-piezoelectric element 453 may receive a drive voltage through the first output terminal OUT1 and the second output terminal OUT2, and the second sub-piezoelectric element 454 may receive a drive voltage through the third output terminal OUT3 and the fourth output terminal OUT4.

In an embodiment, an external electrode (or, a first driving electrode) to which the first output terminal OUT1 is connected may be formed (or, coated) on the upper surface of the first sub-piezoelectric element 453 (e.g., the surface facing the first optical axis direction ① or the non-attached surface), and an external electrode (or, a second driving electrode) to which the third output terminal OUT3 is connected may be formed (or, coated) on the lower surface of the second sub-piezoelectric element 454 (e.g., the surface facing the second optical axis direction ② or the non-attached surface). The metal plate 452, to which the second output terminal OUT2 and the fourth output terminal OUT4 are connected, may function as a common internal electrode (or, a common electrode) for the first sub-piezoelectric element 453 and the second sub-piezoelectric element 454. However, the design of output terminals of the first piezoelectric motor 405 is not limited to the illustrated example. In another example, the metal plate 452 may be formed of a material that does not conduct electricity. In this case, an external electrode and an internal electrode may be formed on the opposite surfaces of the first sub-piezoelectric element 453 and the second sub-piezoelectric element 454, and output terminals may be connected to the external electrode and the internal electrode.

Referring to FIGS. 19B and 19C, through alternation of output terminal voltages, expansion and/or contraction of the first sub-piezoelectric element 453 and the second sub-piezoelectric element 454 may be controlled, and the direction in which the metal plate 452 is bent may be changed. For example, the first piezoelectric motor 450 may be controlled by a pulse width modulation (PWM) control method. For example, through adjustment of a duty ratio or a duty cycle, the first piezoelectric motor 450 may perform an operation in which bending is switched in the first optical axis direction ① and the second optical axis direction ②.

In an embodiment, the first piezoelectric motor 450 may operate such that the inner end portion 452b of the metal plate 452 is bent in the first optical axis direction ① or the second optical axis direction ② through a potential difference between the first output terminal OUT1 and the second output terminal OUT2 and a potential difference between the third output terminal OUT3 and the fourth output terminal OUT4. When an electric field is formed in the same direction as the poling direction, the first sub-piezoelectric element 453 and the second sub-piezoelectric element 454 may be expanded in the poling direction and may be contracted in the width direction according to the Poisson's ratio. In contrast, when an electric field is formed in the direction opposite to the poling direction, the first sub-piezoelectric element 453 and the second sub-piezoelectric element 454 may be contracted in the poling direction and may be expanded in the width direction.

In an embodiment, the first sub-piezoelectric element 453 and the second sub-piezoelectric element 454 may be deformed opposite to each other. For example, as the first sub-piezoelectric element 453 contracts in a first poling direction P1 and the second sub-piezoelectric element 454 expands in a second poling direction P2, the metal plate 452 may be bent in the second optical axis direction ②. In contrast, as the first sub-piezoelectric element 453 expands in the first poling direction P1 and the second sub-piezoelectric element 454 contracts in the second poling direction P2, the metal plate 452 may be bent in the first optical axis direction ①.

In an embodiment, the first sub-piezoelectric element 453 and the second sub-piezoelectric element 454 may have the same poling direction. When the first poling direction P1 of the first sub-piezoelectric element 453 and the second poling direction P2 of the second sub-piezoelectric element 454 are the same as each other, the direction of an electric field formed for the first sub-piezoelectric element 453 and the direction of an electric field formed for the second sub-piezoelectric element 454 may be opposite to each other, and accordingly the first sub-piezoelectric element 453 and the second sub-piezoelectric element 454 may be deformed opposite to each other.

Hereinafter, an operation in which the first sub-piezoelectric element 453 and the second sub-piezoelectric element 454 are contracted and expanded opposite to each other when the poling directions of the first sub-piezoelectric element 453 and the second sub-piezoelectric element 454 are the same as each other will be described based on FIG. 19B. However, the illustrated embodiment is illustrative, and the poling directions of the first sub-piezoelectric element 453 and the second sub-piezoelectric element 454 may be opposite to each other.

Referring to <1901> of FIG. 19B, in an operation of bending the metal plate 452 in the second optical axis direction ②, the potential of the first output terminal OUT1 may be higher than the potential of the second output terminal OUT2, and the potential of the third output terminal OUT3 may be higher than the potential of the fourth output terminal OUT4. For example, an electric field facing the direction opposite to the first poling direction P1 may be formed for the first sub-piezoelectric element 453, and an electric field facing the same direction as the second poling direction P2 may be formed for the second sub-piezoelectric element 454. In this case, the first sub-piezoelectric element 453 may be contracted in the height direction and may be expanded in the width direction, and the second sub-piezoelectric element 454 may be expanded in the height direction and may be contracted in the width direction. Accordingly, the metal plate 452 may be bent downward (e.g., in the second optical axis direction ②).

Referring to <1902> of FIG. 19B, in an operation of bending the metal plate 452 in the first optical axis direction ①, the potential of the second output terminal OUT2 may be higher than the potential of the first output terminal OUT1, and the potential of the fourth output terminal OUT4 may be higher than the potential of the third output terminal OUT3. For example, an electric field facing the same direction as the first poling direction P1 may be formed for the first sub-piezoelectric element 453, and an electric field facing the direction opposite to the second poling direction P2 may be formed for the second sub-piezoelectric element 454. In this case, the first sub-piezoelectric element 453 may be expanded in the height direction and may be contracted in the width direction, and the second sub-piezoelectric element 454 may be contracted in the height direction and may be expanded in the width direction. Accordingly, the metal plate 452 may be bent upward (e.g., in the first optical axis direction ①).

Figure 20C:
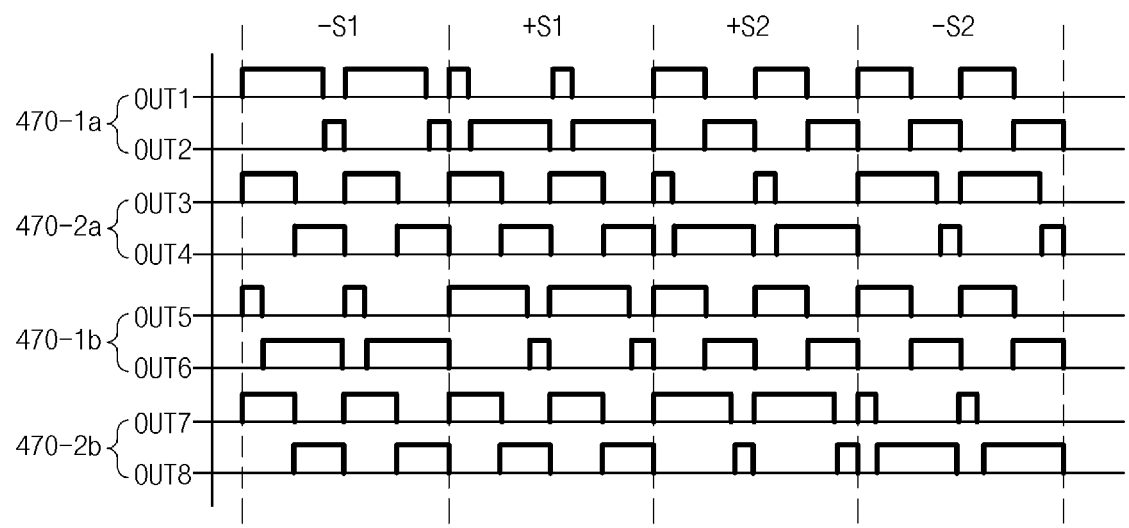
FIG. 20C illustrates the control operation of the second piezoelectric motor according to an embodiment.

FIG. 20A illustrates a connection structure of output terminals of the second piezoelectric motor according to an embodiment. FIG. 20B illustrates a control operation of the second piezoelectric motor according to an embodiment. FIG. 20C illustrates the control operation of the second piezoelectric motor according to an embodiment.

Referring to FIGS. 20A, 20B, and 20C, the OIS driving unit (e.g., the OIS driving unit 430-2 of FIGS. 5, 11, and 12) of the camera module according to an embodiment may include the second piezoelectric motors 470. Each of the second piezoelectric motors 470 may include the second piezoelectric element 471, the rod 473 coupled (attached) to the one end portion of the second piezoelectric element 471, and the counter mass 475 coupled (attached) to the opposite end portion of the second piezoelectric element 471.

In an embodiment, the second piezoelectric motor 470 may be configured such that two output terminals are connected to the second piezoelectric element 471. A first output terminal OUT1 may be connected to one surface (e.g., the upper surface) of the second piezoelectric element 471, and a second output terminal OUT2 may be connected to an opposite surface (e.g., the lower surface) of the second piezoelectric element 471 that faces away from the one surface. For example, the second piezoelectric element 471 of the first side sub-motor 470-1a may receive a drive voltage through the first output terminal OUT1 and the second output terminal OUT2. Referring to FIG. 20C, output terminals connected to the second piezoelectric element 471 of the second side sub-motor 470-2a may be referred to as a third output terminal OUT3 and a fourth output terminal OUT4, output terminals connected to the second piezoelectric element 471 of the third side sub-motor 470-1b may be referred to as a fifth output terminal OUT5 and a sixth output terminal OUT6, and output terminals connected to the second piezoelectric element 471 of the fourth side sub-motor 470-2b may be referred to as a seventh output terminal OUT7 and an eighth output terminal OUT8. In an embodiment, output terminals may be connected to opposite surfaces of the second piezoelectric element 471 that are substantially perpendicular to the poling direction P3 of the second piezoelectric element 471 and face away from each other. For example, the first output terminal OUT1 may be connected to an electrode formed (or, coated) on one surface of the second piezoelectric element 471 that faces the poling direction P3, and the second output terminal OUT2 may be connected to an electrode formed (or, coated) on an opposite surface facing away from the one surface.

Referring to FIGS. 20B and 20C, through alternation of output terminal voltages, expansion and/or contraction of the second piezoelectric element 471 may be controlled, and the direction in which the rod 473 linearly moves may be changed. For example, the second piezoelectric motor 470 may be controlled by a pulse width modulation (PWM) control method. For example, through adjustment of a duty ratio or a duty cycle, the second piezoelectric motor 470 may perform an operation in which movement is switched in the first optical axis direction ① and the second optical axis direction ②.

In an embodiment, the second piezoelectric element 471 may be contracted or expanded in the direction of the shift axis S through a potential difference between the first output terminal OUT1 and the second output terminal OUT2. When an electric field is formed in the same direction as the poling direction P3, the second piezoelectric element 471 may be expanded in the poling direction P3 and may be contracted in the direction of the shift axis S according to the Poisson's ratio. In contrast, when an electric field is formed in the direction opposite to the poling direction P3, the second piezoelectric element 471 may be contracted in the poling direction P3 and may be expanded in the direction of the shift axis S.

Hereinafter, an operation in which the second piezoelectric element 471 is contracted and expanded when the poling direction P3 of the second piezoelectric element 471 is formed in the direction from the surface to which the second output terminal OUT2 is connected toward the surface to which the first output terminal OUT1 is connected will be described based on the second piezoelectric motor 470 of FIG. 20B (in particular, the first side sub-motor 470-1a). However, the illustrated embodiment is illustrative. The poling direction P3 of the second piezoelectric element 471 may be differently formed, and accordingly, the directions in which the output terminals are connected may be changed.

Referring to <2001> of FIG. 20B, in an operation of moving the rod 473 in the −S direction, the potential of the first output terminal OUT1 may be higher than the potential of the second output terminal OUT2. For example, an electric field facing the direction opposite to the poling direction P3 may be formed for the second piezoelectric element 471. In this case, the second piezoelectric element 471 may be contracted in the height direction (e.g., the poling direction P3) and may be expanded in the width direction (e.g., the direction of the shift axis S). Accordingly, the rod 473 may be moved in the −S direction.

Referring to <2002> of FIG. 20B, in an operation of moving the rod 473 in the +S direction, the potential of the second output terminal OUT2 may be higher than the potential of the first output terminal OUT1. For example, an electric field facing the same direction as the poling direction P3 may be formed for the second piezoelectric element 471. In this case, the second piezoelectric element 471 may be expanded in the height direction (e.g., the poling direction P3) and may be contracted in the width direction (e.g., the direction of the shift axis S). Accordingly, the rod 473 may be moved in the +S direction.

FIG. 20C represents drive voltages for performing an OIS operation using the sub-motors (e.g., 470-1a, 470-1b, 470-2a, and 470-2b of FIG. 14) of the second piezoelectric motors 470 having the arrangement structure illustrated in FIG. 14. Referring to FIG. 20C together with FIG. 14, when the second carrier 460 is moved in the direction of the first shift axis S1, drive voltages may be provided to the second piezoelectric elements 471a and 471c such that the first side sub-motor 470-1a and the third side sub-motor 470-1b operate opposite to each other. Furthermore, when the second carrier 460 is moved in the direction of the second shift axis S2, drive voltages may be provided to the second piezoelectric elements 471b and 471d such that the second side sub-motor 470-2a and the fourth side sub-motor 470-2b operate opposite to each other.

A camera module 400 according to an embodiment of the disclosure may include a camera housing 410, an optical image stabilization (OIS) driving unit 430-2 disposed in the camera housing, an auto focus (AF) driving unit 430-1, at least a portion of which is coupled to the OIS driving unit 430-2, and a lens assembly 420 that includes at least one lens 421 and that is coupled to the AF driving unit 430-1. The AF driving unit 430-1 may include a first carrier 440 to which the lens assembly is coupled and a first piezoelectric motor 450 that provides a driving force to move the first carrier in a direction of an optical axis OA of the lens. The OIS driving unit 430-2 may include a second carrier 460 to which the AF driving unit 430-1 is coupled and a plurality of second piezoelectric motors 470 that provide driving forces to move the second carrier 460 in one or more directions perpendicular to the optical axis.

In various embodiments, the AF driving unit 430-1 may be seated on an upper portion of the second carrier 460 to move together with the second carrier 460 when the second carrier 460 is moved.

In various embodiments, the lens assembly 420 may move together with the first carrier 440, and the first carrier 440 may move together with the second carrier 460 relative to the camera housing 410 in the one or more directions perpendicular to the optical axis when an optical image stabilization (OIS) function is performed and may move relative to the second carrier 460 and the camera housing 410 in the direction of the optical axis when an auto focus (AF) function is performed.

In various embodiments, the camera module 400 may further include an image sensor 493 fixed to the camera housing 410, and the lens assembly 420 may move in the direction of the optical axis with respect to the image sensor 493 by movement of the first carrier 440 and may move in the one or more directions perpendicular to the optical axis with respect to the image sensor 493 by movement of the second carrier 460.

In various embodiments, at least a portion of the first piezoelectric motor 450 may be coupled to the second carrier 460, and at least a portion of the first carrier 440 may be accommodated in an opening 4521 and 4551 of the first piezoelectric motor 450 so as to be surrounded by the first piezoelectric motor 450.

In various embodiments, the first carrier 440 may make contact with the first piezoelectric motor 450 and may move relative to the second carrier 460 in the direction of the optical axis by a bending motion generated in at least a portion of the first piezoelectric motor 450.

In various embodiments, the first piezoelectric motor 450 may include a metal plate 452 having an inner end portion 452b brought into close contact with the first carrier 440 and an outer end portion 452a relatively fixed to the second carrier 460 and a first piezoelectric element 453 and 454 disposed on at least one of opposite surfaces of the metal plate 452. The first carrier 440 may be inserted into an opening 4521 of the metal plate 452, and the first piezoelectric element 450 may contract or expand based on a voltage applied to the first piezoelectric element 450.

In various embodiments, the metal plate 452 may be configured such that the inner end portion 452b is bent in a first optical axis direction ① or a second optical axis direction ② opposite to the first optical axis direction with respect to the outer end portion 452a by contraction or expansion of the first piezoelectric element 450, and the first carrier may move in the first optical axis direction or the second optical axis direction by a frictional force between the first carrier 440 and the inner end portion 452b.

In various embodiments, the first piezoelectric element 453 and 454 may include a first sub-piezoelectric element 453 and a second sub-piezoelectric element 454 attached to the opposite surfaces of the metal plate 452, respectively, and the first carrier 440 may move in a first optical axis direction ① by contraction of the first sub-piezoelectric element 453 and expansion of the second sub-piezoelectric element 454 or may move in a direction opposite to the first optical axis direction by expansion of the first sub-piezoelectric element 453 and contraction of the second sub-piezoelectric element 454.

In various embodiments, the first piezoelectric motor 450 may further include a holder 455 to which the outer end portion 452a of the metal plate 452 is coupled, and the holder 455 may be seated on the second carrier.

In various embodiments, the first piezoelectric motor 450 may be formed in an annular shape, and the first carrier 440 may be formed in a shape corresponding to the shape of the first piezoelectric motor 450.

In various embodiments, the first carrier 440 may include a first frame 441 having a structure divided into a first portion 441a and a second portion 441b, a sidewall 447 of the first frame 441 being brought into close contact with the metal plate 452, and an elastic member 443 that is disposed between the first portion 441a and the second portion 441b and that generates an elastic force in a direction in which the first portion 441a and the second portion 441b move away from each other. The first frame 441 may make contact with the first piezoelectric motor 450 in a state in which a predetermined pre-load is applied by the elastic member 443.

In various embodiments, each of the plurality of second piezoelectric motors 470 may include a second piezoelectric element 471 that extends in a direction perpendicular to the optical axis and contracts or expands in a lengthwise direction based on a voltage applied to the second piezoelectric element 471 and a rod 473 that is coupled to a first end portion 4711 of the second piezoelectric element 471 and that extends in the lengthwise direction of the second piezoelectric element 471 by a predetermined length. The rod 473 may move in a lengthwise direction of the rod 473 by expansion or contraction of the second piezoelectric element 471.

In various embodiments, the camera housing 410 may include a base 413 on which the OIS driving unit 430-2 is seated. The rod 473 of each of the plurality of second piezoelectric motors may be coupled to the base 413 so as to be movable in the lengthwise direction of the rod 473. The second carrier 460 may be coupled to the rod 473 and may move together with the rod 473 or may separate from movement of the rod 473, based on a moving speed of the rod 473.

In various embodiments, the second carrier 460 may include a plurality of support parts 467 into which the rods 473 of the plurality of second piezoelectric motors are inserted and that make contact with the rods 473 and elastically press the rods 473. The rods 473 may move (M1) together with the second carrier 460 by frictional forces between the rods 473 and the plurality of support parts 467 when moving at a speed lower than a specified speed and may move (M2) relative to the second carrier 460 by an inertial force of the second carrier 460 when moving at a speed higher than the specified speed.

In various embodiments, each of the plurality of second piezoelectric motors 470 may further include a counter mass 475 coupled to a second end portion 4712 of the second piezoelectric element 471 that faces away from the first end portion 4711 of the second piezoelectric element 471. The second piezoelectric element 471 may contract or expand in a form in which the first end portion 4711 moves toward or away from the second end portion 4712 in a state in which the second end portion 4712 is relatively fixed by the counter mass 475.

In various embodiments, the plurality of second piezoelectric motors 470 may include a first sub-piezoelectric motor 470-1 that moves the second carrier 460 in a direction of a first shift axis S1 perpendicular to the optical axis and a second sub-piezoelectric motor 470-2 that moves the second carrier 460 in a direction of a second shift axis S2 perpendicular to the optical axis and the first shift axis S1. The first sub-piezoelectric motor 470-1 may be disposed on a side surface that faces the direction of the second shift axis S2, among side surfaces of the second carrier 460. The second sub-piezoelectric motor 470 may be disposed on a side surface that faces the direction of the first shift axis S1, among the side surfaces of the second carrier 460.

A camera module 400 according to an embodiment of the disclosure may include a camera housing 410, a lens assembly 420, at least a portion of which is disposed in the camera housing 410, the lens assembly including a lens 421, an auto focus (AF) module 430-1 to which the lens assembly 420 is coupled and that moves the lens assembly 420 in a direction of an optical axis OA of the lens 421, and an optical image stabilization (OIS) module 430-2 that is coupled to the inside of the camera housing 410 and that supports the AF module 430-1 and moves the AF module 430-1 and the lens assembly 420 in a direction perpendicular to the optical axis. Each of the OIS module 430-2 and the AF module 430-1 may provide a driving force using a piezoelectric element contracted or expanded based on a voltage applied to the piezoelectric element. The AF module 430-1 may include an AF carrier 440 to which the lens assembly 420 is coupled and an AF piezoelectric motor 450 that surrounds the AF carrier 440. The AF piezoelectric motor 450 may include a metal plate 452 having an opening into which the AF carrier 440 is fitted and a first piezoelectric element 453 and 454 disposed on at least one of opposite surfaces of the metal plate 450 that face the direction of the optical axis. The metal plate 452 may have an inner end portion 452b that forms the opening and that is brought into close contact with the AF carrier 440 and an outer end portion 452a fixed to the OIS module 430-2.

A camera module 400 according to an embodiment of the disclosure may include a camera housing 410, a lens assembly 420, at least a portion of which is disposed in the camera housing 410, the lens assembly 420 including a lens 421, an auto focus (AF) module 430-1 to which the lens assembly 420 is coupled and that moves the lens assembly 420 in a direction of an optical axis OS of the lens, and an optical image stabilization (OIS) module 430-2 that is coupled to the inside of the camera housing 410 and that supports the AF module 430-1 and moves the AF module 430-1 and the lens assembly 420 in a direction perpendicular to the optical axis. Each of the OIS module 430-2 and the AF module 430-1 may provide a driving force using a piezoelectric element contracted or expanded based on a voltage applied to the piezoelectric element. The OIS module 430-2 may include an OIS carrier 460 to which the AF module 430-1 is coupled and a plurality of OIS piezoelectric motors 470 disposed on a plurality of side surfaces of the OIS carrier 460. Each of the plurality of OIS piezoelectric motors 470 may include a second piezoelectric element 471 that extends in a direction perpendicular to the optical axis, a rod 473 that is coupled to a first end portion 4711 of the second piezoelectric element 471 and that extends in a lengthwise direction of the second piezoelectric element 471 by a predetermined length, the rod 473 being connected to the OIS carrier 460, and a counter mass 475 that is coupled to a second end portion 4712 of the second piezoelectric element 471 that faces away from the first end portion 4711, the counter mass 475 being separated from the camera housing 410 and the OIS carrier 460. The second piezoelectric element 471 may be contracted or expanded in a form in which the first end portion 4711 moves toward or away from the second end portion 4712 in a state in which the second end portion 4712 is supported by the counter mass 475. The rod 473 may move in a lengthwise direction of the rod 473 by expansion or contraction of the second piezoelectric element 471 and may be connected to the OIS carrier 460 so as to be movable in a direction perpendicular to the lengthwise direction of the rod 473.

An electronic device 300 according to an embodiment of the disclosure may include a housing 310 and a camera module 305, 312, or 400 that is disposed in the housing 310 and that receives light through a partial region of the housing 310. The camera module may include a camera housing 410, an optical image stabilization (OIS) driving unit 430-2 disposed in the camera housing, an auto focus (AF) driving unit 430-1 seated on an upper portion of the OIS driving unit 430-2, and a lens assembly 420 that includes at least one lens 421 and that is coupled to the AF driving unit 430-1. The AF driving unit 430-1 may include a first carrier 440 to which the lens assembly 420 is coupled and a first piezoelectric motor 450 that moves the first carrier 440 in a direction of an optical axis OA of the lens. The OIS driving unit 430-2 may include a second carrier 460 to which the AF driving unit 430-1 is coupled and a plurality of second piezoelectric motors 470 that move the second carrier 460 in a direction of at least one shift axis S1 or S2 perpendicular to the optical axis. The first carrier 440 may move together with the second carrier 460 relative to the camera housing 410 in the direction of the shift axis when an optical image stabilization (OIS) function is performed and may move relative to the second carrier 460 and the camera housing 410 in the direction of the optical axis when an auto focus (AF) function is performed.

In various embodiments, the first piezoelectric motor 450 may include a holder 455 coupled to the second carrier 460, a metal plate 452 having, in a central region of the metal plate 452, an opening 4521 into which the first carrier 440 is inserted, and a first piezoelectric element 453 and 454 attached to one surface of the metal plate 452 and contracted or expanded based on a voltage applied to the first piezoelectric element 453 and 454. The metal plate 452 may be configured such that an inner end portion 452b brought into close contact with the first carrier 440 generates bending displacement in the direction of the optical axis with respect to an outer end portion 452a coupled to the holder 455 by contraction or expansion of the first piezoelectric motor 450. The first carrier 440 may move together with the inner end portion in the direction of the optical axis by a frictional force between the first carrier 440 and the inner end portion 452b.

In various embodiments, each of the plurality of second piezoelectric motors 470 may include a second piezoelectric element 471 that extends in the direction of the at least one shift axis and contracts or expands in a lengthwise direction based on a voltage applied to the second piezoelectric element 471, a rod 473 that is coupled to a first end portion 4711 of the second piezoelectric element 471 and that extends in the lengthwise direction of the second piezoelectric element 471 by a predetermined length, and a counter mass 475 coupled to a second end portion 4712 of the second piezoelectric element 471 that faces away from the first end portion 4711. The rod 473 may move in a lengthwise direction of the rod 473 with respect to the second end portion 4712 of the second piezoelectric element 471 by expansion or contraction of the second piezoelectric element 471. The second carrier 460 may be coupled to the rod 473 and may move together with the rod 473 in the direction of the shift axis or may separate from movement of the rod 473, based on a moving speed of the rod 473.

According to the various embodiments of the disclosure, the camera module may move the lens by applying the motors using the piezoelectric elements, thereby reducing noise, preventing magnetic interference, or enabling precise control when performing the optical image stabilization function and the auto focus function.

Furthermore, according to the various embodiments of the disclosure, the plurality of OIS piezoelectric motors for the two-axis OIS operation may be disposed on the substantially perpendicular side surfaces of the OIS carrier, and thus the two drive axes may be placed on the same plane. Accordingly, the height and size of the camera module may be reduced.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A camera module comprising:
   a camera housing;
   an optical image stabilization (OIS) driving unit disposed in the camera housing;
   an auto focus (AF) driving unit coupled to the OIS driving unit; and
   a lens assembly comprising a lens and coupled to the AF driving unit,
   wherein the AF driving unit comprises:
   a first carrier to which the lens assembly is coupled; and
   a first piezoelectric motor configured to provide a driving force to move the first carrier in a direction of an optical axis of the lens, and
   wherein the OIS driving unit comprises:
   a second carrier to which the AF driving unit is coupled; and
   a plurality of second piezoelectric motors configured to provide driving forces to move the second carrier in one or more directions perpendicular to the optical axis,
   wherein the second carrier comprises a plurality of support parts,
   wherein each of the plurality of second piezoelectric motors comprises:
      a second piezoelectric element configured to extend in a direction perpendicular to the optical axis and contract or expand in a lengthwise direction of the second piezoelectric element based on a voltage applied to the second piezoelectric element, and
      a rod inserted into a corresponding support part of the plurality of support parts and coupled to a first end portion of the second piezoelectric element and configured to extend in the lengthwise direction of the second piezoelectric element by a predetermined length and to move along a lengthwise direction of the rod by expansion or contraction of the second piezoelectric element,
   wherein the support part comprises a first portion and a second portion surrounding at least a portion of the rod,
   wherein the first portion is configured to make contact with the rod and elastically press the rod such that the rod either moves together with the support part along the lengthwise direction of the rod or moves relative to the support part along the lengthwise direction of the rod without moving together with the support part based on a speed of expansion or contraction of the second piezoelectric element, and
   wherein the second portion extends vertically from the first portion and is spaced apart from the rod.

2. The camera module of claim 1, wherein the AF driving unit is disposed on an upper portion of the second carrier to move together with the second carrier when the second carrier is moved.

3. The camera module of claim 1, wherein the lens assembly is configured to move together with the first carrier, and
   wherein the first carrier is configured to:
   move together with the second carrier relative to the camera housing in the one or more directions perpendicular to the optical axis when an optical image stabilization function is performed; and
   move relative to the second carrier and the camera housing in the direction of the optical axis when an auto focus function is performed.

4. The camera module of claim 1, further comprising:
   an image sensor fixed to the camera housing,
   wherein the lens assembly is configured to move in the direction of the optical axis with respect to the image sensor by movement of the first carrier and move in the one or more directions perpendicular to the optical axis with respect to the image sensor by movement of the second carrier.

5. The camera module of claim 1, wherein the first piezoelectric motor is coupled to the second carrier, and
   wherein at least a portion of the first carrier is accommodated in an opening of the first piezoelectric motor to be surrounded by the first piezoelectric motor.

6. The camera module of claim 5, wherein the first piezoelectric motor is formed in an annular shape, and
   wherein the first carrier is formed in a shape corresponding to the annular shape of the first piezoelectric motor.

7. The camera module of claim 1, wherein the first carrier is configured to make contact with the first piezoelectric motor and move relative to the second carrier in the direction of the optical axis by a bending motion generated in at least a portion of the first piezoelectric motor.

8. The camera module of claim 1, wherein the first piezoelectric motor comprises:
   a metal plate comprising an inner end portion brought into close contact with the first carrier and an outer end portion opposite the inner end portion; and
   a first piezoelectric element disposed on at least one of opposite surfaces of the metal plate,
   wherein the first carrier is inserted into an opening of the metal plate, and
   wherein the first piezoelectric element is configured to contract or expand based on a voltage applied to the first piezoelectric element.

9. The camera module of claim 8, wherein the outer end portion of the metal plate is fixed to the second carrier,
   wherein the metal plate is configured such that the inner end portion is bent in a first direction parallel to the optical axis or a second direction opposite to the first direction with respect to the outer end portion by contraction or expansion of the first piezoelectric element, and wherein the first carrier is configured to move in the first direction or the second direction by a frictional force between the first carrier and the inner end portion.

10. The camera module of claim 8, wherein the first piezoelectric element comprises a first sub-piezoelectric element and a second sub-piezoelectric element attached to opposite surfaces of the metal plate, respectively, and
wherein the first carrier is configured to move in a first direction by contraction of the first sub-piezoelectric element and expansion of the second sub-piezoelectric element or move in a second direction opposite to the first direction by expansion of the first sub-piezoelectric element and contraction of the second sub-piezoelectric element.

11. The camera module of claim 8, wherein the first piezoelectric motor further comprises a holder to which the outer end portion of the metal plate is coupled, and
wherein the holder is disposed on the second carrier.

12. The camera module of claim 8, wherein the first carrier comprises:
a first frame having a structure divided into a first portion and a second portion, a sidewall of the first frame being brought into close contact with the metal plate; and
an elastic member disposed between the first portion and the second portion and configured to generate an elastic force in a direction in which the first portion and the second portion move away from each other, and
wherein the first frame is configured to make contact with the first piezoelectric motor in a state in which a predetermined pre-load is applied by the elastic member.

13. The camera module of claim 1, wherein the camera housing comprises a base on which the OIS driving unit is disposed,
wherein the rod is coupled to the base to be movable in the lengthwise direction of the rod.

14. The camera module of claim 13,
wherein the rod is configured to move together with the second carrier by frictional force between the rod and the support part when moving at a speed lower than a specified speed and to move relative to the second carrier by an inertial force of the second carrier when moving at a speed higher than the specified speed.

15. The camera module of claim 1, wherein each of the plurality of second piezoelectric motors further comprises a counter mass coupled to a second end portion of the second piezoelectric element configured to face away from the first end portion of the second piezoelectric element, and
wherein the second piezoelectric element is configured to contract or expand in a form in which the first end portion moves toward or away from the second end portion.

16. The camera module of claim 1, wherein the plurality of second piezoelectric motors comprises:
a first sub-piezoelectric motor configured to move the second carrier in a direction of a first shift axis perpendicular to the optical axis; and
a second sub-piezoelectric motor configured to move the second carrier in a direction of a second shift axis perpendicular to the optical axis and the first shift axis,
wherein the first sub-piezoelectric motor is disposed on a side surface facing the direction of the second shift axis among side surfaces of the second carrier, and
wherein the second sub-piezoelectric motor is disposed on a side surface facing the direction of the first shift axis among the side surfaces of the second carrier.

17. A camera module comprising:
a camera housing;
a lens assembly comprising a lens, at least a portion of the lens assembly being disposed in the camera housing;
an auto focus (AF) module to which the lens assembly is coupled, the AF module being configured to move the lens assembly in a direction of an optical axis of the lens; and
an optical image stabilization (OIS) module coupled to the camera housing and configured to support the AF module and to move the AF module and the lens assembly in a direction perpendicular to the optical axis,
wherein the AF module is configured to provide a driving force using a piezoelectric element contracted or expanded based on a voltage applied to the AF module,
wherein the AF module comprises an AF carrier to which the lens assembly is coupled and an AF piezoelectric motor configured to surround the AF carrier,
wherein the AF piezoelectric motor includes a metal plate having an opening into which the AF carrier is fitted and the piezoelectric element disposed on at least one of opposite surfaces of the metal plate facing the direction of the optical axis,
wherein the metal plate has an inner end portion configured to form the opening and brought into close contact with the AF carrier and an outer end portion fixed to the OIS module,
wherein the metal plate is configured such that the inner end portion is bent in a first direction parallel to the optical axis or a second direction opposite to the first direction with respect to the outer end portion by contraction or expansion of the piezoelectric element, and
wherein the AF carrier is configured to move in the first direction or the second direction by frictional force between the AF carrier and the inner end portion.

18. A camera module comprising:
a camera housing;
a lens assembly comprising a lens, at least a portion of the lens assembly being disposed in the camera housing;
an auto focus (AF) module to which the lens assembly is coupled, the AF module being configured to move the lens assembly in a direction of an optical axis of the lens; and
an optical image stabilization (OIS) module coupled to the camera housing and configured to support the AF module and to move the AF module and the lens assembly in a direction perpendicular to the optical axis,
wherein the OIS module is configured to provide a driving force using a piezoelectric element contracted or expanded based on a voltage applied to the piezoelectric element,
wherein the OIS module comprises an OIS carrier to which the AF module is coupled and a plurality of OIS piezoelectric motors disposed on a plurality of side surfaces of the OIS carrier,
wherein each of the plurality of OIS piezoelectric motors comprises:
the piezoelectric element configured to extend in a direction perpendicular to the optical axis;
a rod coupled to the OIS carrier and a first end portion of the piezoelectric element and configured to extend in a lengthwise direction of the piezoelectric element by a predetermined length; and
a counter mass separated from the camera housing and the OIS carrier and coupled to a second end portion of the piezoelectric element configured to face away from the first end portion, wherein the piezoelectric element is contracted or expanded in a form in which the first end portion moves toward or away from the second end portion in a state in which the second end portion is supported by the counter mass, and wherein the rod is configured to move in a lengthwise direction of the rod by expansion or contraction of the piezoelectric element and is connected to the OIS carrier to be movable in a direction perpendicular to the lengthwise direction of the rod.

19. An electronic device comprising:

a housing; and a camera module disposed in the housing and configured to receive light through a region of the housing, wherein the camera module comprises:

a camera housing;

an optical image stabilization (OIS) driving unit disposed in the camera housing;

an auto focus (AF) driving unit disposed on an upper portion of the OIS driving unit; and a lens assembly including a lens and coupled to the AF driving unit, wherein the AF driving unit comprises:

a first carrier to which the lens assembly is coupled; and a first piezoelectric motor configured to move the first carrier in a direction of an optical axis of the lens, wherein the OIS driving unit comprises:

a second carrier to which the AF driving unit is coupled; and a plurality of second piezoelectric motors configured to move the second carrier in a direction of at least one shift axis perpendicular to the optical axis, and wherein the first carrier is configured to:

move together with the second carrier relative to the camera housing in the direction of the shift axis when an optical image stabilization (OIS) function is performed; and move relative to the second carrier and the camera housing in the direction of the optical axis when an auto focus (AF) function is performed, wherein the second carrier comprises a plurality of support parts, wherein each of the plurality of second piezoelectric motors comprises:

a second piezoelectric element configured to extend in a direction perpendicular to the optical axis and contract or expand in a lengthwise direction of the second piezoelectric element based on a voltage applied to the second piezoelectric element, and a rod inserted into a corresponding support part of the plurality of support parts and coupled to a first end portion of the second piezoelectric element and configured to extend in the lengthwise direction of the second piezoelectric element by a predetermined length and to move along a lengthwise direction of the rod by expansion or contraction of the second piezoelectric element, wherein the support part comprises a first portion and a second portion surround at least a portion of the rod, wherein the first portion is configured to make contact with the rod and elastically press the rod such that the rod either moves together with the support part along the lengthwise direction of the rod or moves relative to the support part along the lengthwise direction of the rod without moving together with the support part based on a speed of expansion or contraction of the second piezoelectric element, and wherein the second portion extends vertically from the first portion and is spaced apart from the rod.

* * * * *